(12) United States Patent
Braness et al.

(10) Patent No.: US 10,257,443 B2
(45) Date of Patent: Apr. 9, 2019

(54) MULTIMEDIA DISTRIBUTION SYSTEM FOR MULTIMEDIA FILES WITH INTERLEAVED MEDIA CHUNKS OF VARYING TYPES

(71) Applicant: DIVX, LLC, San Diego, CA (US)

(72) Inventors: Jason Braness, San Diego, CA (US); Jerome Rota, San Diego, CA (US); Eric William Grab, San Diego, CA (US); Jerald Donaldson, San Diego, CA (US); Heather Hitchcock, Encinitas, CA (US); Damien Chavarria, Bedarieux (FR); Michael John Floyd, San Diego, CA (US); Brian T. Fudge, Los Angeles, CA (US); Adam H. Li, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 15/144,776

(22) Filed: May 2, 2016

(65) Prior Publication Data
US 2016/0360123 A1  Dec. 8, 2016

Related U.S. Application Data

(63) Continuation of application No. 14/281,791, filed on May 19, 2014, now Pat. No. 9,369,687, which is a
(Continued)

(51) Int. Cl.
*H04N 21/80* (2011.01)
*H04N 5/278* (2006.01)
(Continued)

(52) U.S. Cl.
CPC ....... *H04N 5/278* (2013.01); *G11B 20/00086* (2013.01); *G11B 20/00731* (2013.01);
(Continued)

(58) Field of Classification Search
CPC ............ H04N 5/278; H04N 21/2347; H04N 21/23473; H04N 21/23476;
(Continued)

(56) References Cited

U.S. PATENT DOCUMENTS

| | | |
|---|---|---|
| 4,009,331 A | 2/1977 | Goldmark et al. |
| 4,694,357 A | 9/1987 | Rahman et al. |

(Continued)

FOREIGN PATENT DOCUMENTS

| | | |
|---|---|---|
| BR | PI0416738 A | 1/2007 |
| CN | 1221284 A | 6/1999 |

(Continued)

OTHER PUBLICATIONS

Broadq—The Ultimate Home Entertainment Software, printed May 11, 2009 from ittp://web.srchive.org/web/20030401122010/www.broadq.com/qcasttuner/, 1 page.
(Continued)

*Primary Examiner* — David E Harvey
(74) *Attorney, Agent, or Firm* — KPPB LLP

(57) ABSTRACT

A multimedia file and methods of generating, distributing and using the multimedia file are described. Multimedia files in accordance with embodiments of the present invention can contain multiple video tracks, multiple audio tracks, multiple subtitle tracks, data that can be used to generate a menu interface to access the contents of the file and 'meta data' concerning the contents of the file. Multimedia files in accordance with several embodiments of the present invention also include references to video tracks, audio tracks, subtitle tracks and 'meta data' external to the file. One embodiment of a multimedia file in accordance with the present invention includes a series of encoded video frames and encoded menu information.

16 Claims, 31 Drawing Sheets

Related U.S. Application Data continuation of application No. 11/016,184, filed on Dec. 17, 2004, now Pat. No. 8,731,369, which is a continuation-in-part of application No. 10/731,809, filed on Dec. 8, 2003, now Pat. No. 7,519,274.

(51) Int. Cl.

| | | |
|---|---|---|
| G11B 20/00 | (2006.01) | |
| H04N 5/85 | (2006.01) | |
| H04N 9/804 | (2006.01) | |
| H04N 5/92 | (2006.01) | |
| H04N 19/44 | (2014.01) | |
| H04N 5/265 | (2006.01) | |
| H04N 21/845 | (2011.01) | |

(52) U.S. Cl.
CPC ............ H04N 5/265 (2013.01); H04N 5/85 (2013.01); H04N 5/92 (2013.01); H04N 9/8047 (2013.01); H04N 19/44 (2014.11); H04N 21/845 (2013.01); *G11B 20/00739* (2013.01)

(58) Field of Classification Search
CPC ............ H04N 21/4627; H04N 21/2541; H04L 2209/603; H04L 63/04; H04L 63/10; H04L 63/0428; G11B 20/00086; G11B 20/00731; G06F 21/6209; G06F 21/10; G06F 2221/2141
USPC ........................................................ 386/337
See application file for complete search history.

(56) References Cited

U.S. PATENT DOCUMENTS

| | | | |
|---|---|---|---|
| 4,802,170 A | 1/1989 | Trottier | |
| 4,964,069 A | 10/1990 | Ely | |
| 5,119,474 A | 6/1992 | Beitel et al. | |
| 5,274,758 A | 12/1993 | Beitel et al. | |
| 5,361,332 A | 11/1994 | Yoshida et al. | |
| 5,396,497 A | 3/1995 | Veltman | |
| 5,404,436 A | 4/1995 | Hamilton | |
| 5,412,773 A | 5/1995 | Carlucci et al. | |
| 5,420,801 A | 5/1995 | Dockter et al. | |
| 5,420,974 A | 5/1995 | Morris et al. | |
| 5,428,529 A | 6/1995 | Hartrick et al. | |
| 5,471,576 A | 11/1995 | Yee | |
| 5,485,611 A | 1/1996 | Astle | |
| 5,487,167 A | 1/1996 | Dinallo et al. | |
| 5,533,021 A | 7/1996 | Branstad et al. | |
| 5,537,408 A | 7/1996 | Branstad et al. | |
| 5,539,908 A | 7/1996 | Chen et al. | |
| 5,541,662 A | 7/1996 | Adams et al. | |
| 5,583,652 A | 12/1996 | Ware | |
| 5,619,338 A | 4/1997 | Nakai et al. | |
| 5,627,936 A | 5/1997 | Prasad et al. | |
| 5,633,472 A | 5/1997 | DeWitt et al. | |
| 5,642,171 A | 6/1997 | Baumgartner et al. | |
| 5,655,117 A | 8/1997 | Goldberg et al. | |
| 5,664,044 A | 9/1997 | Ware | |
| 5,675,382 A | 10/1997 | Bauchspies | |
| 5,675,511 A | 10/1997 | Prasad et al. | |
| 5,684,542 A | 11/1997 | Tsukagoshi | |
| 5,715,356 A * | 2/1998 | Hirayama | G11B 27/10 348/E5.123 |
| 5,719,786 A | 2/1998 | Nelson et al. | |
| 5,745,643 A | 4/1998 | Mishina | |
| 5,751,280 A | 5/1998 | Abbott | |
| 5,763,800 A | 6/1998 | Rossum et al. | |
| 5,765,164 A * | 6/1998 | Prasad | G06F 17/30067 |
| 5,794,018 A | 8/1998 | Vrvilo et al. | |
| 5,809,173 A | 9/1998 | Liu et al. | |
| 5,822,524 A | 10/1998 | Chen et al. | |
| 5,828,370 A | 10/1998 | Moeller et al. | |
| 5,844,575 A | 12/1998 | Reid | |
| 5,848,217 A | 12/1998 | Tsukagoshi et al. | |
| 5,903,261 A | 5/1999 | Walsh et al. | |
| 5,907,597 A | 5/1999 | Mark | |
| 5,915,066 A | 6/1999 | Katayama | |
| 5,956,729 A | 9/1999 | Goetz et al. | |
| 5,959,690 A | 9/1999 | Toebes, VIII et al. | |
| 6,031,622 A | 2/2000 | Ristow et al. | |
| 6,044,175 A | 3/2000 | Taira et al. | |
| 6,046,778 A | 4/2000 | Nonomura et al. | |
| 6,065,050 A | 5/2000 | DeMoney | |
| 6,079,566 A | 6/2000 | Eleftheriadis et al. | |
| 6,169,242 B1 | 1/2001 | Fay et al. | |
| 6,195,388 B1 | 2/2001 | Choi et al. | |
| 6,204,883 B1 | 3/2001 | Tsukagoshi | |
| 6,219,043 B1 | 4/2001 | Yogeshwar et al. | |
| 6,253,025 B1 | 6/2001 | Kitamura et al. | |
| 6,308,005 B1 | 10/2001 | Ando et al. | |
| 6,330,286 B1 | 12/2001 | Lyons et al. | |
| 6,374,144 B1 | 4/2002 | Viviani et al. | |
| 6,395,969 B1 | 5/2002 | Fuhrer | |
| 6,573,907 B1 | 6/2003 | Madrane | |
| 6,658,056 B1 | 12/2003 | Duruöz et al. | |
| 6,665,835 B1 | 12/2003 | Gutfreund et al. | |
| 6,671,408 B1 | 12/2003 | Kaku | |
| 6,693,959 B1 | 2/2004 | Eckart et al. | |
| 6,697,568 B1 | 2/2004 | Kaku | |
| 6,725,281 B1 | 4/2004 | Zintel | |
| 6,807,306 B1 | 10/2004 | Girgensohn et al. | |
| 6,819,394 B1 | 11/2004 | Nomura et al. | |
| 6,856,997 B2 | 2/2005 | Lee et al. | |
| 6,859,496 B1 | 2/2005 | Boroczky et al. | |
| 6,917,652 B2 | 7/2005 | Lyu | |
| 6,944,621 B1 | 9/2005 | Collart | |
| 6,944,629 B1 | 9/2005 | Shioi et al. | |
| 6,956,901 B2 | 10/2005 | Boroczky et al. | |
| 6,985,588 B1 | 1/2006 | Glick et al. | |
| 6,988,144 B1 | 1/2006 | Luken et al. | |
| 7,120,250 B2 * | 10/2006 | Candelore | H04N 5/783 380/200 |
| 7,127,155 B2 | 10/2006 | Ando et al. | |
| 7,209,892 B1 | 4/2007 | Galuten et al. | |
| 7,237,061 B1 | 6/2007 | Boic | |
| 7,242,772 B1 | 7/2007 | Tehranchi | |
| 7,246,127 B2 | 7/2007 | Murakami et al. | |
| 7,330,875 B1 | 2/2008 | Parasnis et al. | |
| 7,340,528 B2 | 3/2008 | Noblecourt et al. | |
| 7,356,245 B2 | 4/2008 | Belknap et al. | |
| 7,366,788 B2 | 4/2008 | Jones et al. | |
| 7,376,233 B2 * | 5/2008 | Candelore | H04N 7/162 380/217 |
| 7,380,120 B1 * | 5/2008 | Garcia | G06F 21/6209 380/200 |
| 7,457,359 B2 | 11/2008 | Mabey et al. | |
| 7,478,325 B2 | 1/2009 | Foehr | |
| 7,493,018 B2 | 2/2009 | Kim | |
| 7,499,938 B2 | 3/2009 | Collart | |
| 7,519,274 B2 * | 4/2009 | Li | G11B 20/00086 348/462 |
| 7,681,035 B1 * | 3/2010 | Ayars | G06F 21/10 713/165 |
| 7,869,691 B2 | 1/2011 | Kelly et al. | |
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,311,115 B2 | 11/2012 | Gu et al. | |
| 8,321,556 B1 | 11/2012 | Chatterjee et al. | |
| 8,386,621 B2 | 2/2013 | Park | |
| 8,456,380 B2 | 6/2013 | Pagan | |
| 8,472,792 B2 | 6/2013 | Butt et al. | |
| 8,731,369 B2 * | 5/2014 | Li | G11B 20/00086 386/244 |
| RE45,052 E | 7/2014 | Li | |

(56) References Cited

U.S. PATENT DOCUMENTS

| | | | |
|---|---|---|---|
| 8,914,534 B2 | 12/2014 | Braness et al. | |
| 9,025,659 B2 | 5/2015 | Soroushian et al. | |
| 9,369,687 B2 | 6/2016 | Braness et al. | |
| 9,420,287 B2 | 8/2016 | Butt et al. | |
| 10,032,485 B2 | 7/2018 | Ahsan et al. | |
| 2001/0030710 A1 | 10/2001 | Werner | |
| 2002/0034252 A1 | 3/2002 | Owen et al. | |
| 2002/0051494 A1 | 5/2002 | Yamaguchi et al. | |
| 2002/0062313 A1 | 5/2002 | Lee et al. | |
| 2002/0076112 A1 | 6/2002 | Devara | |
| 2002/0087569 A1 | 7/2002 | Fischer et al. | |
| 2002/0091665 A1 | 7/2002 | Beek et al. | |
| 2002/0093571 A1 | 7/2002 | Hyodo | |
| 2002/0110193 A1 | 8/2002 | Yoo et al. | |
| 2002/0118953 A1 | 8/2002 | Kim | |
| 2002/0143413 A1 | 10/2002 | Fay et al. | |
| 2002/0143547 A1 | 10/2002 | Fay et al. | |
| 2002/0147980 A1 | 10/2002 | Satoda | |
| 2002/0161462 A1 | 10/2002 | Fay et al. | |
| 2002/0180929 A1 | 12/2002 | Tseng et al. | |
| 2002/0184129 A1 | 12/2002 | Arena et al. | |
| 2002/0184159 A1 | 12/2002 | Tadayon et al. | |
| 2002/0184842 A1 | 12/2002 | Sabet-Sharghi et al. | |
| 2002/0191112 A1 | 12/2002 | Akiyoshi et al. | |
| 2002/0191960 A1 | 12/2002 | Fujinami et al. | |
| 2003/0001964 A1 | 1/2003 | Masukura et al. | |
| 2003/0002578 A1 | 1/2003 | Tsukagoshi et al. | |
| 2003/0005442 A1 | 1/2003 | Brodersen et al. | |
| 2003/0035488 A1 | 2/2003 | Barrau | |
| 2003/0078930 A1 | 4/2003 | Surcouf et al. | |
| 2003/0093799 A1 | 5/2003 | Kauffman et al. | |
| 2003/0123855 A1 | 7/2003 | Okada et al. | |
| 2003/0128296 A1 | 7/2003 | Lee | |
| 2003/0133506 A1 | 7/2003 | Haneda | |
| 2003/0152370 A1 | 8/2003 | Otomo et al. | |
| 2003/0159139 A1* | 8/2003 | Candelore | H04N 7/162 725/25 |
| 2003/0165328 A1 | 9/2003 | Grecia | |
| 2003/0182297 A1 | 9/2003 | Murakami et al. | |
| 2003/0185302 A1 | 10/2003 | Abrams | |
| 2003/0185542 A1 | 10/2003 | McVeigh et al. | |
| 2003/0188182 A1 | 10/2003 | Sato et al. | |
| 2003/0206558 A1 | 11/2003 | Parkkinen et al. | |
| 2003/0212993 A1 | 11/2003 | Obrador | |
| 2003/0216922 A1 | 11/2003 | Gonzales et al. | |
| 2003/0231863 A1 | 12/2003 | Eerenberg et al. | |
| 2003/0231867 A1 | 12/2003 | Gates et al. | |
| 2003/0236836 A1 | 12/2003 | Borthwick | |
| 2004/0006701 A1 | 1/2004 | Kresina | |
| 2004/0021684 A1 | 2/2004 | Millner | |
| 2004/0025180 A1 | 2/2004 | Begeja et al. | |
| 2004/0047614 A1 | 3/2004 | Green | |
| 2004/0052501 A1 | 3/2004 | Tam | |
| 2004/0071453 A1 | 4/2004 | Valderas | |
| 2004/0114687 A1 | 6/2004 | Ferris et al. | |
| 2004/0117347 A1 | 6/2004 | Seo et al. | |
| 2004/0136698 A1 | 7/2004 | Mock | |
| 2004/0143760 A1 | 7/2004 | Alkove et al. | |
| 2004/0146276 A1 | 7/2004 | Ogawa | |
| 2004/0217971 A1 | 11/2004 | Kim | |
| 2004/0255236 A1 | 12/2004 | Collart | |
| 2005/0015797 A1 | 1/2005 | Noblecourt et al. | |
| 2005/0019014 A1 | 1/2005 | Yoo et al. | |
| 2005/0038826 A1 | 2/2005 | Bae et al. | |
| 2005/0055399 A1 | 3/2005 | Savchuk | |
| 2005/0078948 A1 | 4/2005 | Yoo et al. | |
| 2005/0123283 A1 | 6/2005 | Li et al. | |
| 2005/0180641 A1 | 8/2005 | Clark | |
| 2005/0192904 A1* | 9/2005 | Candelore | H04L 9/0861 705/51 |
| 2005/0193070 A1 | 9/2005 | Brown et al. | |
| 2005/0193322 A1 | 9/2005 | Lamkin et al. | |
| 2005/0196147 A1 | 9/2005 | Seo et al. | |
| 2005/0207442 A1 | 9/2005 | van Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0078301 A1 | 4/2006 | Ikeda et al. | |
| 2006/0093320 A1 | 5/2006 | Hallberg et al. | |
| 2006/0129909 A1 | 6/2006 | Butt et al. | |
| 2006/0168639 A1 | 7/2006 | Gan et al. | |
| 2006/0173887 A1 | 8/2006 | Breitfeld et al. | |
| 2006/0181965 A1 | 8/2006 | Collart | |
| 2006/0235880 A1 | 10/2006 | Qian | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2006/0267986 A1 | 11/2006 | Bae | |
| 2006/0274835 A1 | 12/2006 | Hamilton et al. | |
| 2007/0005333 A1 | 1/2007 | Setiohardjo et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0140647 A1 | 6/2007 | Kusunoki et al. | |
| 2007/0154165 A1 | 7/2007 | Hemmeryckz-Deleersnijder et al. | |
| 2007/0168287 A1* | 7/2007 | McCarthy | G06Q 30/06 705/51 |
| 2007/0168541 A1 | 7/2007 | Gupta et al. | |
| 2007/0168542 A1 | 7/2007 | Gupta et al. | |
| 2007/0180125 A1 | 8/2007 | Knowles et al. | |
| 2007/0239839 A1 | 10/2007 | Buday et al. | |
| 2007/0292107 A1 | 12/2007 | Yahata et al. | |
| 2008/0101466 A1 | 5/2008 | Swenson et al. | |
| 2008/0104633 A1 | 5/2008 | Noblecourt et al. | |
| 2008/0120330 A1 | 5/2008 | Reed et al. | |
| 2008/0120342 A1 | 5/2008 | Reed et al. | |
| 2008/0126248 A1 | 5/2008 | Lee et al. | |
| 2008/0137736 A1 | 6/2008 | Richardson et al. | |
| 2008/0177775 A1 | 7/2008 | Kawate et al. | |
| 2008/0192818 A1 | 8/2008 | DiPietro et al. | |
| 2008/0256105 A1 | 10/2008 | Nogawa et al. | |
| 2008/0263354 A1 | 10/2008 | Beuque et al. | |
| 2008/0279535 A1 | 11/2008 | Hague et al. | |
| 2008/0294691 A1 | 11/2008 | Chang et al. | |
| 2008/0310496 A1 | 12/2008 | Fang | |
| 2009/0031220 A1 | 1/2009 | Tranchant et al. | |
| 2009/0037959 A1 | 2/2009 | Suh et al. | |
| 2009/0060452 A1 | 3/2009 | Chaudhri | |
| 2009/0066839 A1 | 3/2009 | Jung et al. | |
| 2009/0132599 A1 | 5/2009 | Soroushian et al. | |
| 2009/0132721 A1 | 5/2009 | Soroushian et al. | |
| 2009/0150557 A1 | 6/2009 | Wormley et al. | |
| 2009/0169181 A1 | 7/2009 | Priyadarshi et al. | |
| 2009/0201988 A1 | 8/2009 | Gazier et al. | |
| 2009/0226148 A1 | 9/2009 | Nesvadba et al. | |
| 2009/0293116 A1 | 11/2009 | DeMello | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2010/0040351 A1 | 2/2010 | Toma et al. | |
| 2010/0094969 A1 | 4/2010 | Zuckerman et al. | |
| 2010/0095121 A1 | 4/2010 | Shetty et al. | |
| 2010/0111192 A1 | 5/2010 | Graves | |
| 2010/0158109 A1 | 6/2010 | Dahlby et al. | |
| 2010/0189183 A1 | 7/2010 | Gu et al. | |
| 2010/0228795 A1 | 9/2010 | Hahn | |
| 2011/0055585 A1 | 3/2011 | Lee | |
| 2011/0080940 A1 | 4/2011 | Bocharov | |
| 2011/0126191 A1 | 5/2011 | Hughes et al. | |
| 2011/0129011 A1 | 6/2011 | Cilli et al. | |
| 2011/0142415 A1 | 6/2011 | Rhyu | |
| 2011/0150100 A1 | 6/2011 | Abadir | |
| 2011/0153785 A1 | 6/2011 | Minborg et al. | |
| 2011/0239078 A1 | 9/2011 | Luby et al. | |
| 2011/0246659 A1 | 10/2011 | Bouazizi | |
| 2011/0268178 A1 | 11/2011 | Park et al. | |
| 2011/0302319 A1 | 12/2011 | Ha et al. | |
| 2011/0305273 A1 | 12/2011 | He et al. | |
| 2011/0314176 A1 | 12/2011 | Frojdh et al. | |
| 2011/0314500 A1 | 12/2011 | Gordon | |

(56) References Cited

U.S. PATENT DOCUMENTS

| | | |
|---|---|---|
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0278496 A1 | 11/2012 | Hsu |
| 2012/0307883 A1 | 12/2012 | Graves |
| 2013/0044821 A1 | 2/2013 | Braness et al. |
| 2013/0046902 A1 | 2/2013 | Villegas Nuñez et al. |
| 2013/0055084 A1 | 2/2013 | Soroushian et al. |
| 2013/0061045 A1 | 3/2013 | Kiefer et al. |
| 2013/0196292 A1 | 8/2013 | Brennen et al. |
| 2014/0211840 A1 | 7/2014 | Butt et al. |
| 2014/0250473 A1 | 9/2014 | Braness et al. |
| 2015/0104153 A1 | 4/2015 | Braness et al. |
| 2017/0004862 A1 | 1/2017 | Soroushian et al. |
| 2017/0025157 A1 | 1/2017 | Ahsan et al. |

FOREIGN PATENT DOCUMENTS

| | | |
|---|---|---|
| CN | 1723696 | 1/2006 |
| CN | 1873820 A | 12/2006 |
| EP | 644692 A2 | 3/1995 |
| EP | 0677961 A2 | 10/1995 |
| EP | 757484 A2 | 2/1997 |
| EP | 813167 A2 | 12/1997 |
| EP | 1420580 A1 | 5/2004 |
| EP | 1692859 A2 | 8/2006 |
| EP | 1718074 A1 | 11/2006 |
| HK | 1112988 A | 9/2008 |
| JP | 07334938 A | 12/1995 |
| JP | 08163488 A | 6/1996 |
| JP | 08287613 A | 11/1996 |
| JP | 11328929 A | 11/1999 |
| JP | 02001043668 A | 2/2001 |
| JP | 2002170363 A | 6/2002 |
| JP | 2002218384 A | 8/2002 |
| JP | 2003023607 A | 1/2003 |
| JP | 2003250113 A | 9/2003 |
| JP | 2005027153 | 1/2005 |
| JP | 2007532044 A | 11/2007 |
| JP | 2012019548 A | 1/2012 |
| JP | 2013013146 A | 1/2013 |
| JP | 5589043 B2 | 8/2014 |
| JP | 2014233086 A | 12/2014 |
| KR | 0221423 D1 | 9/1999 |
| KR | 100221423 B1 | 9/1999 |
| KR | 2002013664 | 2/2002 |
| KR | 1020020064888 A | 8/2002 |
| KR | 20060122893 A | 11/2006 |
| KR | 20110124325 A | 11/2011 |
| KR | 101127407 B1 | 3/2012 |
| KR | 20130006717 A | 1/2013 |
| KR | 101380262 B1 | 4/2014 |
| KR | 101380265 B1 | 4/2014 |
| TR | 201508443 T4 | 8/2015 |
| WO | 1995015660 A1 | 6/1995 |
| WO | 1998046005 A2 | 10/1998 |
| WO | 1999037072 A2 | 7/1999 |
| WO | 0126377 A1 | 4/2001 |
| WO | 2001031497 A1 | 5/2001 |
| WO | 2001050732 A2 | 7/2001 |
| WO | 2002001880 A1 | 1/2002 |
| WO | 03098475 A1 | 11/2003 |
| WO | 2004054247 A1 | 6/2004 |
| WO | 2004097811 A1 | 11/2004 |
| WO | 2004102571 A1 | 11/2004 |
| WO | 2005057906 A2 | 6/2005 |
| WO | 2007026837 A1 | 3/2007 |
| WO | 2009065137 A1 | 5/2009 |
| WO | 2010060106 A1 | 5/2010 |
| WO | 2010122447 A1 | 10/2010 |
| WO | 2012094171 A1 | 7/2012 |
| WO | 20120094181 A2 | 7/2012 |
| WO | 20120094189 A1 | 7/2012 |

OTHER PUBLICATIONS

European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP15162562.1, Report Completed Jul. 21, 2015, dated Jul. 29, 2015, 4 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pgs.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application No. PCT/US2004/041667, Report dated Jul. 10, 2007, 7 pgs.
International Preliminary Report on Patentability for International Application No. PCT/US2008/083816, dated May 18, 2010, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
ISO/IEC 14496-2:2001(E), Information technology—Coding of audio-visual objects, Part 2: Visual, Dec. 1, 2001, Annex A.1, section 7.4.1., section, 7.4.3., section 7.6.3, section 7.7.1., Annex B, (presented in 5 parts), part 1 of 5, 100 pgs.
ISO/IEC 14496-2:2001(E), Information technology—Coding of audio-visual objects, Part 2: Visual, Dec. 1, 2001, Annex A.1, section 7.4.1., section, 7.4.3., section 7.6.3, section 7.7.1., Annex B, (presented in 5 parts), part 2 of 5, 100 pgs.
ISO/IEC 14496-2:2001(E), Information technology—Coding of audio-visual objects, Part 2: Visual, Dec. 1, 2001, Annex A.1, section 7.4.1., section, 7.4.3., section 7.6.3, section 7.7.1., Annex B, (presented in 5 parts), part 3 of 5, 100 pgs.
ISO/IEC 14496-2:2001(E), Information technology—Coding of audio-visual objects, Part 2: Visual, Dec. 1, 2001, Annex A.1, section 7.4.1., section, 7.4.3., section 7.6.3, section 7.7.1., Annex B, (presented in 5 parts), part 4 of 5, 125 pgs.
ISO/IEC 14496-2:2001(E), Information technology—Coding of audio-visual objects, Part 2: Visual, Dec. 1, 2001, Annex A.1, section 7.4.1., section, 7.4.3., section 7.6.3, section 7.7.1., Annex B, (presented in 5 parts), part 5 of 5, 111 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.

(56) References Cited

OTHER PUBLICATIONS

Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 23 pgs.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
Microsoft Windows® XP Media Center Edition 2005, Frequently asked Questions, printed May 4, 2007 from http://www.microsoft.com/windowsxp/mediacenter/evaluation/faq.mspx, 6 pgs.
Microsoft Windows® XP Media Center Edition 2005: Features, printed May 9, 2007, from http://www.microsoft.com/windowsxp/mediacenter/evaluation/features.mspx, 4 pgs.
Open DML AVI-M-JPEG File Format Subcommittee, "Open DML AVI File Format Extensions", Version 1.02, Feb. 28, 1996, 29 pgs.
pc world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/about.php, 1 page.
Supplementary European Search Report for Application No. EP 04813918, Search Completed Dec. 19, 2012, 3 pgs.
Transmission of Non-Telephone Signals, Video Coding for Low Bit Rate Communication, ITU-T Recommendation H.263, ITU-T Telecommunication Standardization Sector of ITU, Mar. 1996, 52 pgs.
W3C, Eds. Klyne, G. et al., Resource Description Framework (RDF): Concepts and Abstract Syntax, Section 3.3, Oct 10, 2003, available online at https://www.w3.org/TR/2003/WD-rdf-concepts-20031010/#section-Datatypes-intro, 21 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Extended European Search Report for European Application EP08849996.7, Report Completed Dec. 19, 2014, dated Jan. 23, 2015, Jan. 23, 2015, 7 pgs.
"OpenDML AVI File Format Extensions", XP002179318,Retrieved from the Internet: URL:http://www.rahul.net/jfm/odmlff2.pdf [retrieved on Oct. 4, 2001], Sep. 1997, 42 pgs.
"Adaptive Streaming Comparison", Jan. 28, 2010, 5 pgs.
"AVI", OpenNET, Mar. 5, 2003, available at https://web.archive.org/web/20030305042201/http://www.opennet.ru/docs/formats/avi.txt, 21 pgs.
"AVI files and common problems", virtualdub.org, Current version: v1.10.4Nov. 11, 2004, Retrieved from: http://www.virtualdub.org/blog/pivot/entry.php?id=25, 14 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"DCMI Metadata Terms: A complete historical record", Dublin Core Metadata Initiative, Dec. 18, 2006, showing Term name: title, version 004, Date modified Oct. 14, 2002, available at http://dublincore.org/usage/terms/history/#title-004, 99 pgs.
"DVD-MPeg differences", printed Jul. 2, 2009 from http://dvd.sourceforge.net/dvdinfo/dvdmpeg.html, 1 page.
"DVD subtitles", sam.zoy.org/writings/dvd/subtitles, dated Jan. 9, 2001, printed Jul. 2, 2009, 4 pgs.

"Final Committee Draft of MPEG-4 streaming text format", International Organisation for Standardisation, Feb. 2004, 22 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Innovation of technology arrived", I-O Data, Nov. 2004, Retrieved from http://www.iodata.com/catalogs/AVLP2DVDLA_Flyer200505.pdf on May 30, 2013, 2 pgs., I-O Data, 2 pgs.
"ISO/IEC 8859-1", Wikipedia, Last updated Aug. 8, 2017, Retrieved from: https://en.wikipedia.org/wiki/ISO/IEC_8859-1, 8 pgs.
"KISS Players," KISS DP-500, retrieved from http://www.kiss-technology.com/?p=dp500 on May 4, 2007, 1 page.
"Multimedia Programming Interface and Data Specifications 1.0", IBM Corporation and Microsoft Corporation, Ch. 2 (RIFF), Aug. 1991, 96 pgs.
"Netflix turns on subtitles for PC, MAC streaming", Yahoo! News, Apr. 21, 2010, Printed on Mar. 26, 2014, 3 pgs.
"QCast Tuner for PS2", printed May 11, 2009 from http://web.archive.org/web/20030210120605/www.divx.com/software/detail.php?ie=39, 2 pgs.
"Smooth Streaming Client", The Official Microsoft IIS Site, Sep. 24, 2010, 4 pgs.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC mpeg & ITU-T Vceg(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T Vceg(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
Akhshabi et al., "An Experimental Evaluation of Rate-Adaptation Algorithms in Adaptive Streaming over HTTP", MMSys'11, Feb. 23-25, 2011, 12 pgs.
Alvestrand, "Tags for the Identification of Languages", Jan. 2001, Retrieved from: http://www.ietf.org/rfc/rfc3066.txt, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Blasiak, "Video Transrating and Transcoding: Overview of Video Transrating and Transcoding Technologies", Ingenient Technologies, TI Developer Conference, Aug. 6-8, 2002, 22 pgs.
Bochicchio et al., "X-Presenter: a tool for video-based hypermedia applications", AVI '04 Proceedings of the Working Conference on Advanced Visual Interfaces, May 28, 2004, pp. 437-440, XP002733976, Association for Computing Machinery USA, doi: 10.1145/989863.989945, 4 pgs.

(56) References Cited

OTHER PUBLICATIONS

Casares et al., "Simplifying Video Editing Using Metadata", DIS2002, 2002, pp. 157-166.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Fan et al., "Class View: Hierarchical Video Shot Classification, Indexing, and Accessing", IEEE Transactions on Multimedia, IEEE Service Center, Piscataway, NJ, US, vol. 6, No. 1, Feb. 1, 2004, pp. 70-86, XP011105807, ISSN: 1520-9210, doi: 10.1109/TMM.2003.8195, 18 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 3 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Lee et al., "Uniform Resource Identifiers (URI): Generic Syntax", Aug. 1998, Retrieved from: http://ietf.org/rfc/rfc2396.txt, 35 pgs.
Levkov, "Mobile Encoding Guidelines for Android Powered Devices", Adobe Systems Inc., Addendum B, Dec. 22, 2010, 42 pgs.
Long et al., "Silver: Simplifying Video Editing with Metadata", CHI 2003: New Horizons, Apr. 5-10, 2003, pp. 628-629.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Noboru, "Play Fast and Fine Video on Web! codec", Co.9 No. 12, Dec. 1, 2003, 2 pgs.
Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 51 pgs.
Noe, Alexander "AVI File Format", http://www.alexander-noe.com/video/documentation/avi.pdf, Dec. 14, 2006, 26 pgs.
Noe, Alexander "Definitions", Apr. 11, 2006, retrieved from http://www.alexander-noe.com/video/amg/definitions.html on Oct. 16, 2013, 2 pgs.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pearce, Chris "Indexing keyframes in Ogg videos for fast seeking", Retrieved from: http://blog.pearce.org.nz/2010/01/indexing-keyframes-in-ogg-videos-for.html, Jan. 11, 2010, 4 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Siglin, "HTTP Streaming: What You Need to Know", streamingmedia.com, 2010, 15 pgs.
Siglin, "Unifying Global Video Strategies, MP4 File Fragmentation for Broadcast, Mobile and Web Delivery", Nov. 16, 2011, 16 pgs.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLa&ts=2&tsc, 1 page.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Unknown, "MPEG-4 Video Encoder: Based on International Standard ISO/IEC 14496-2", Patni Computer Systems, Ltd., publication date unknown, 15 pgs.
Wan et al, "Variance-Based Color Image Quantization for Frame Buffer Display", Color Research & Application 15, No. 1 (1990), pp. 52-58.
Zambelli, "IIS Smooth Streaming Technical Overview", Microsoft Corporation, Mar. 2009, 17 pgs.

* cited by examiner

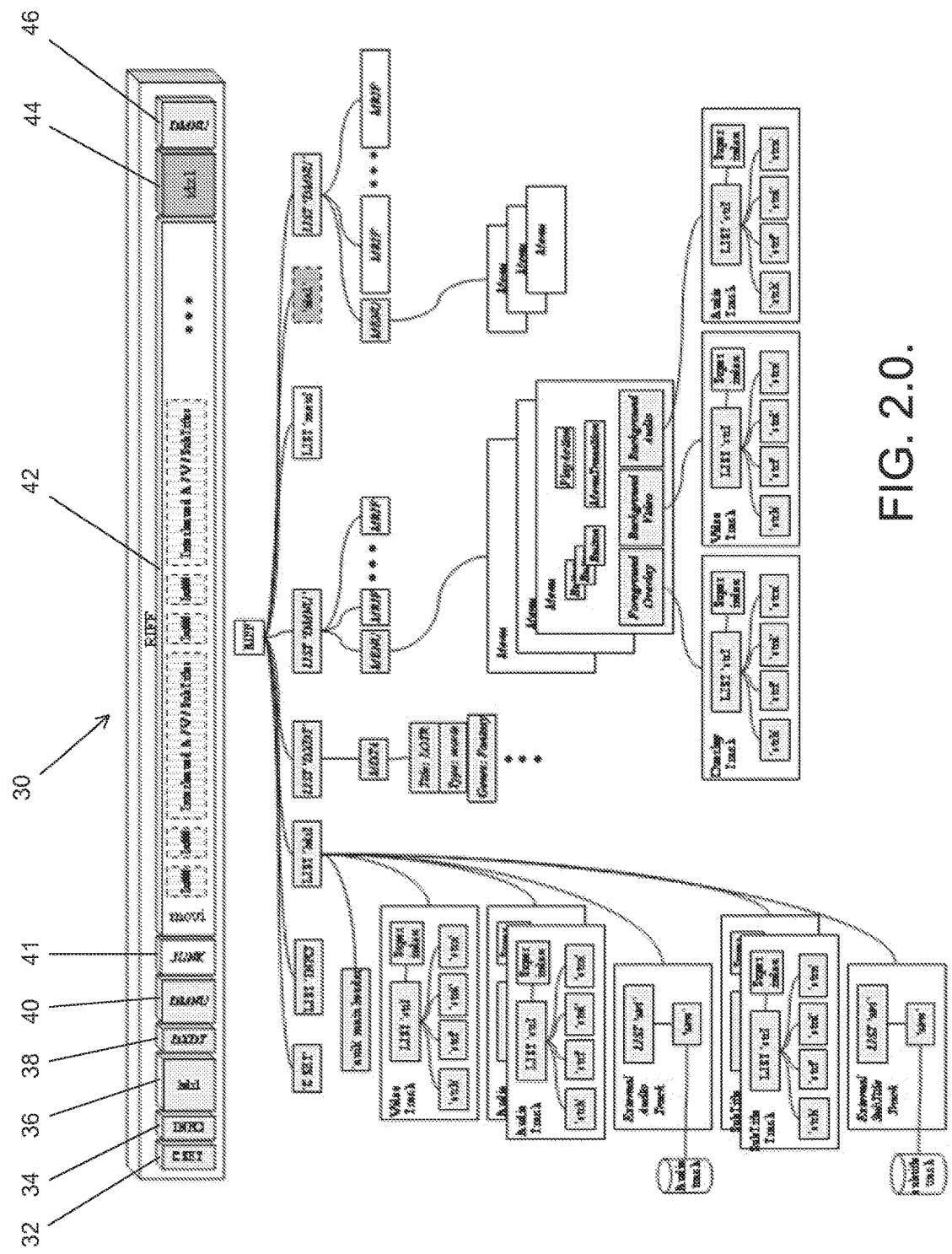
FIG. 2.0.

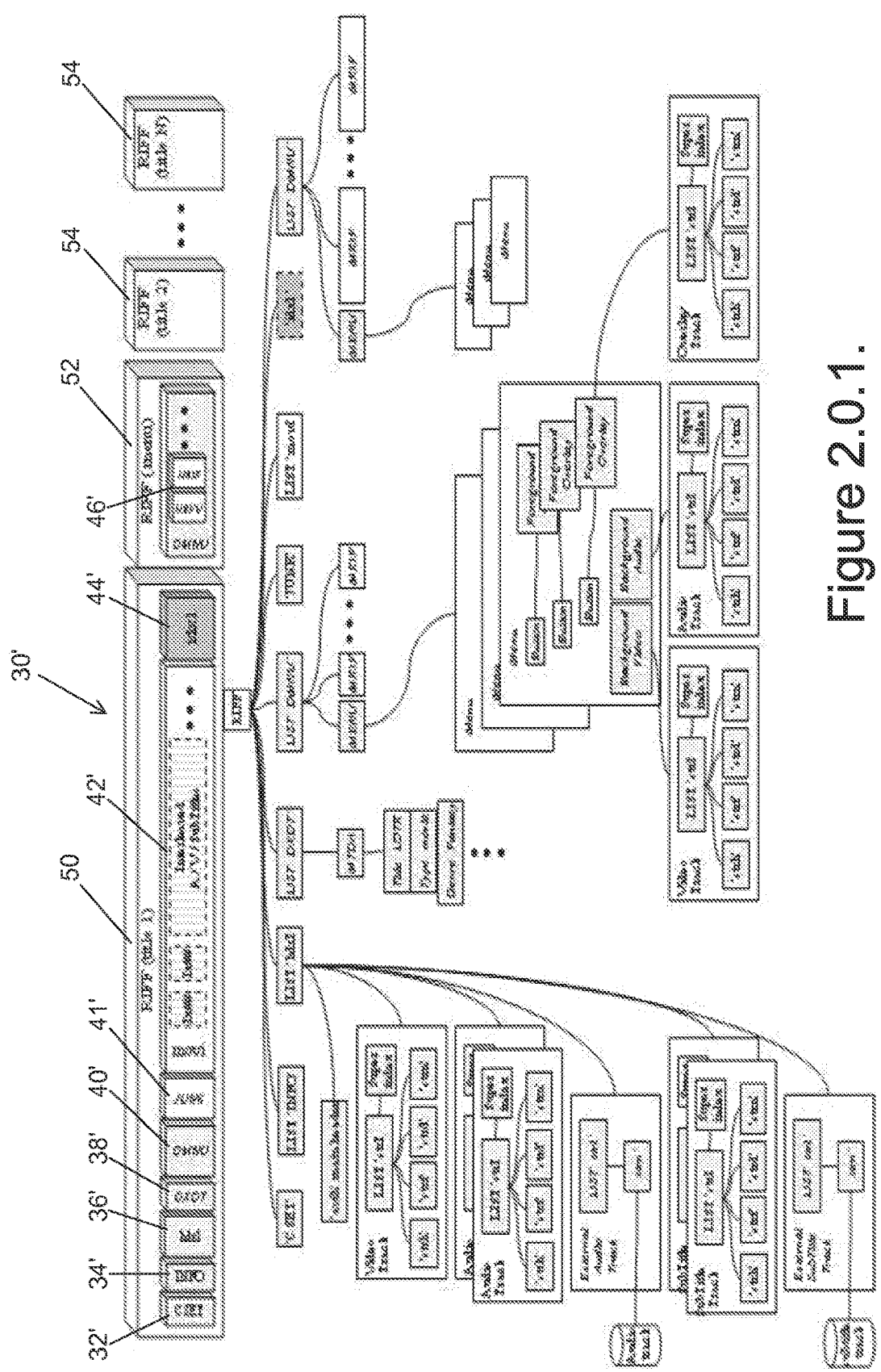
Figure 2.0.1.

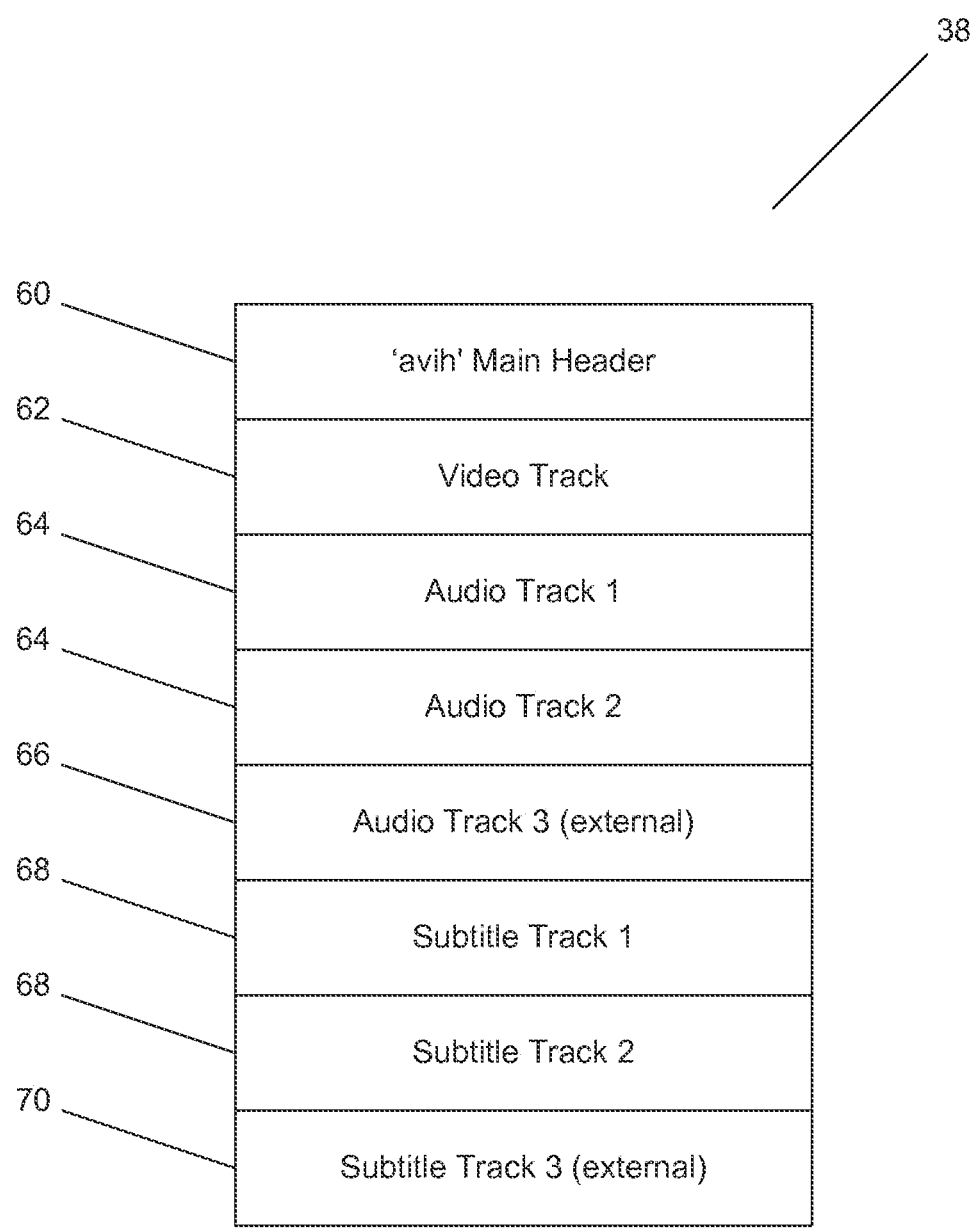
Fig. 2.1.

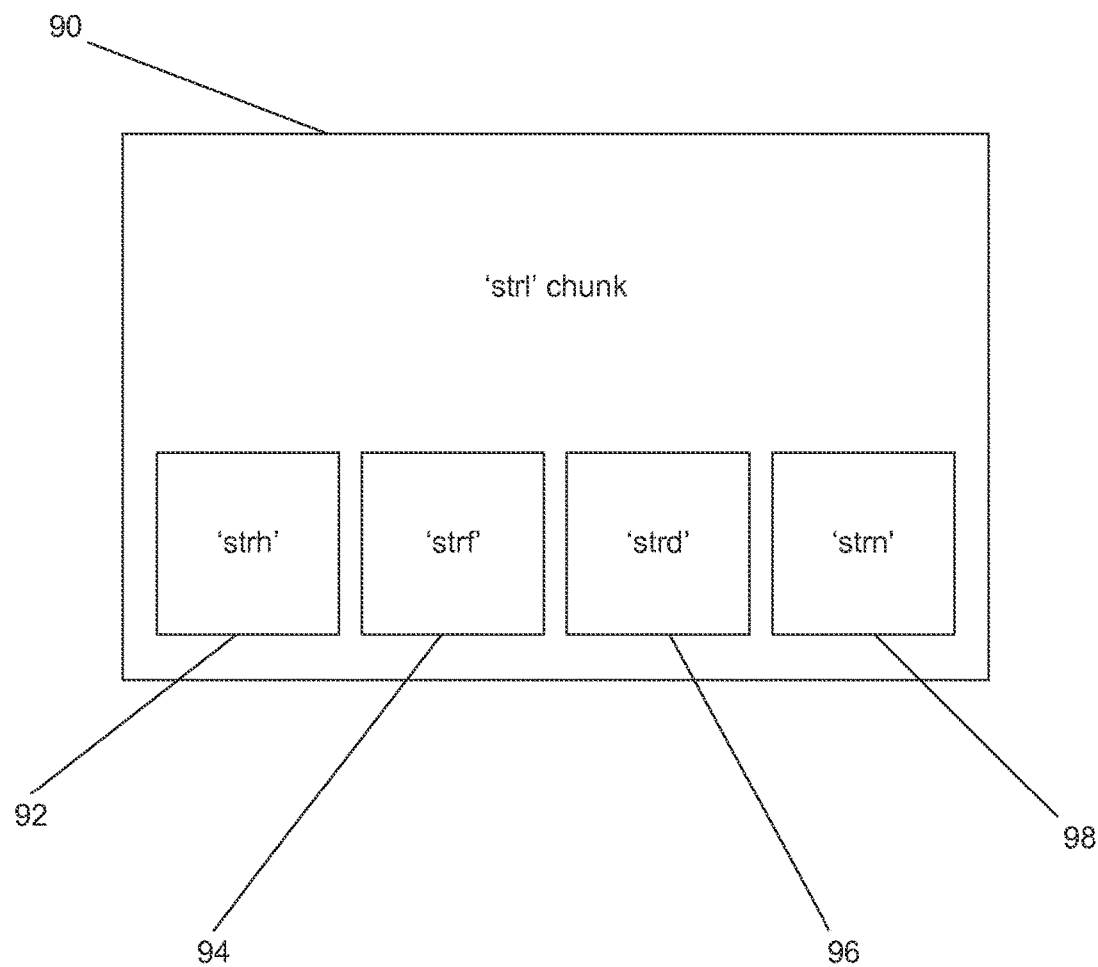
FIG. 2.2.

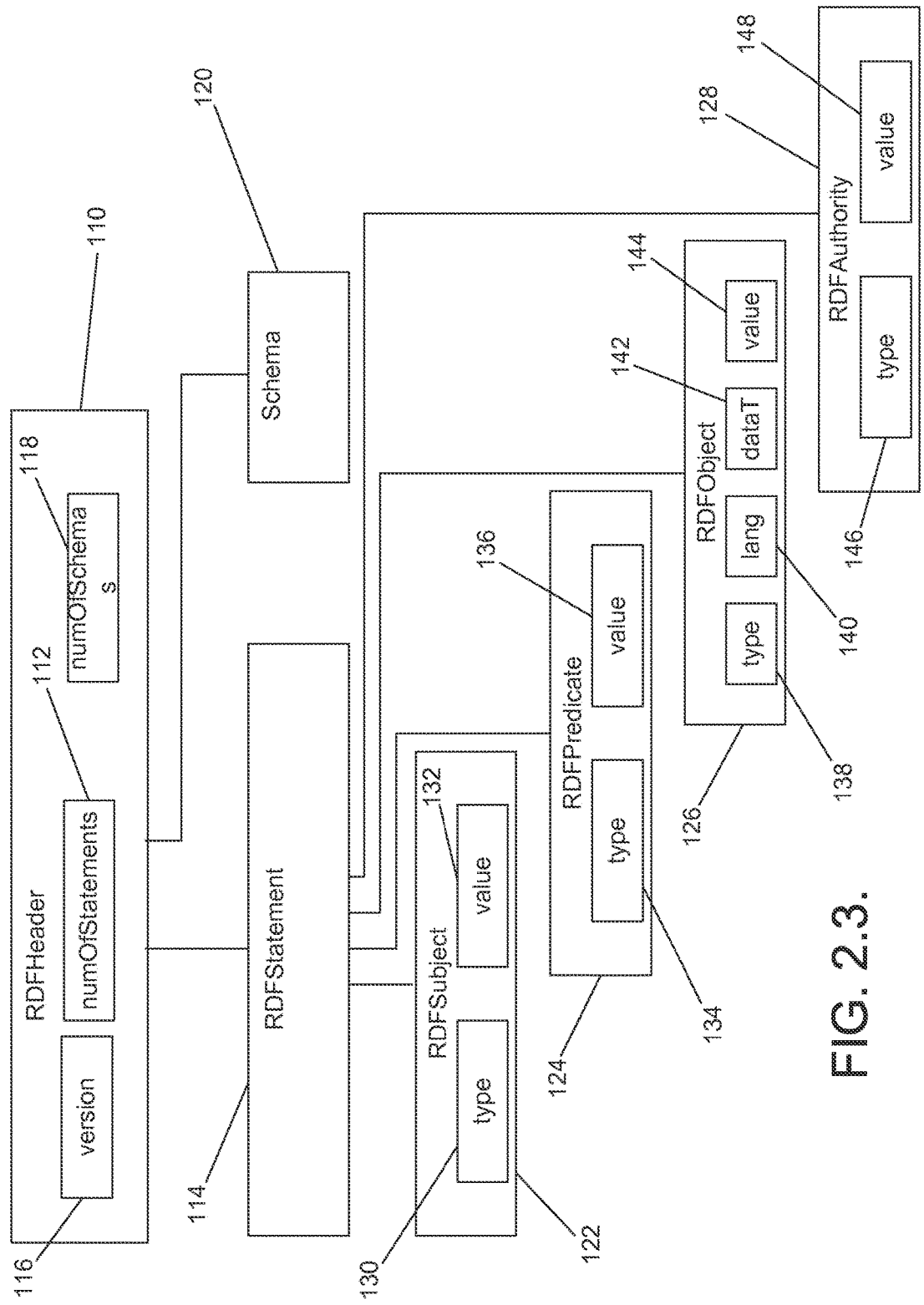
FIG. 2.3.

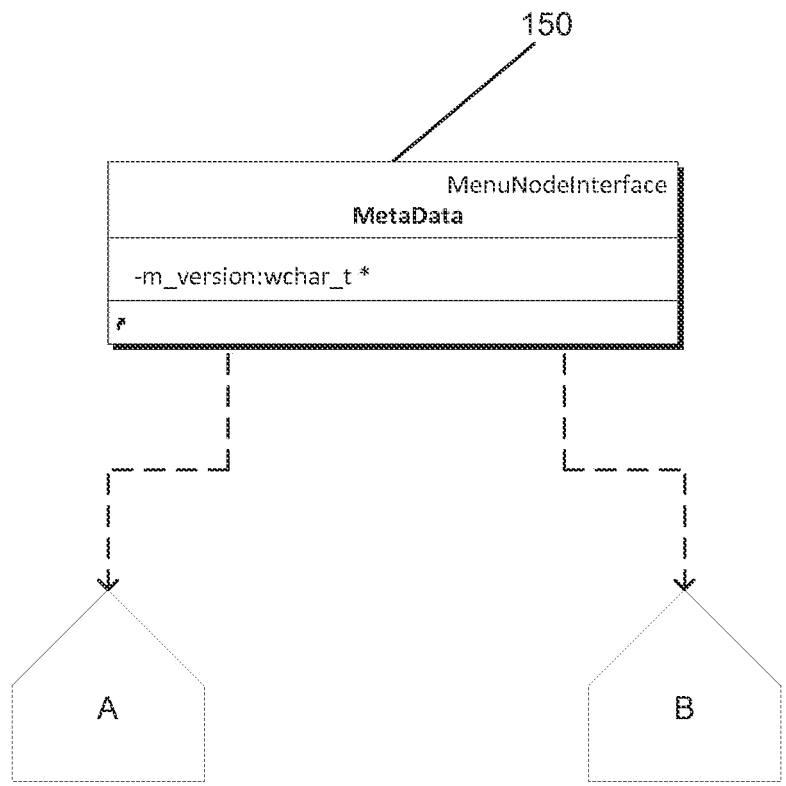
FIG. 2.3.1.

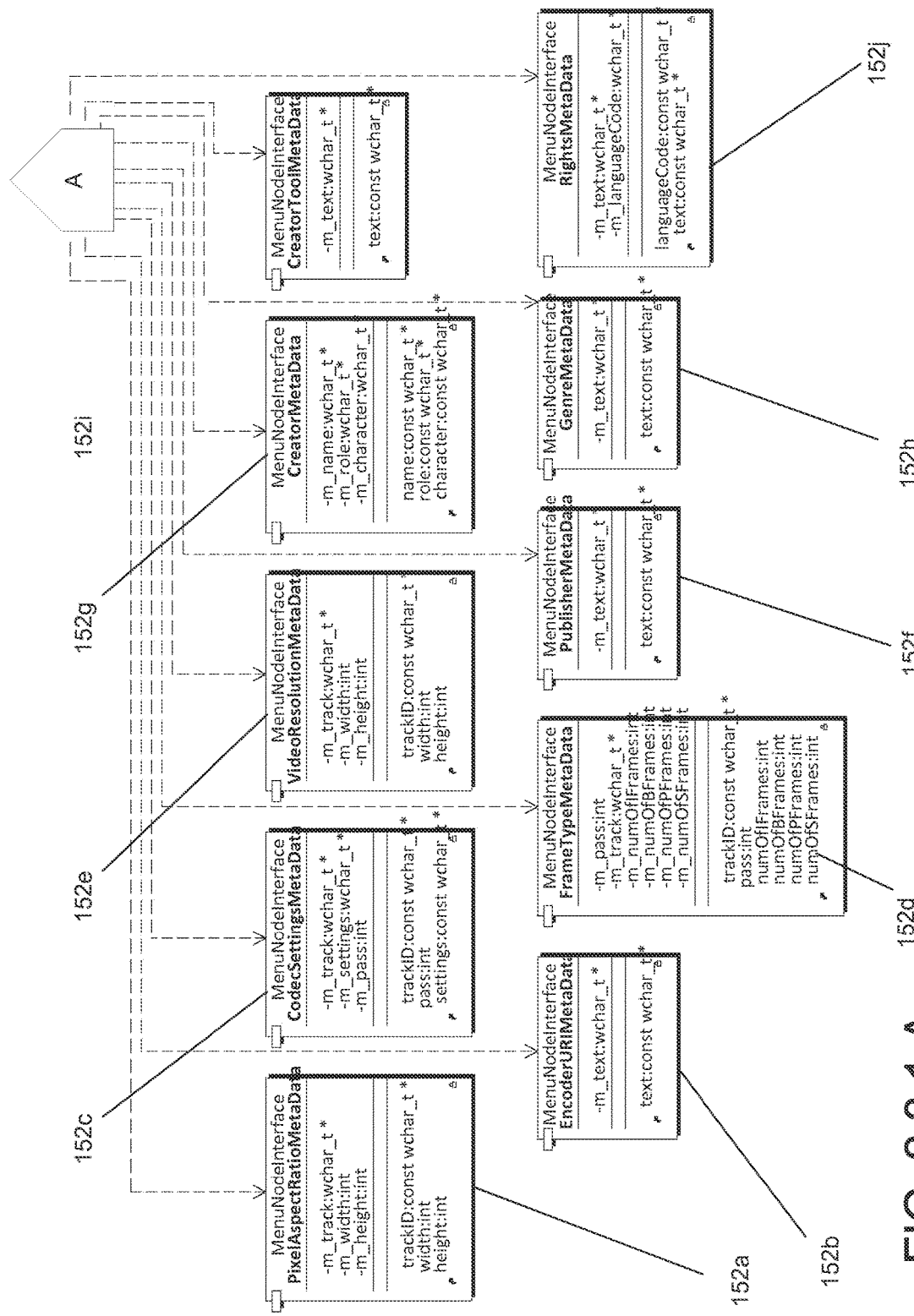
FIG. 2.3.1.A

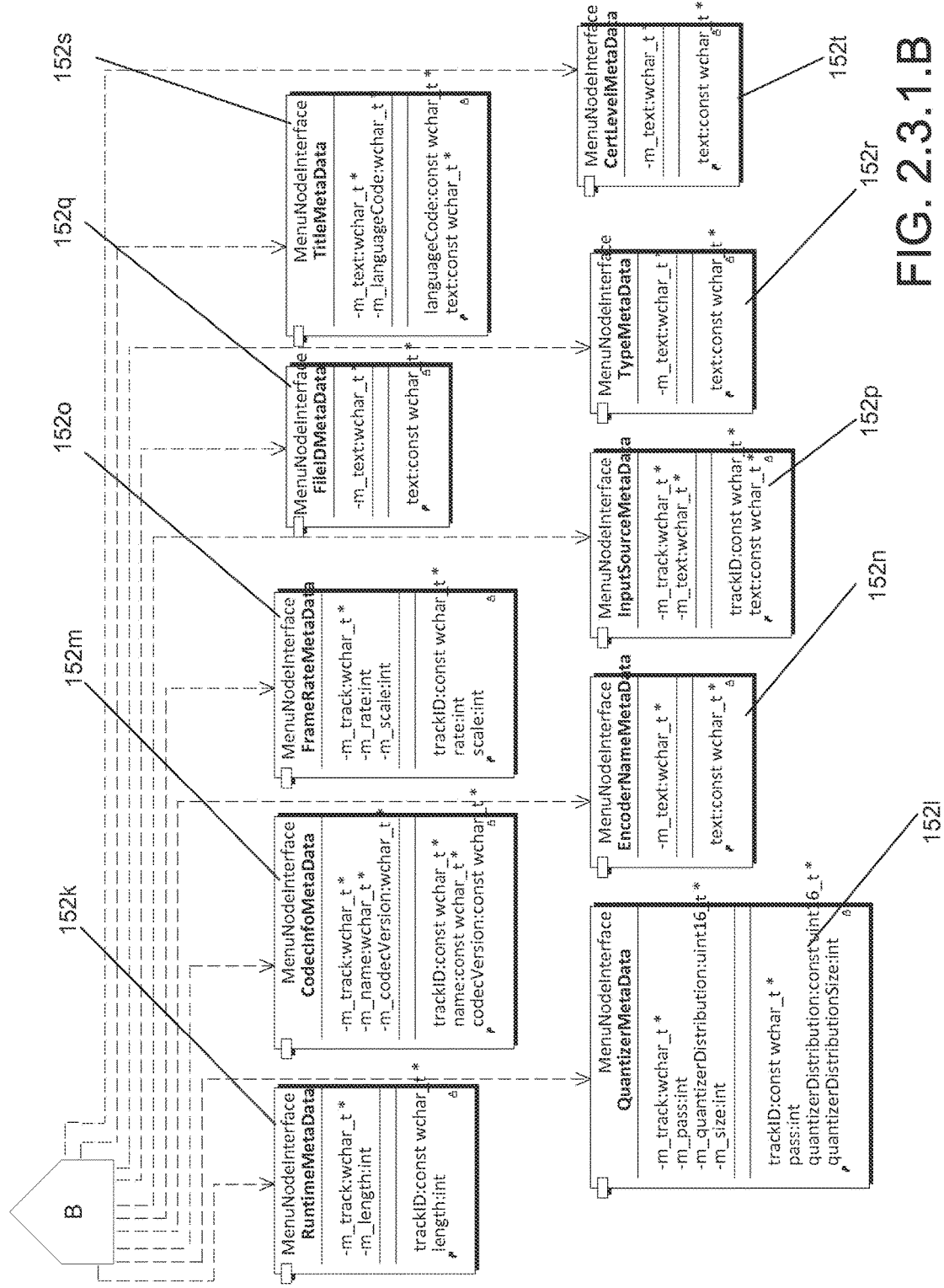

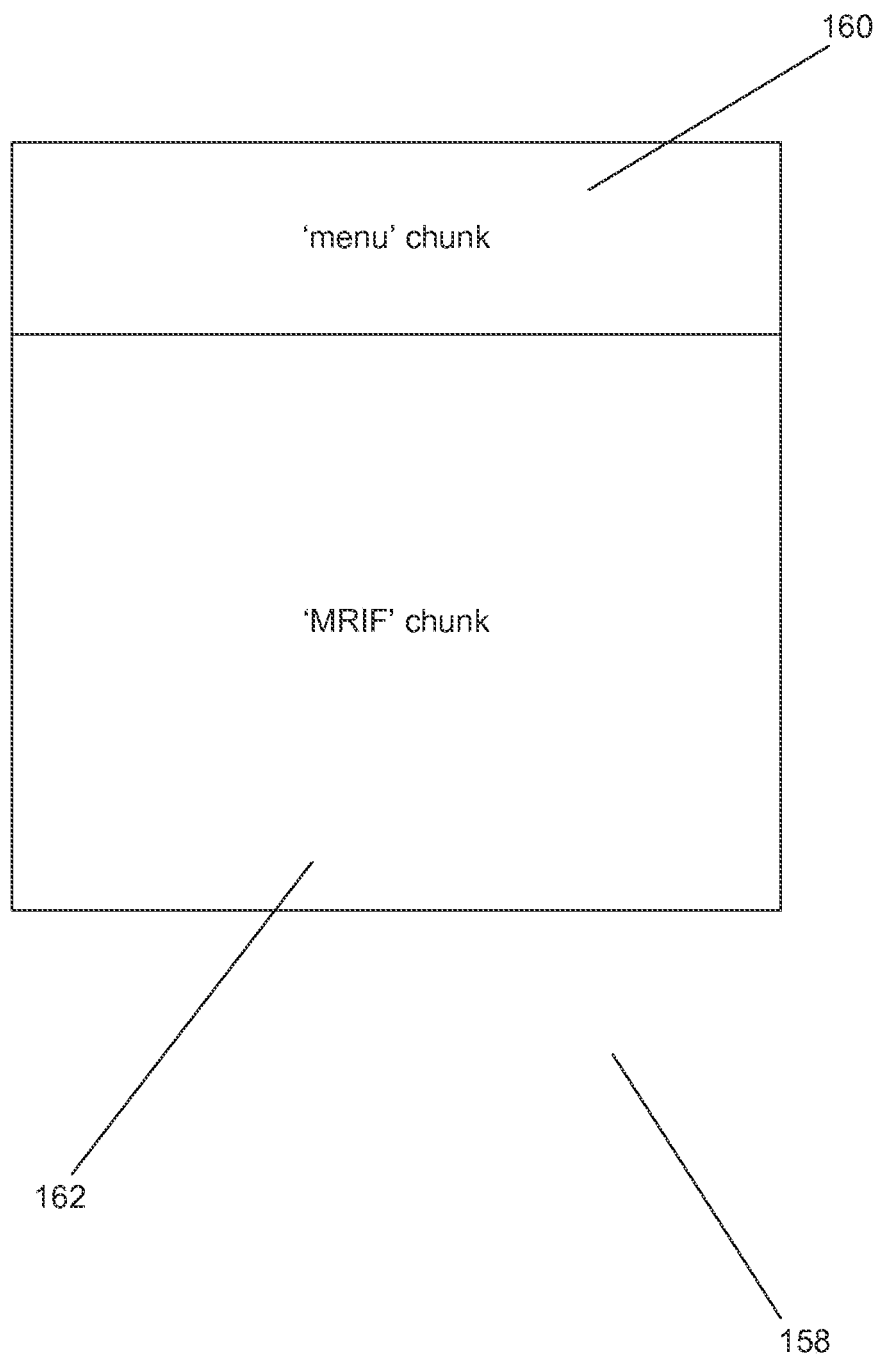
FIG. 2.4.

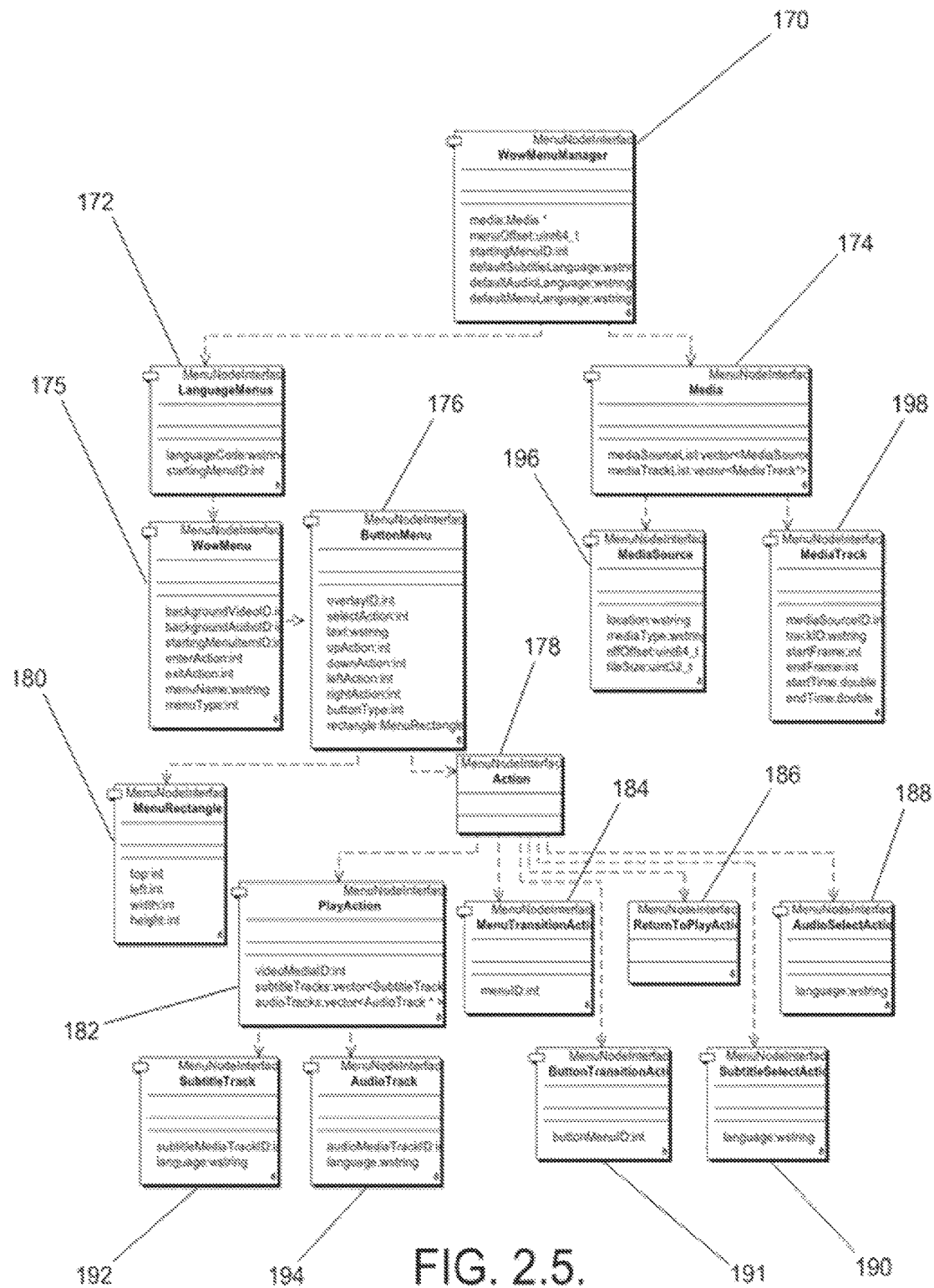
FIG. 2.5.

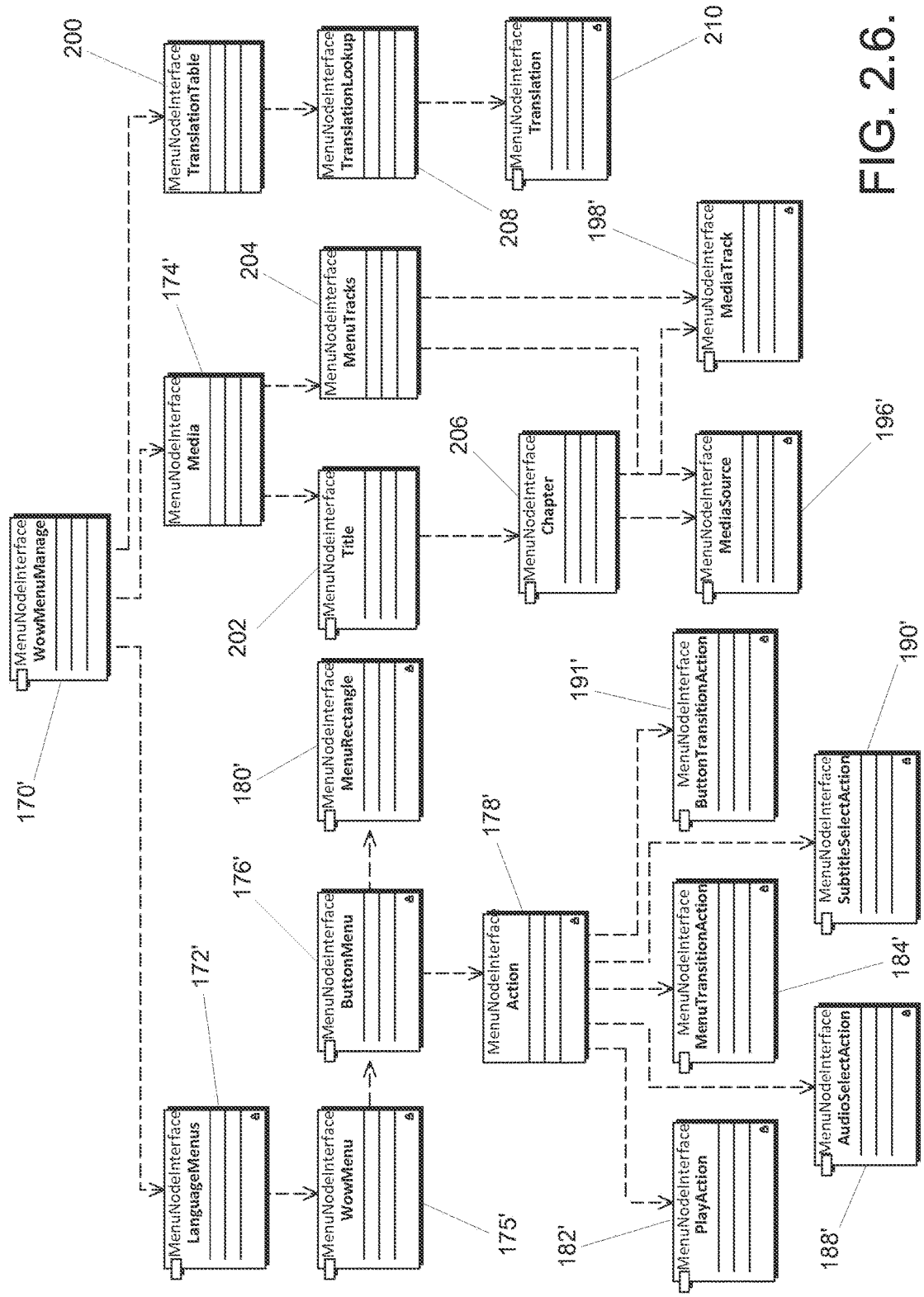
FIG. 2.6.

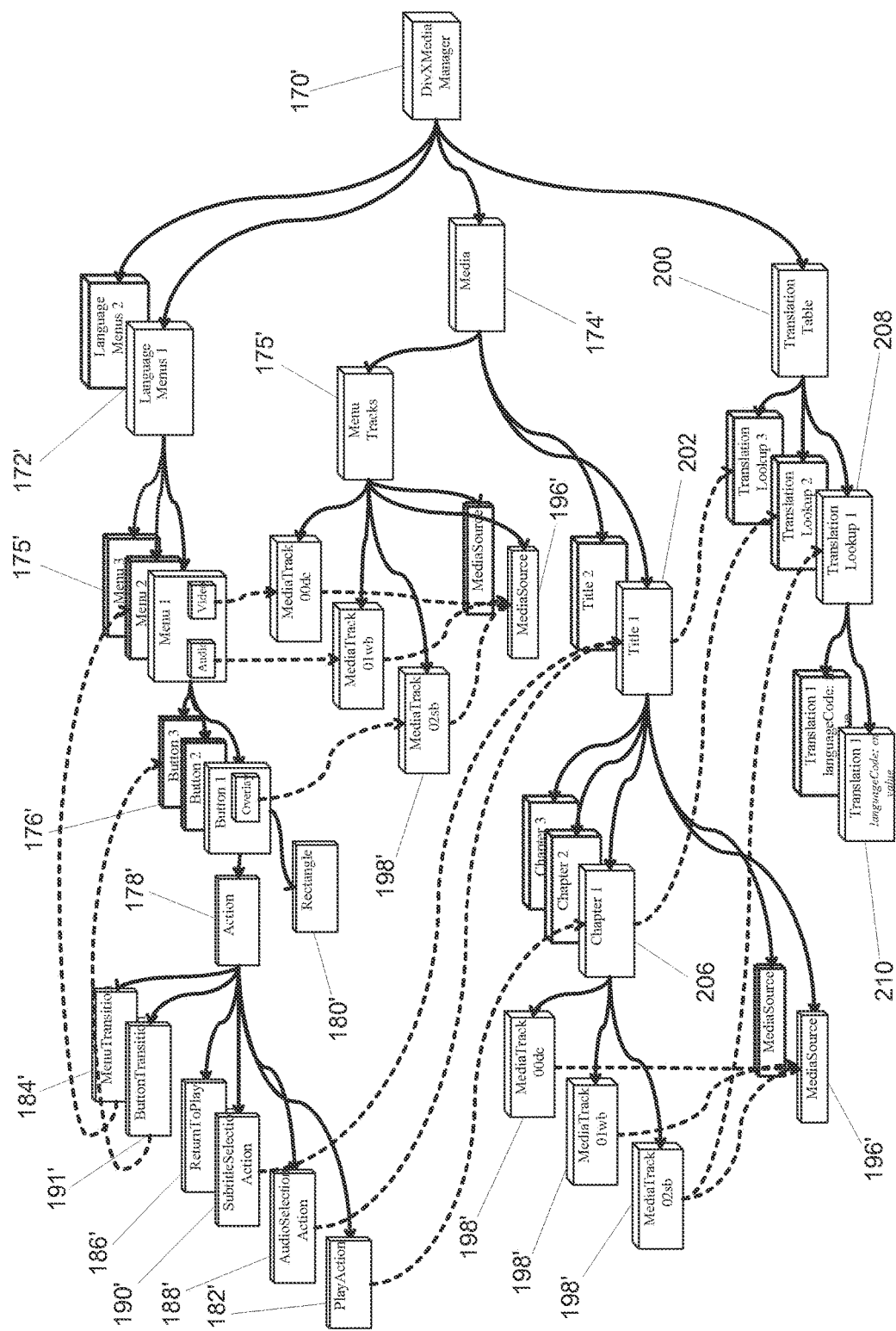
FIG. 2.6.1.

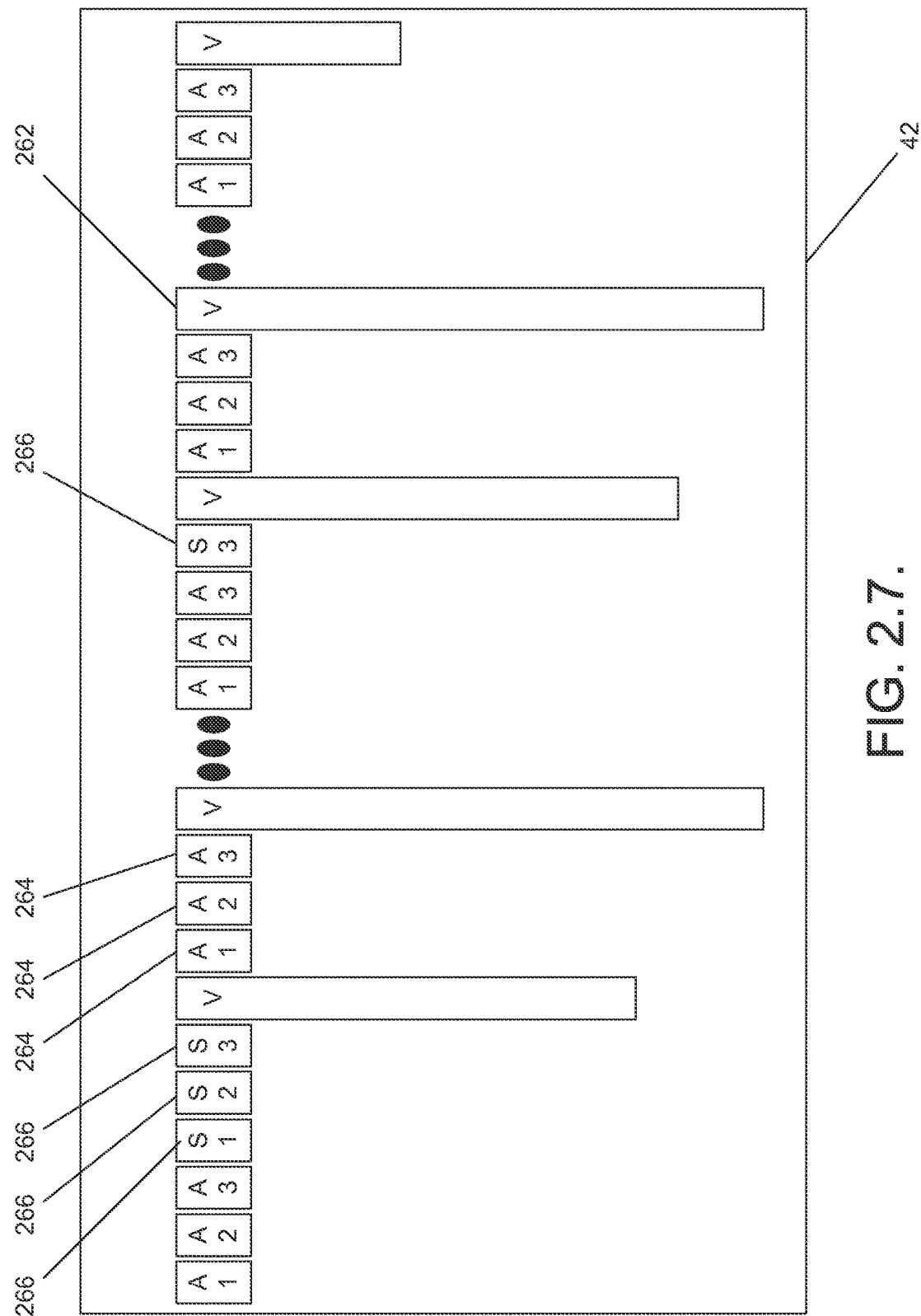
FIG. 2.7.

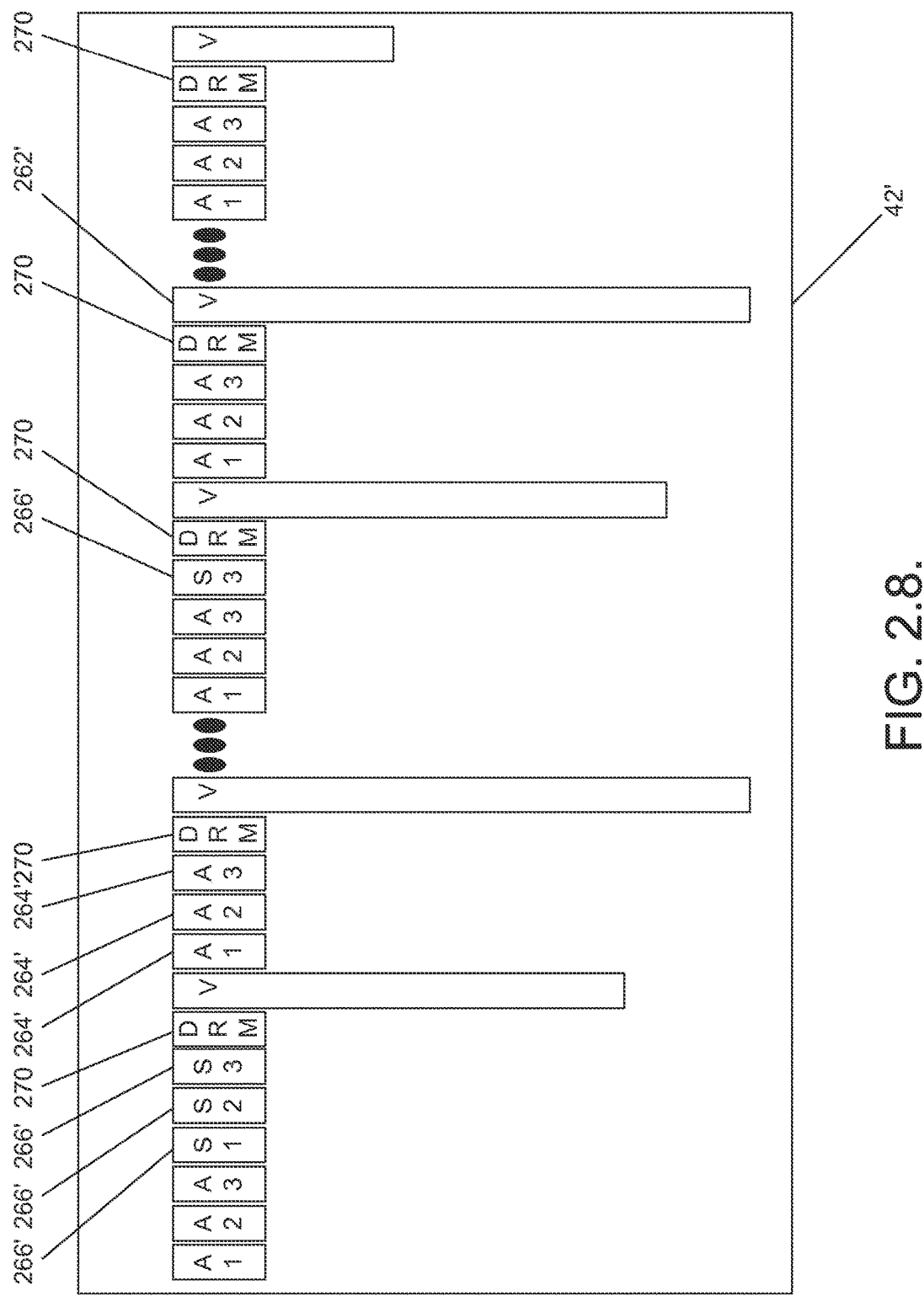
FIG. 2.8.

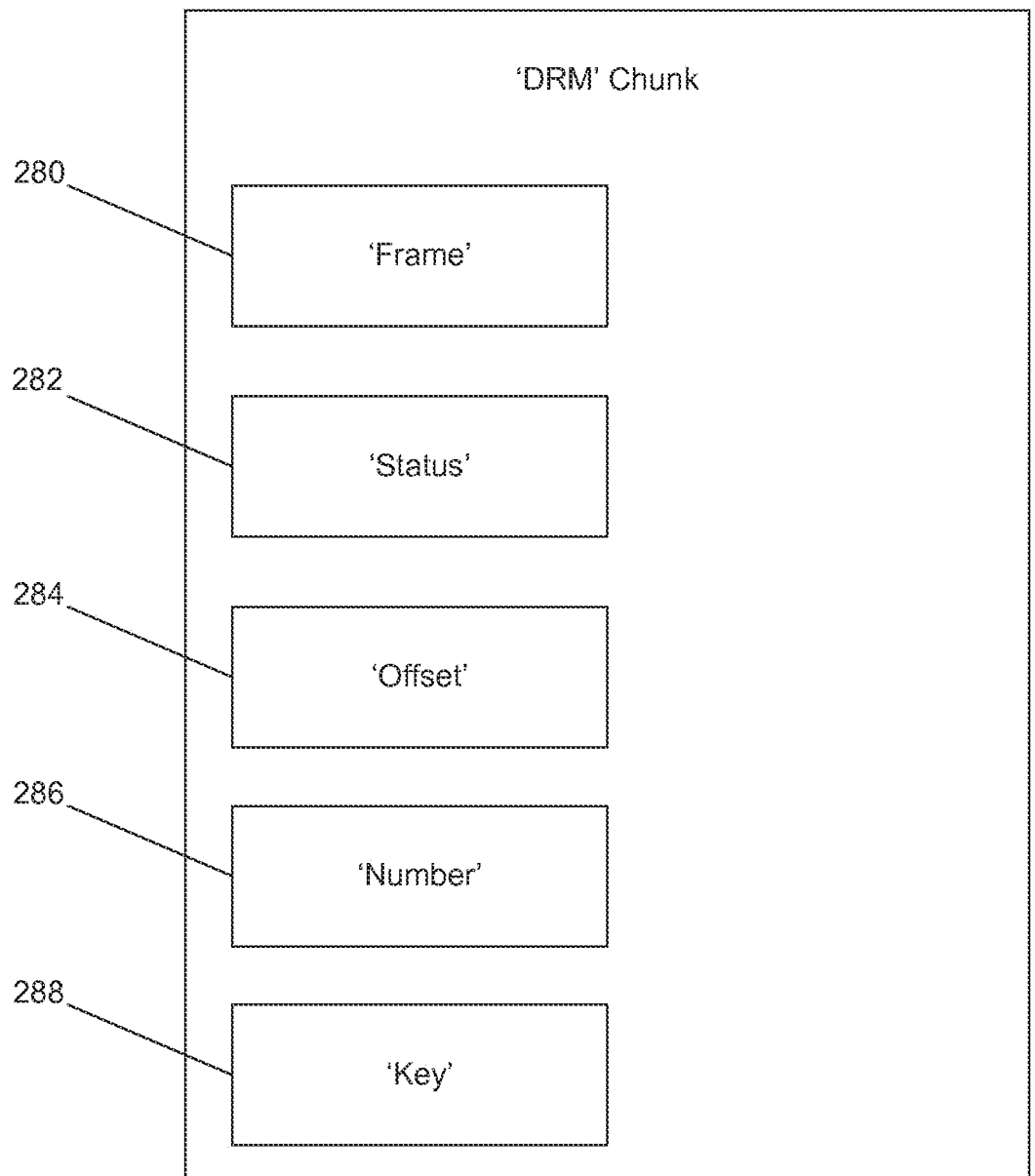
FIG. 2.9.

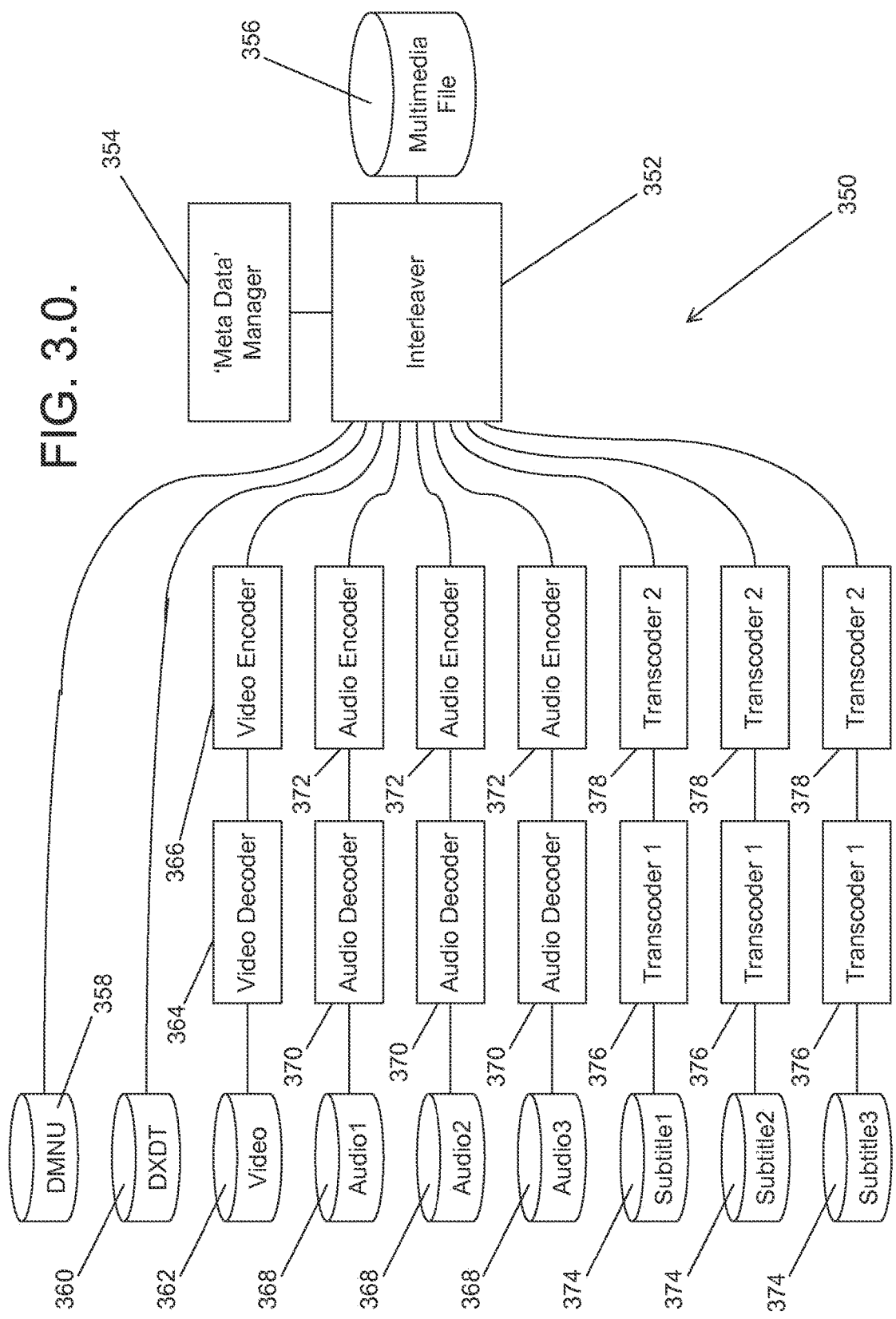
FIG. 3.0.

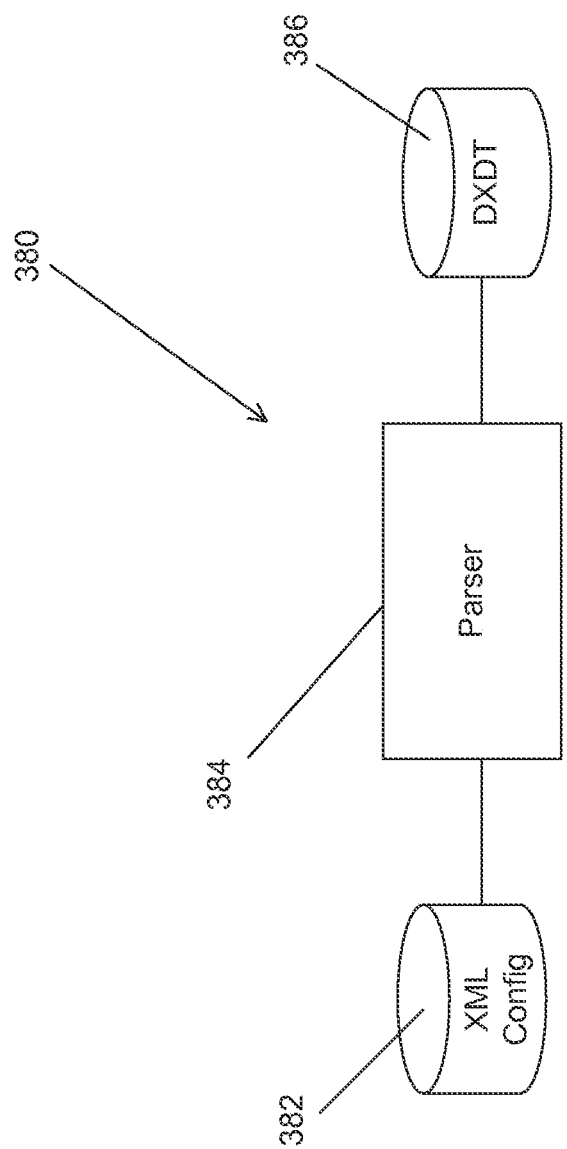
FIG. 3.1.

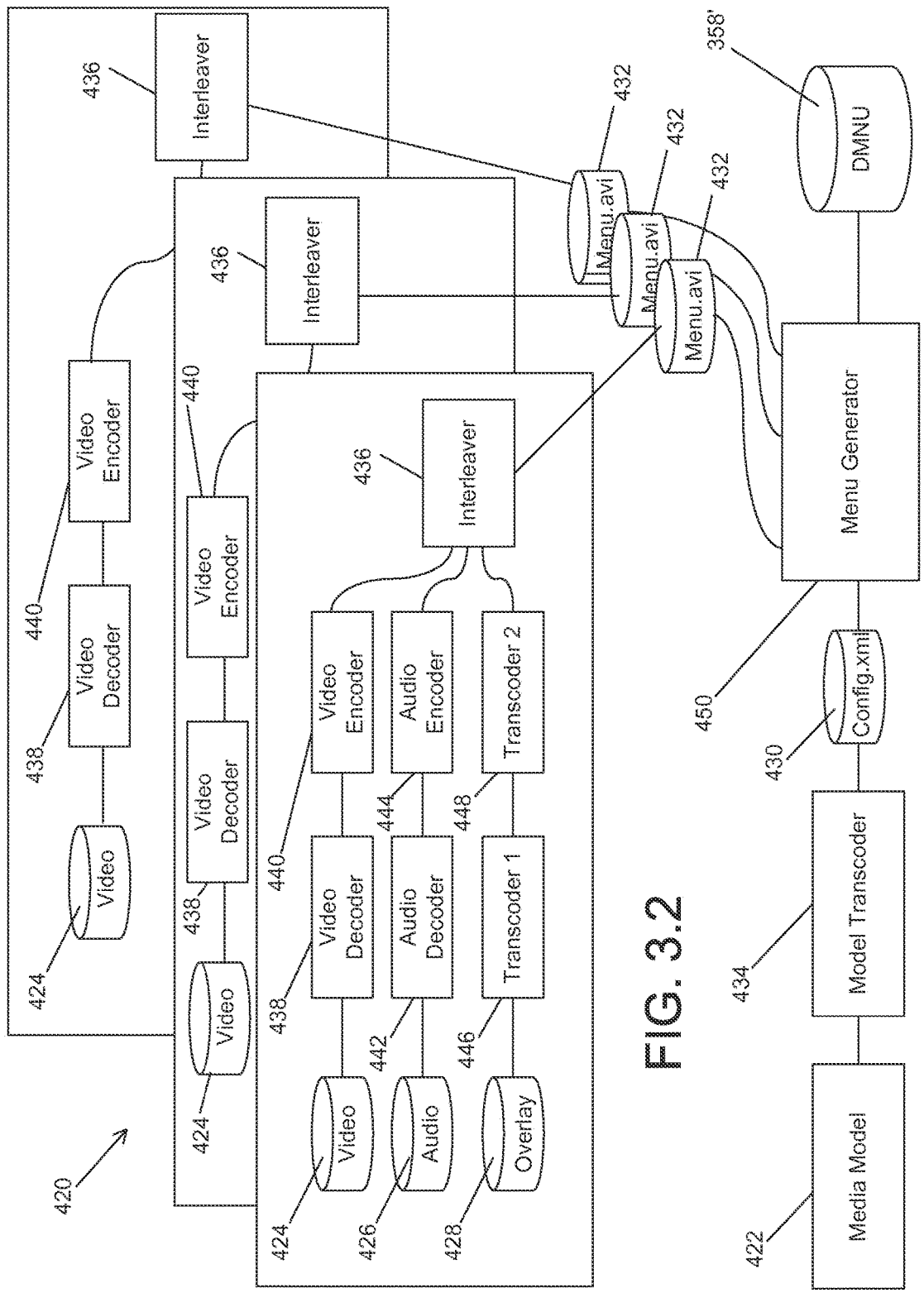
FIG. 3.2

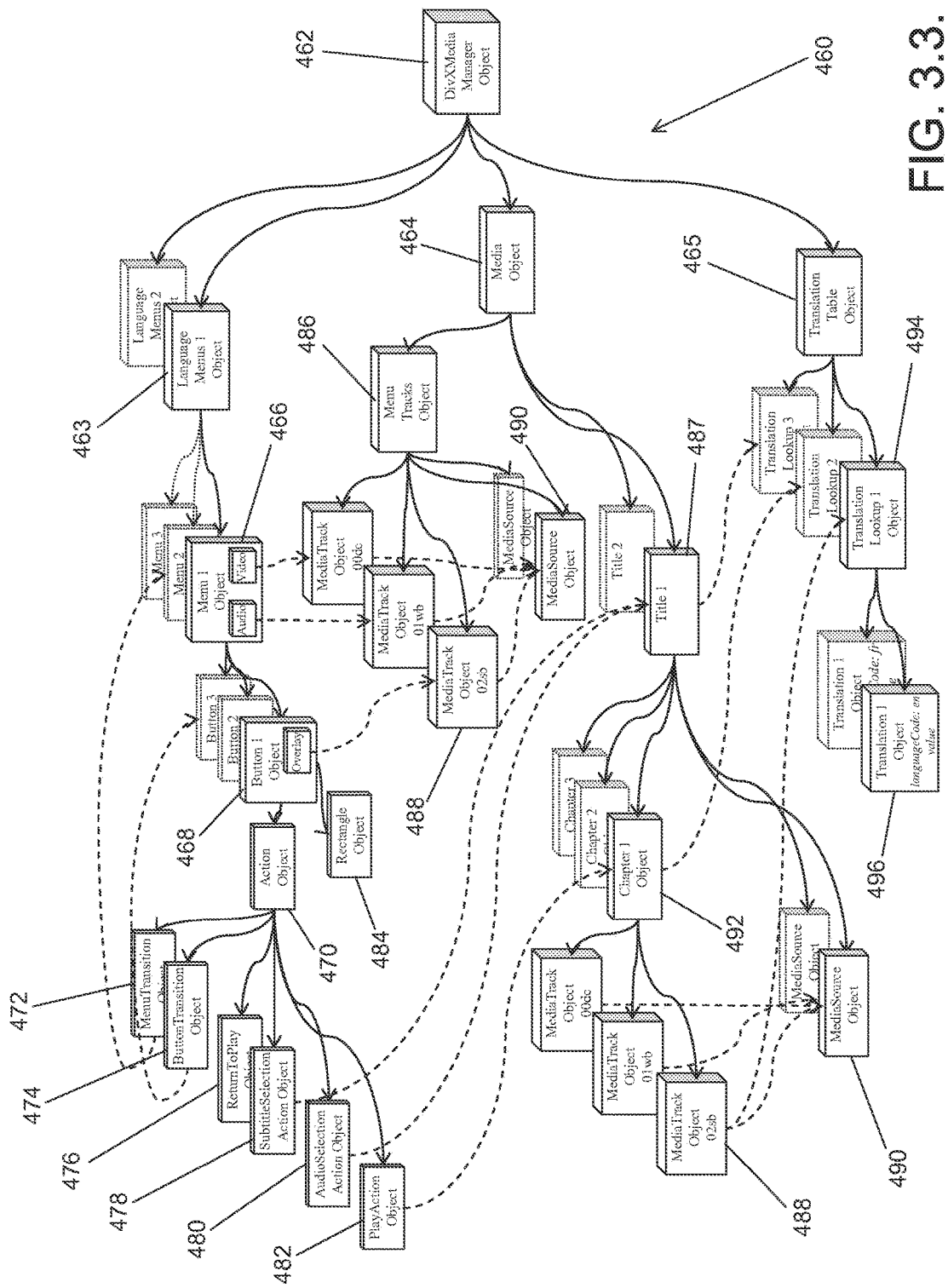
FIG. 3.3.

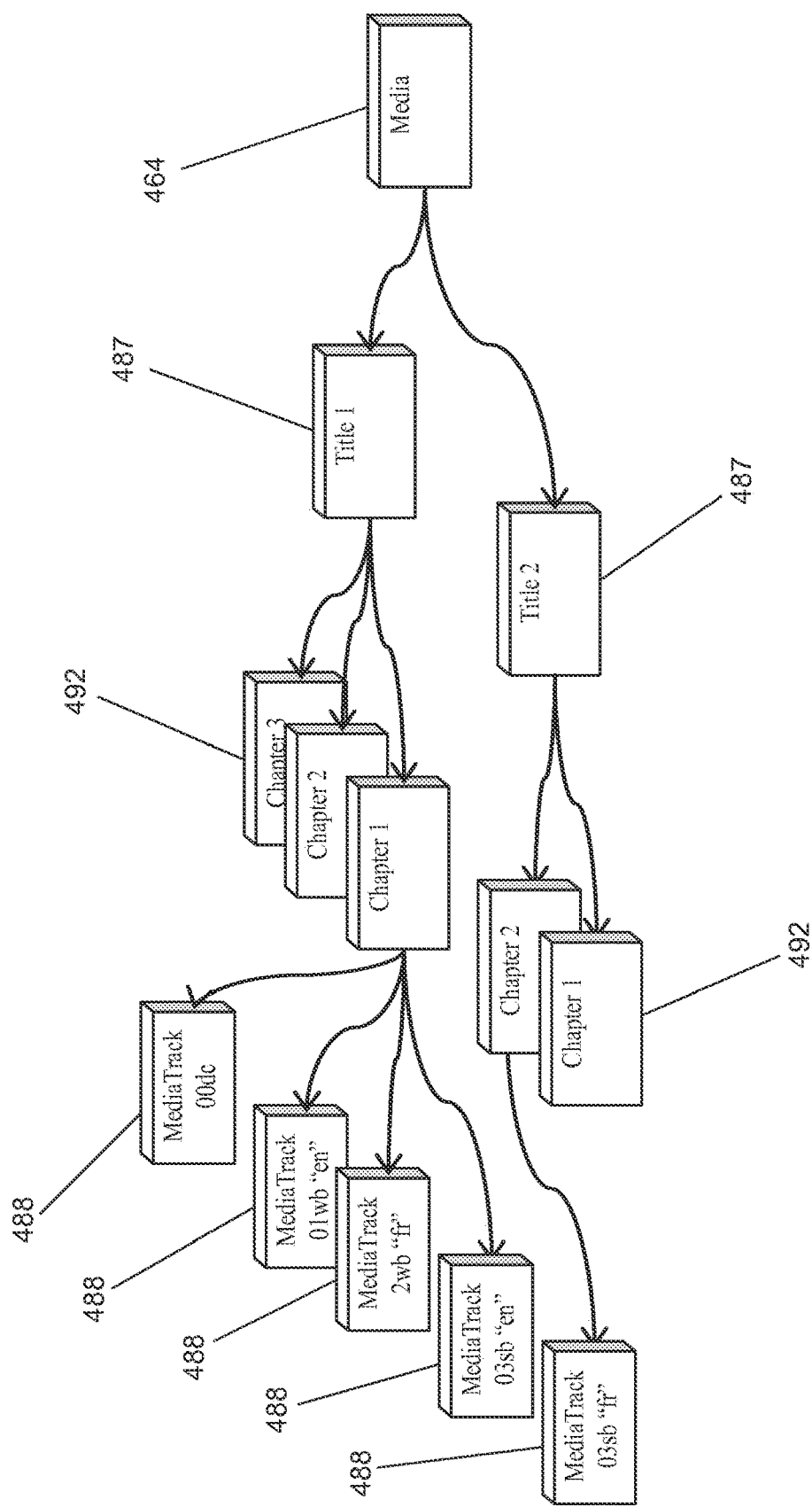
FIG. 3.3.1.

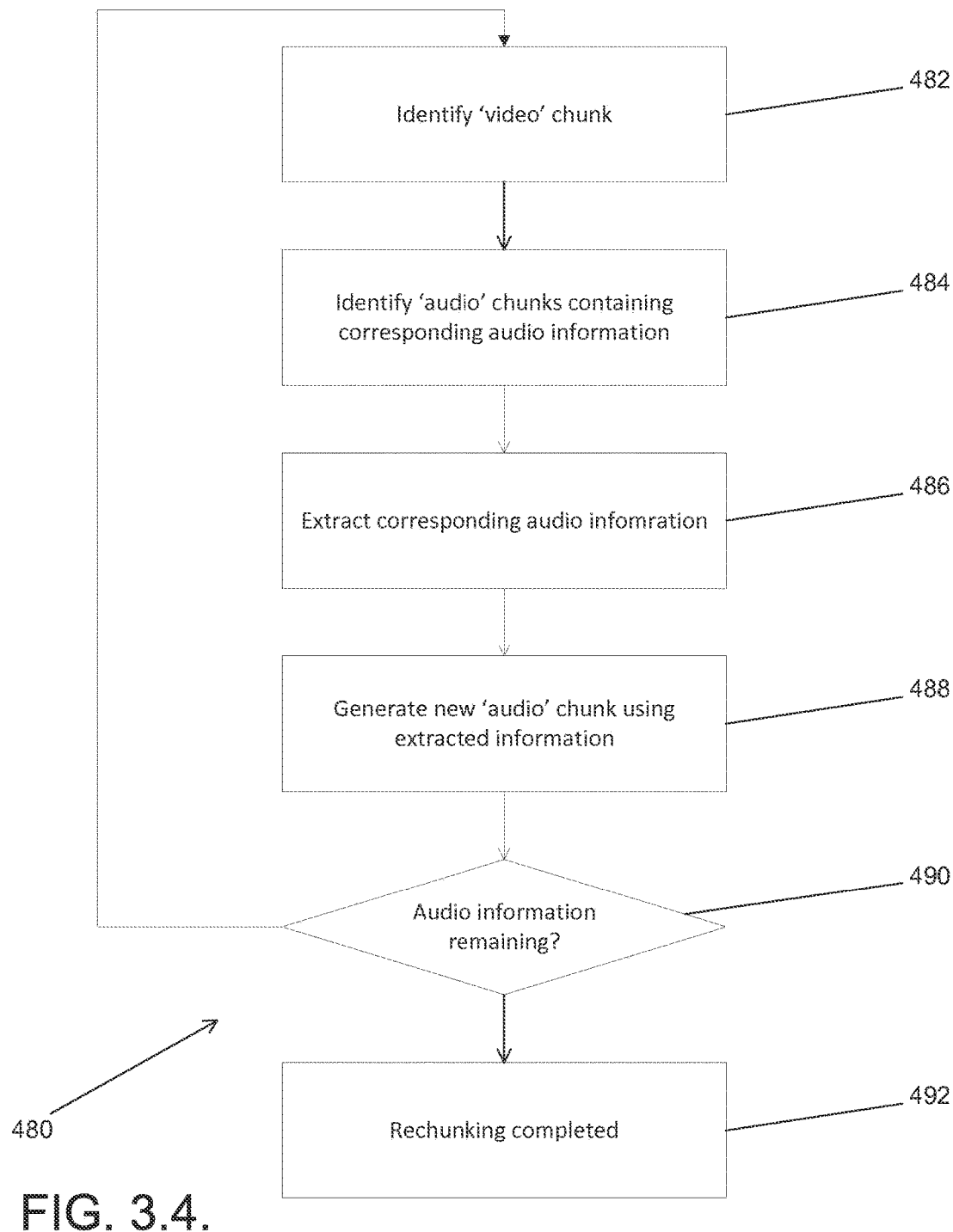
FIG. 3.4.

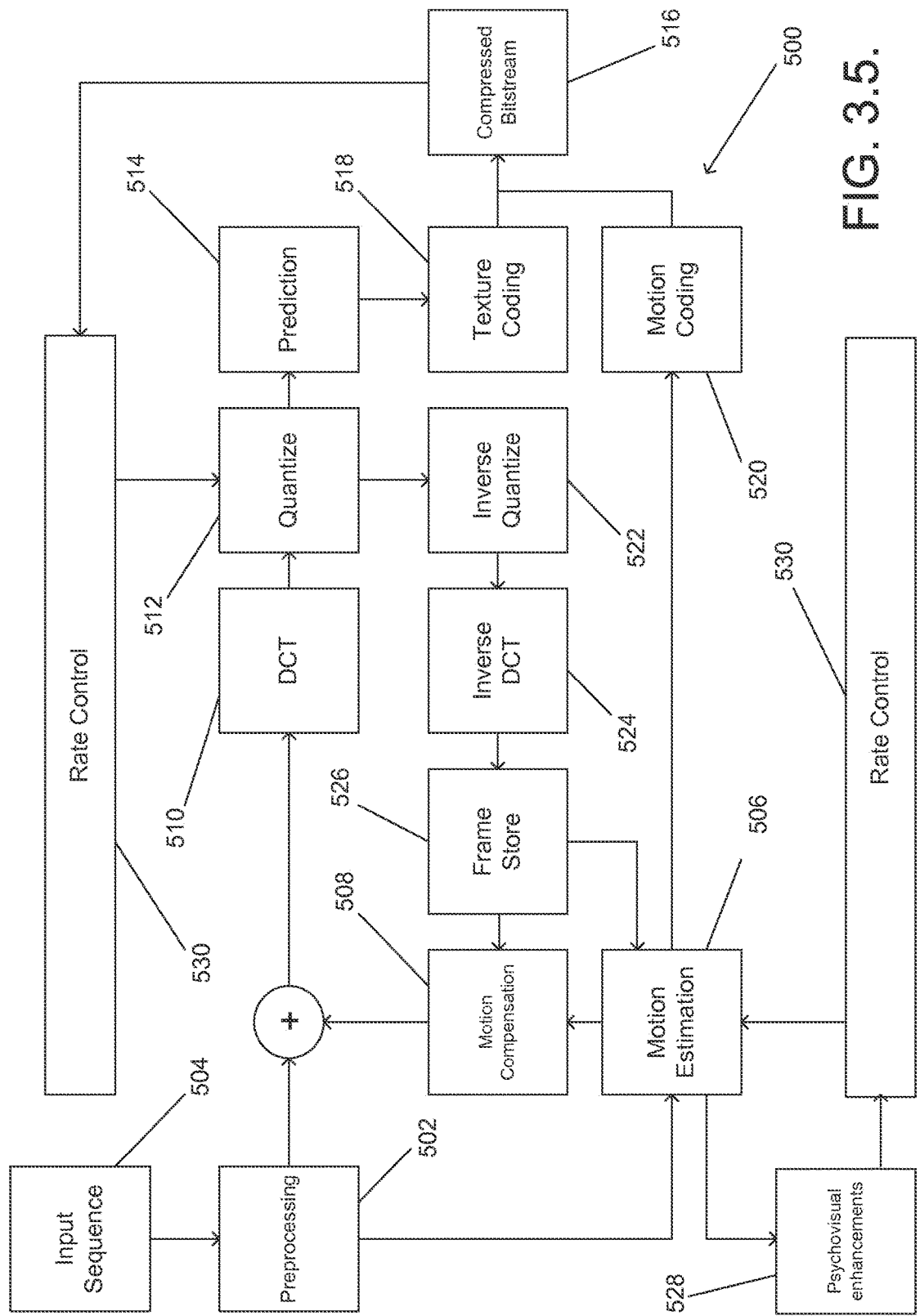
FIG. 3.5.

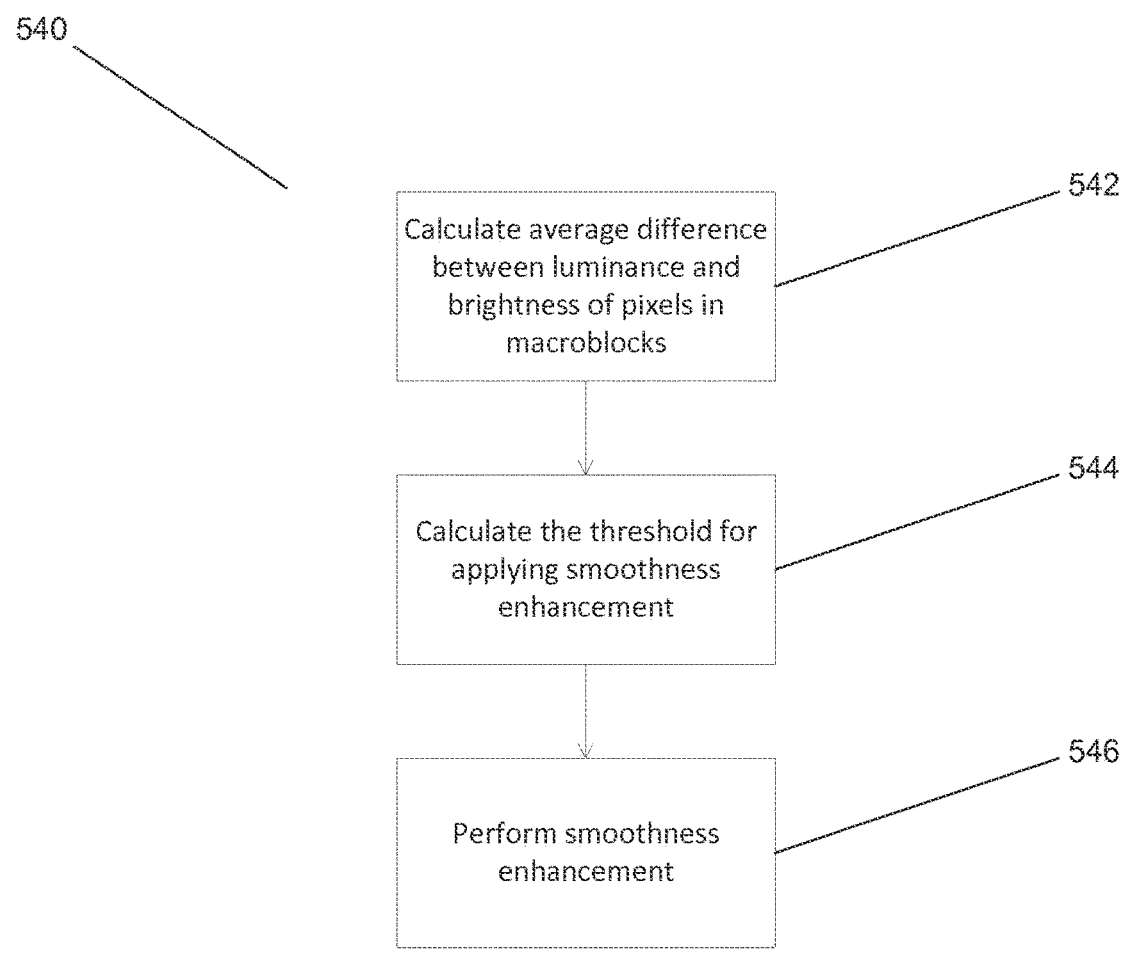
FIG. 3.6.

FIG. 3.7.

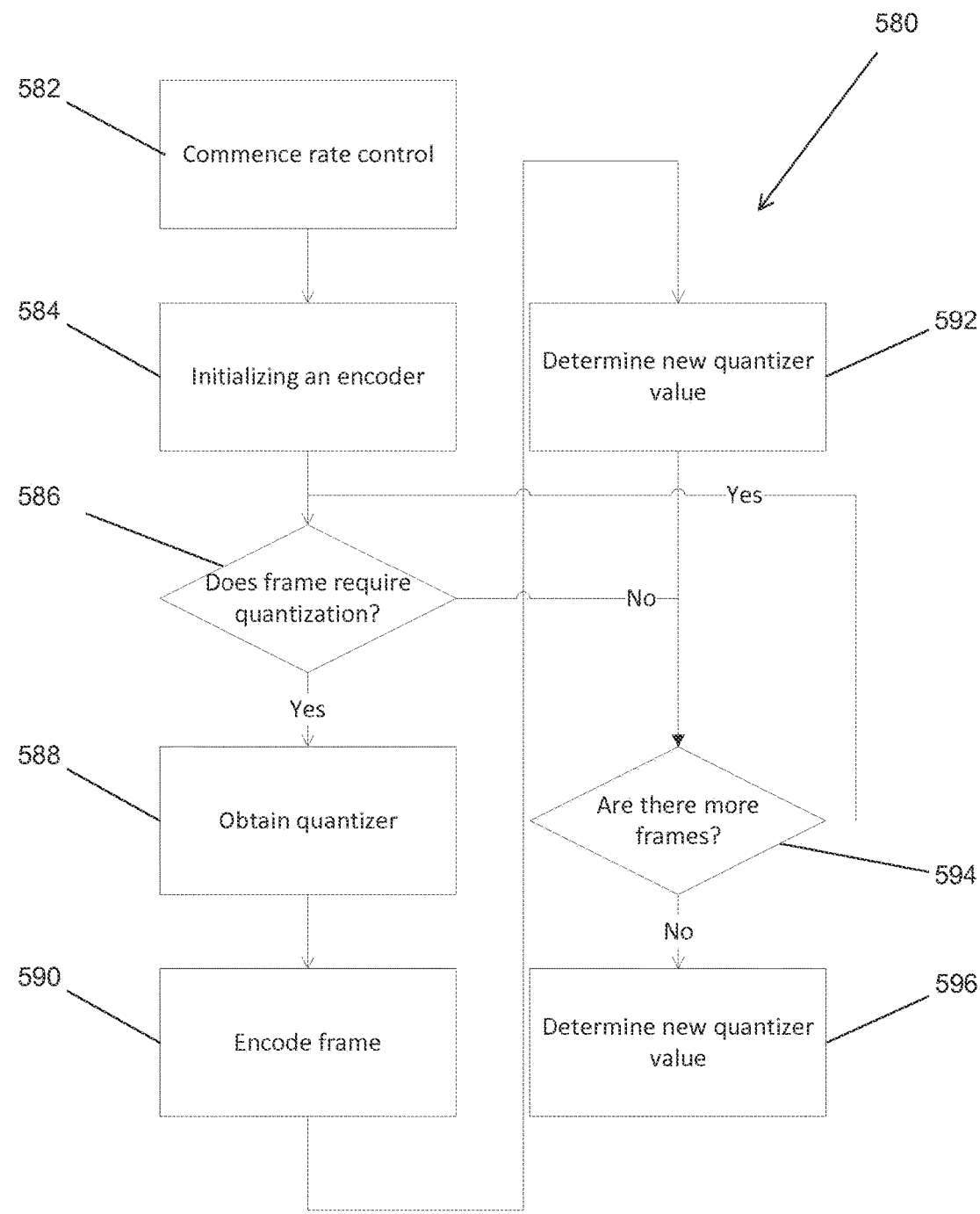
FIG. 3.8.

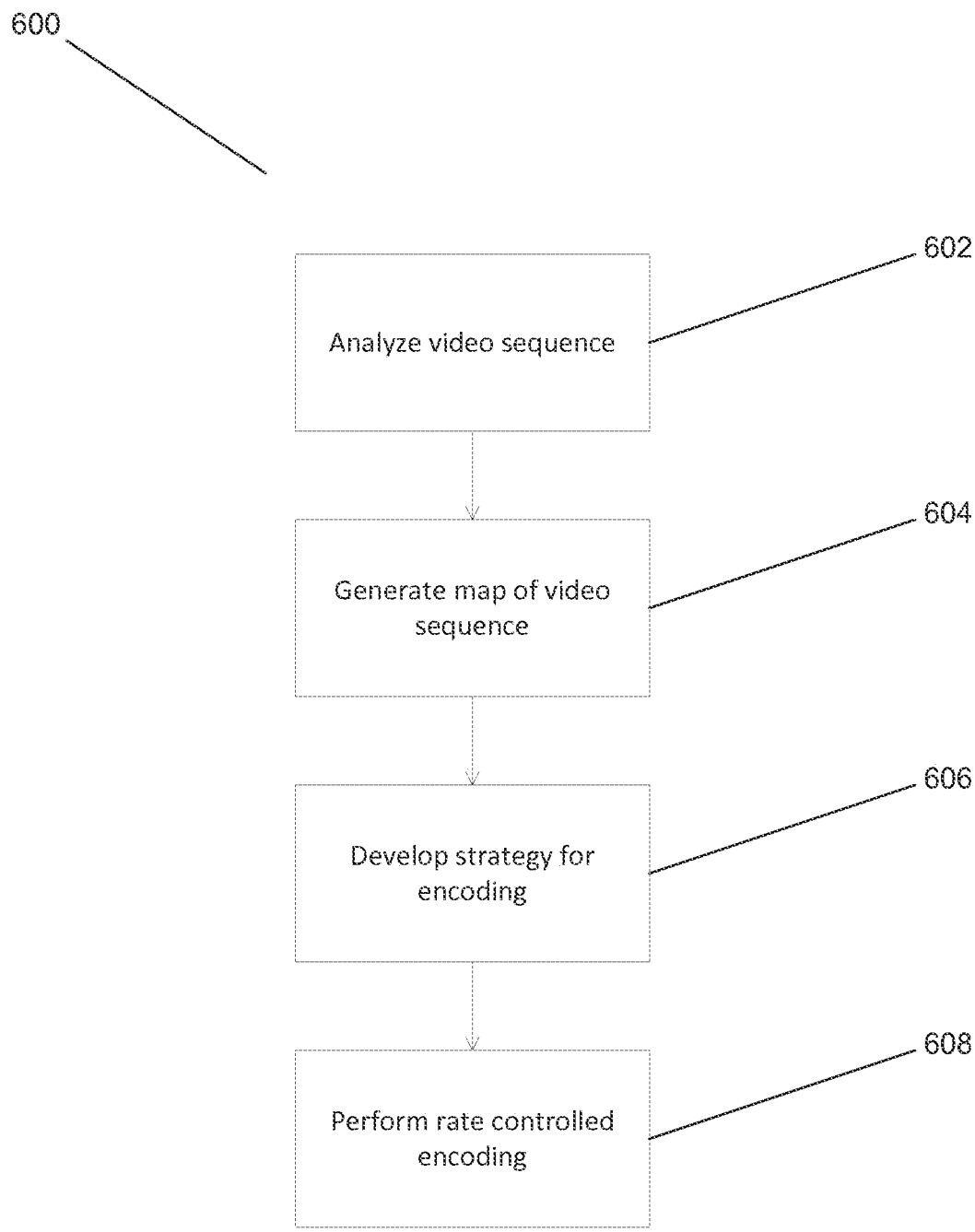
FIG. 3.9.

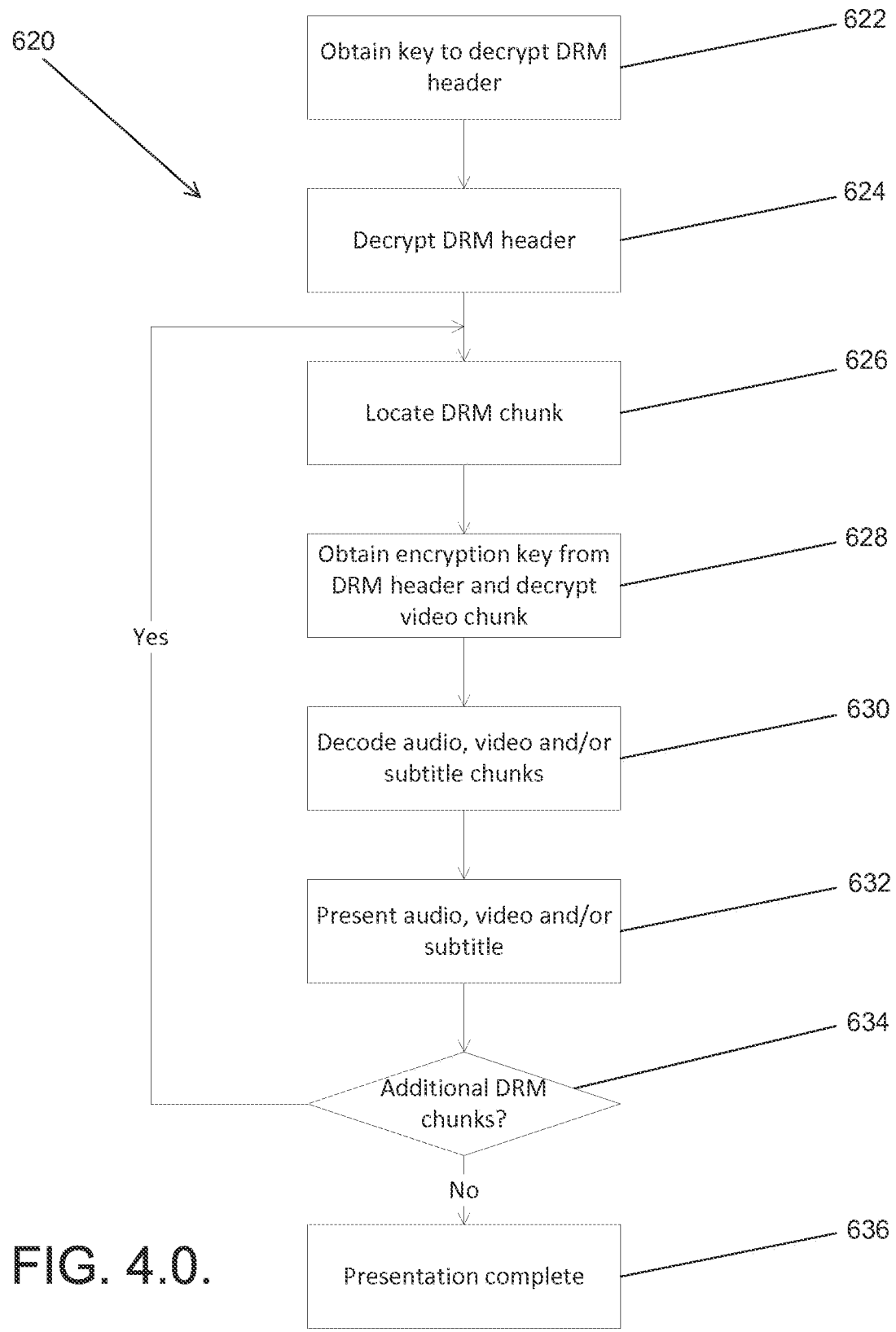
FIG. 4.0.

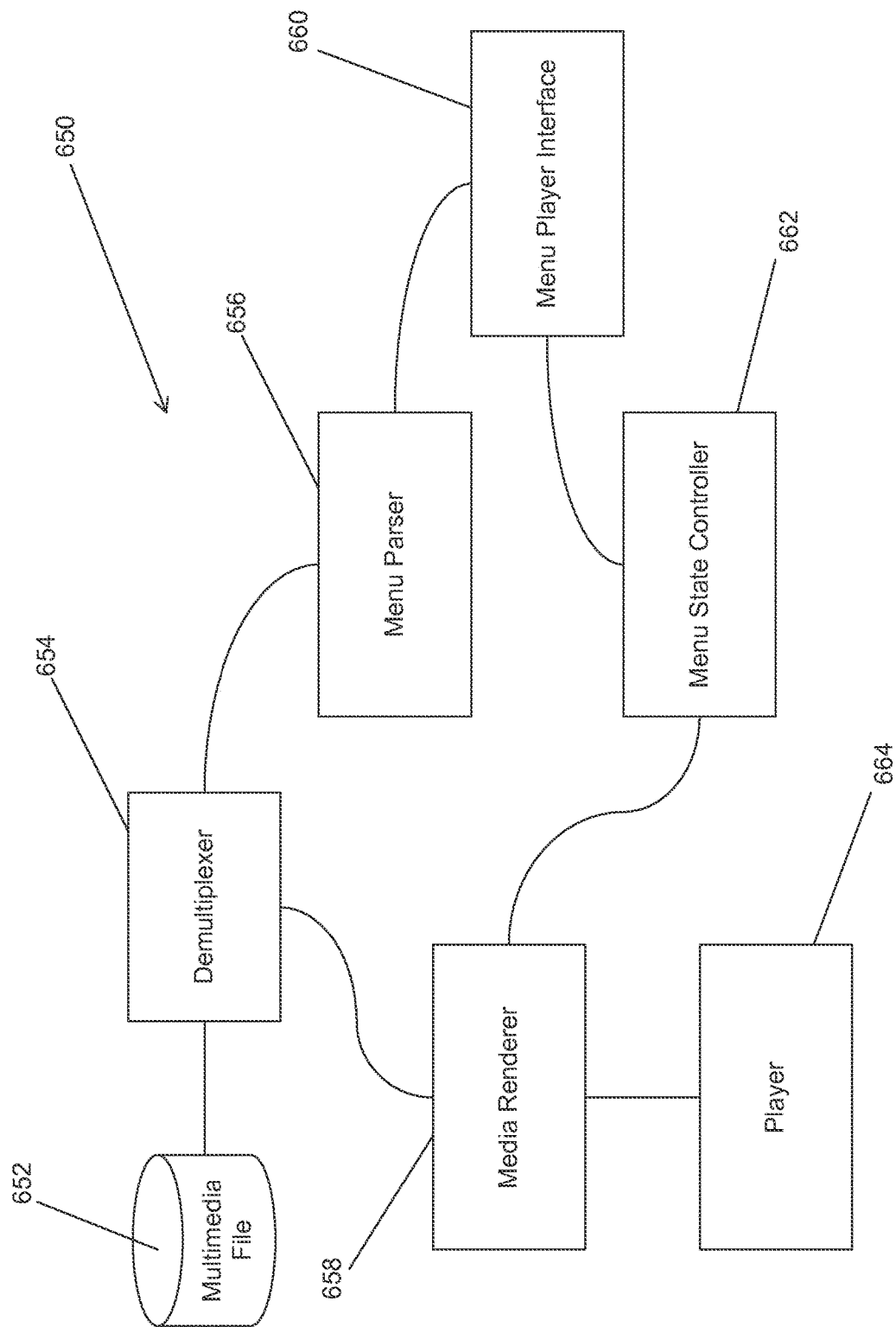
FIG. 4.1.

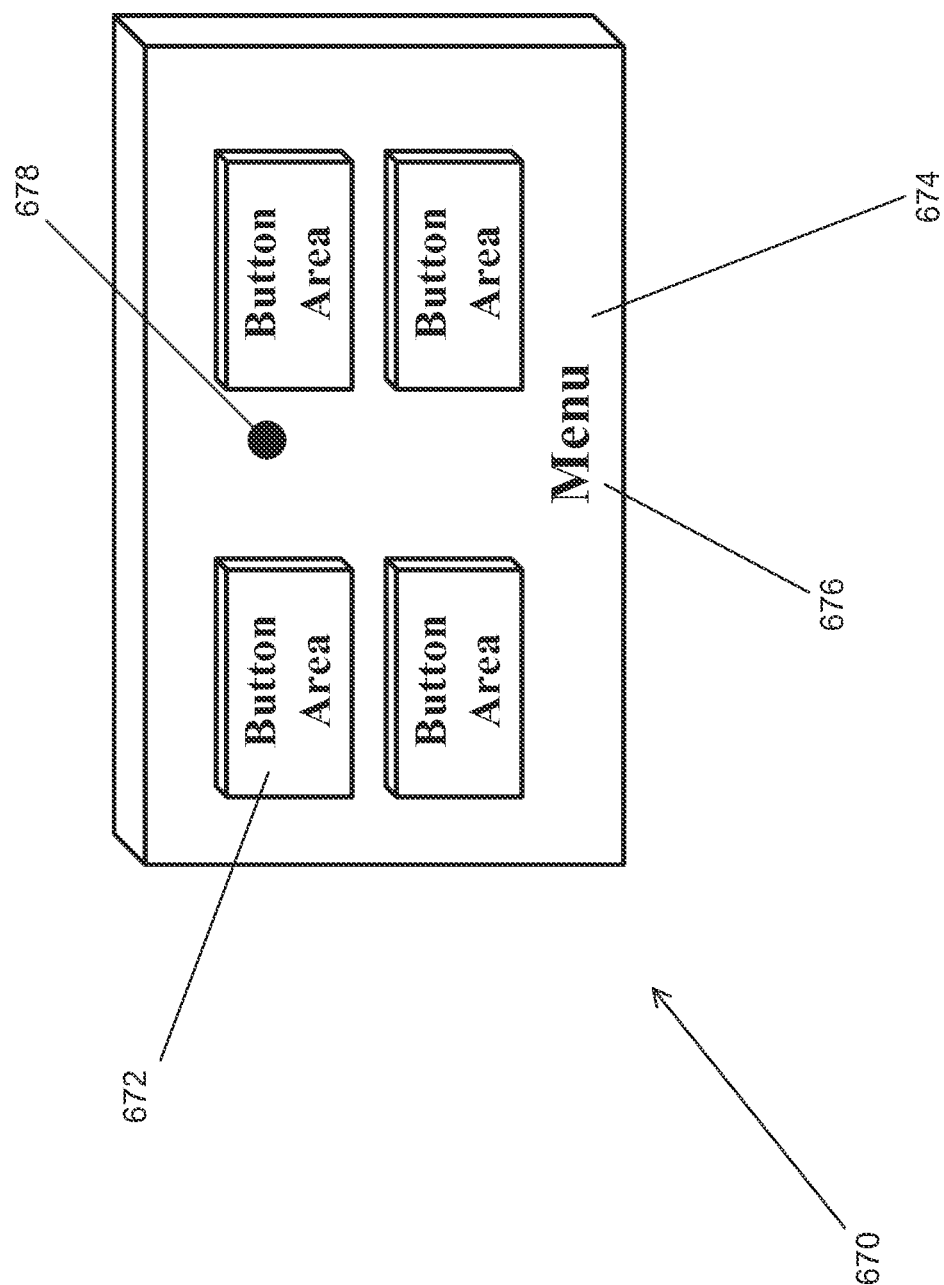
FIG. 4.2.

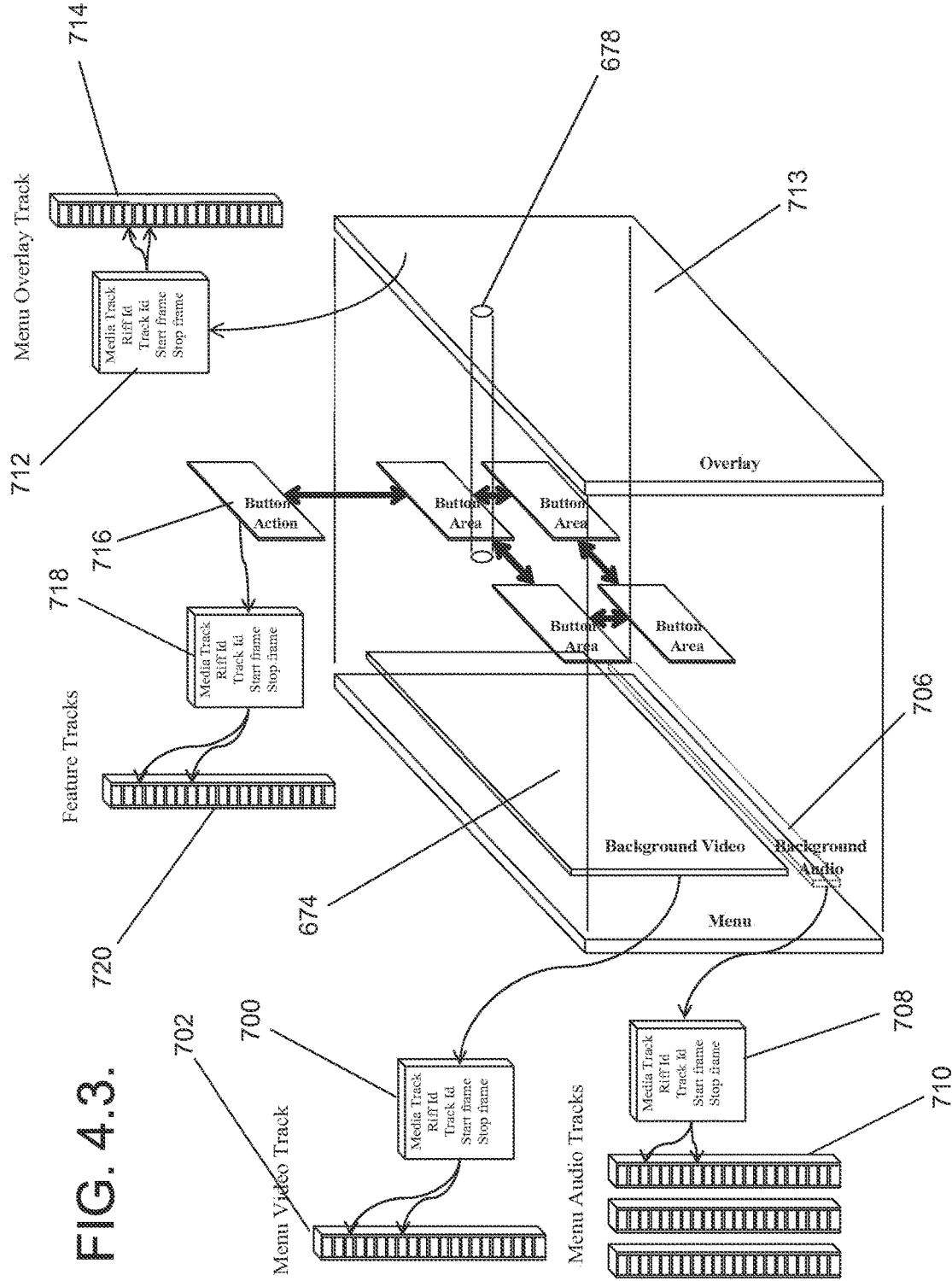
FIG. 4.3.

MULTIMEDIA DISTRIBUTION SYSTEM FOR MULTIMEDIA FILES WITH INTERLEAVED MEDIA CHUNKS OF VARYING TYPES

CROSS-REFERENCE TO RELATED APPLICATIONS

The present application is a continuation of U.S. patent application Ser. No. 14/281,791, filed on May 19, 2014, which is a continuation of U.S. Pat. No. 8,731,369 issued on May 20, 2014, which is a continuation-in-part of U.S. Pat. No. 7,519,274, issued on Apr. 14, 2009, and also claims priority from Patent Cooperation Treaty Patent Application Number PCT/US04/41667 filed on Dec. 8, 2004 and entitled Multimedia Distribution System, the disclosures of which are incorporated herein by reference in their entirety.

BACKGROUND OF THE INVENTION

The present invention relates generally to encoding, transmission and decoding of multimedia files. More specifically, the invention relates to the encoding, transmission and decoding of multimedia files that can include tracks in addition to a single audio track and a single video track.

The development of the internet has prompted the development of file formats for multimedia information to enable standardized generation, distribution and display of the files. Typically, a single multimedia file includes a single video track and a single audio track. When multimedia is written to a high volume and physically transportable medium, such as a CD-R, multiple files can be used to provide a number of video tracks, audio tracks and subtitle tracks. Additional files can be provided containing information that can be used to generate an interactive menu.

SUMMARY OF THE INVENTION

Embodiments of the present invention include multimedia files and systems for generating, distributing and decoding multimedia files. In one aspect of the invention, the multimedia files include a plurality of encoded video tracks. In another aspect of the invention, the multimedia files include a plurality of encoded audio tracks. In another aspect of the invention, the multimedia files include at least one subtitle track. In another aspect of the invention, the multimedia files include encoded 'meta data'. In another aspect of the invention, the multimedia files include encoded menu information.

A multimedia file in accordance with an embodiment of the invention includes a plurality of encoded video tracks. In further embodiments of the invention, the multimedia file comprises a plurality of concatenated 'RIFF' chunks and each encoded video track is contained in a separate 'RIFF' chunk. In addition, the video is encoded using psychovisual enhancements and each video track has at least one audio track associated with it.

In another embodiment, each video track is encoded as a series of 'video' chunks within a 'RIFF' chunk and the audio track accompanying each video track is encoded as a series of 'audio' chunks interleaved within the 'RIFF' chunk containing the 'video' chunks of the associated video track. Furthermore, each 'video' chunk can contain information that can be used to generate a single frame of video from a video track and each 'audio' chunk contains audio information from the portion of the audio track accompanying the frame generated using a 'video' chunk. In addition, the 'audio' chunk can be interleaved prior to the corresponding 'video' chunk within the 'RIFF' chunk.

A system for encoding multimedia files in accordance with an embodiment of the present invention includes a processor configured to encode a plurality of video tracks, concatenate the encoded video tracks and write the concatenated encoded video tracks to a single file. In another embodiment, the processor is configured to encode the video tracks such that each video track is contained within a separate 'RIFF' chunk and the processor is configured to encode the video using psychovisual enhancements. In addition, each video track can have at least one audio track associated with it.

In another embodiment, the processor is configured to encode each video track as a series of 'video' chunks within a 'RIFF' chunk and encode the at least one audio track accompanying each video track as a series of 'audio' chunks interleaved within the 'RIFF' chunk containing the 'video' chunks of the associated video track.

In another further embodiment, the processor is configured to encode the video tracks such that each 'video' chunk contains information that can be used to generate a single frame of video from a video track and encode the audio tracks associated with a video track such that each 'audio' chunk contains audio information from the portion of the audio track accompanying the frame generated using a 'video' chunk generated from the video track. In addition, the processor can be configured to interleave each 'audio' chunk prior to the corresponding 'video' chunk within the 'RIFF' chunk.

A system for decoding a multimedia file containing a plurality of encoded video tracks in accordance with an embodiment of the present invention includes a processor configured to extract information from the multimedia file. The processor is configured to extract information concerning the number of encoded video tracks contained within the multimedia file.

In a further embodiment, the processor is configured to locate an encoded video track within a 'RIFF' chunk. In addition, a first encoded video track can be contained in a first 'RIFF' chunk having a standard 4cc code, a second video track can be contained in a second 'RIFF' chunk having a specialized 4cc code and the specialized 4cc code can have as its last two characters the first two characters of a standard 4cc code.

In an additional embodiment, each encoded video track is contained in a separate 'RIFF' chunk.

In another further embodiment, the decoded video track is similar to the original video track that was encoded in the creation of the multimedia file and at least some of the differences between the decoded video track and the original video track are located in dark portions of frames of the video track. Furthermore, some of the differences between the decoded video track and the original video track can be located in high motion scenes of the video track.

In an additional embodiment again, each video track has at least one audio track associated with it.

In a further additional embodiment, the processor is configured to display video from a video track by decoding a series of 'video' chunks within a 'RIFF' chunk and generate audio from an audio track accompanying the video track by decoding a series of 'audio' chunks interleaved within the 'RIFF' chunk containing the 'video' chunks of the associated video track.

In yet another further embodiment, the processor is configured to use information extracted from each 'video' chunk to generate a single frame of the video track and use information extracted from each 'audio' chunk to generate the portion of the audio track that accompanies the frame generated using a 'video' chunk. In addition, the processor can be configured to locate the 'audio' chunk prior to the 'video' chunk with which it is associated in the 'RIFF' chunk.

A multimedia file in accordance with an embodiment of the present invention includes a series of encoded video frames and encoded audio interleaved between the encoded video frames. The encoded audio includes two or more tracks of audio information.

In a further embodiment at least one of the tracks of audio information includes a plurality of audio channels.

Another embodiment further includes header information identifying the number of audio tracks contained in the multimedia file and description information about at least one of the tracks of audio information.

In a further embodiment again, each encoded video frame is preceded by encoded audio information and the encoded audio information preceding the video frame includes the audio information for the portion of each audio track that accompanies the encoded video frame.

In another embodiment again, the video information is stored as chunks within the multimedia file. In addition, each chunk of video information can include a single frame of video. Furthermore, the audio information can be stored as chunks within the multimedia file and audio information from two separate audio tracks is not contained within a single chunk of audio information.

In a yet further embodiment, the 'video' chunks are separated by at least one 'audio' chunk from each of the audio tracks and the 'audio' chunks separating the 'video' chunks contain audio information for the portions of the audio tracks accompanying the video information contained within the 'video' chunk following the 'audio' chunk.

A system for encoding multimedia files in accordance with an embodiment of the invention includes a processor configured to encode a video track, encode a plurality of audio tracks, interleave information from the video track with information from the plurality of audio tracks and write the interleaved video and audio information to a single file.

In a further embodiment, at least one of the audio tracks includes a plurality of audio channels.

In another embodiment, the processor is further configured to encode header information identifying the number of the encoded audio tracks and to write the header information to the single file.

In a further embodiment again, the processor is further configured to encode header information identifying description information about at least one of the encoded audio tracks and to write the header information to the single file.

In another embodiment again, the processor encodes the video track as chunks of video information. In addition, the processor can encode each audio track as a series of chunks of audio information. Furthermore, each chunk of audio information can contain audio information from a single audio track and the processor can be configured to interleave chunks of audio information between chunks of video information.

In a yet further embodiment, the processor is configured to encode the portion of each audio track that accompanies the video information in a 'video' chunk in an 'audio' chunk and the processor is configured to interleave the 'video' chunks with the 'audio' chunks such that each 'video' chunk is preceded by 'audio' chunks containing the audio information from each of the audio tracks that accompanies the video information contained in the 'video' chunk. In addition, the processor can be configured to encode the video track such that a single frame of video is contained within each 'video' chunk.

In yet another embodiment again, the processor is a general purpose processor.

In an additional further embodiment, the processor is a dedicated circuit.

A system for decoding a multimedia file containing a plurality of audio tracks in accordance with the present invention includes a processor configured to extract information from the multimedia file. The processor is configured to extract information concerning the number of audio tracks contained within the multimedia file.

In a further embodiment, the processor is configured to select a single audio track from the plurality of audio tracks and the processor is configured to decode the audio information from the selected audio track.

In another embodiment, at least one of the audio tracks includes a plurality of audio channels.

In a still further embodiment, the processor is configured to extract information from a header in the multimedia file including description information about at least one of the audio tracks.

A system for communicating multimedia information in accordance with an embodiment of the invention includes a network, a storage device containing a multimedia file and connected to the network via a server and a client connected to the network. The client can request the transfer of the multimedia file from the server and the multimedia file includes at least one video track and a plurality of audio tracks accompanying the video track.

A multimedia file in accordance with the present invention includes a series of encoded video frames and at least one encoded subtitle track interleaved between the encoded video frames.

In a further embodiment, at least one encoded subtitle track comprises a plurality of encoded subtitle tracks.

Another embodiment further includes header information identifying the number of encoded subtitle tracks contained in the multimedia file.

A still further embodiment also includes header information including description information about at least one of the encoded subtitle tracks.

In still another embodiment, each subtitle track includes a series of bit maps and each subtitle track can include a series of compressed bit maps. In addition, each bit map is compressed using run length encoding.

In a yet further embodiment, the series of encoded video frames are encoded as a series of video chunks and each encoded subtitle track is encoded as a series of subtitle chunks. Each subtitle chunk includes information capable of being represented as text on a display. In addition, each subtitle chunk can contain information concerning a single subtitle. Furthermore, each subtitle chunk can include information concerning the portion of the video sequence over which the subtitle should be superimposed.

In yet another embodiment, each subtitle chunk includes information concerning the portion of a display in which the subtitle should be located.

In a further embodiment again, each subtitle chunk includes information concerning the color of the subtitle and the information concerning the color can include a color palette. In addition, the subtitle chunks can comprise a first subtitle chunk that includes information concerning a first color palette and a second subtitle chunk that includes information concerning a second color palette that supersedes the information concerning the first color palette.

A system for encoding multimedia files in accordance with an embodiment of the invention can include a processor configured to encode a video track, encode at least one subtitle track, interleave information from the video track with information from the at least one subtitle track and write the interleaved video and subtitle information to a single file.

In a further embodiment, the at least one subtitle track includes a plurality of subtitle tracks.

In another embodiment, the processor is further configured to encode and write to the single file, header information identifying the number of subtitle tracks contained in the multimedia file.

In a further embodiment again, the processor is further configured to encode and write to the single file, description information about at least one of the subtitle tracks.

In another further embodiment, the video track is encoded as video chunks and each of the at least one subtitle tracks is encoded as subtitle chunks. In addition, each of the subtitle chunks can contain a single subtitle that accompanies a portion of the video track and the interleaver can be configured to interleave each subtitle chunk prior to the video chunks containing the portion of the video track that the subtitle within the subtitle chunk accompanies.

In a still further embodiment, the processor is configured to generate a subtitle chunk by encoding the subtitle as a bit map.

In still another embodiment, the subtitle is encoded as a compressed bit map. In addition, the bit map can be compressed using run length encoding.

Furthermore, the processor can include in each subtitle chunk information concerning the portion of the video sequence over which the subtitle should be superimposed.

In a yet further embodiment, the processor includes in each subtitle chunk information concerning the portion of a display in which the subtitle should be located.

In yet another embodiment, the processor includes in each subtitle chunk information concerning the color of the subtitle.

In a still further embodiment again, information concerning the color includes a color palette. In addition, the subtitle chunks can include a first subtitle chunk that includes information concerning a first color palette and a second subtitle chunk that includes information concerning a second color palette that supersedes the information concerning the first color palette.

A system for decoding multimedia files in accordance with an embodiment of the present invention includes a processor configured to extract information from the multimedia file. The processor is configured to inspect the multimedia file to determine if there is at least one subtitle track. In addition, the at least one subtitle track can comprise a plurality of subtitle tracks and the processor can be configured to determine the number of subtitle tracks in the multimedia file.

In a further embodiment, the processor is further configured to extract header information identifying the number of subtitle tracks from the multimedia file.

In another embodiment, the processor is further configured to extract description information about at least one of the subtitle tracks from the multimedia file.

In a further embodiment again, the multimedia file includes at least one video track encoded as video chunks and the multimedia file includes at least one subtitle track encoded as subtitle chunks.

In another embodiment again, each subtitle chunk includes information concerning a single subtitle.

In a still further embodiment, each subtitle is encoded in the subtitle chunks as a bit map, the processor is configured to decode the video track and the processor is configured construct a frame of video for display by superimposing the bit map over a portion of the video sequence. In addition, the subtitle can be encoded as a compressed bit map and the processor can be configured to uncompress the bit map. Furthermore, the processor can be configured to uncompress a run length encoded bit map.

In still another embodiment, each subtitle chunk includes information concerning the portion of the video track over which the subtitle should be superimposed and the processor is configured to generate a sequence of video frames for display by superimposing the bit map of the subtitle over each video frame indicated by the information in the subtitle chunk.

In an additional further embodiment, each subtitle chunk includes information concerning the position within a frame in which the subtitle should be located and the processor is configured to superimpose the subtitle in the position within each video frame indicated by the information within the subtitle chunk.

In another additional embodiment, each subtitle chunk includes information concerning the color of the subtitle and the processor is configured to superimpose the subtitle in the color or colors indicated by the color information within the subtitle chunk. In addition, the color information within the subtitle chunk can include a color palette and the processor is configured to superimpose the subtitle using the color palette to obtain color information used in the bit map of the subtitle. Furthermore, the subtitle chunks can comprise a first subtitle chunk that includes information concerning a first color palette and a second subtitle chunk that includes information concerning a second color palette and the processor can be configured to superimpose the subtitle using the first color palette to obtain information concerning the colors used in the bit map of the subtitle after the first chunk is processed and the processor can be configured to superimpose the subtitle using the second color palette to obtain information concerning the colors used in the bit map of the subtitle after the second chunk is processed.

A system for communicating multimedia information in accordance with an embodiment of the invention includes a network, a storage device containing a multimedia file and connected to the network via a server and a client connected to the network. The client requests the transfer of the multimedia file from the server and the multimedia file includes at least one video track and at least one subtitle track accompanying the video track.

A multimedia file in accordance with an embodiment of the invention including a series of encoded video frames and encoded menu information. In addition, the encoded menu information can be stored as a chunk.

A further embodiment also includes at least two separate 'menu' chunks of menu information and at least two separate 'menu' chunks can be contained in at least two separate 'RIFF' chunks.

In another embodiment, the first 'RIFF' chunk containing a 'menu' chunk includes a standard 4cc code and the second 'RIFF' chunk containing a 'menu' chunk includes a specialized 4cc code where the first two characters of a standard 4cc code appear as the last two characters of the specialized 4cc code.

In a further embodiment again, at least two separate 'menu' chunks are contained in a single 'RIFF' chunk.

In another embodiment again, the 'menu' chunk includes chunks describing a series of menus and an 'MRIF' chunk containing media associated with the series of menus. In addition, the 'MRIF' chunk can contain media information including video tracks, audio tracks and overlay tracks.

In a still further embodiment, the chunks describing a series of menus can include a chunk describing the overall menu system, at least one chunk that groups menus by language, at least one chunk that describes an individual menu display and accompanying background audio, at least one chunk that describes a button on a menu, at least one chunk that describes the location of the button on the screen and at least one chunk that describes various actions associated with a button.

Still another embodiment also includes a link to a second file. The encoded menu information is contained within the second file.

A system for encoding multimedia files in accordance with an embodiment of the invention includes a processor configured to encode menu information. The processor is also configured to generate a multimedia file including an encoded video track and the encoded menu information. In addition, the processor can be configured to generate an object model of the menus, convert the object model into an configuration file, parse the configuration file into chunks, generate AVI files containing media information, interleave the media in the AVI files into an 'MRIF' chunk and concatenate the parsed chunks with the 'MRIF' chunk to create a 'menu' chunk. Furthermore, the processor can be further configured to use the object model to generate a second smaller 'menu' chunk.

In a further embodiment, the processor is configured to encode a second menu and the processor can insert the first encoded menu in a first 'RIFF' chunk and insert the second encoded menu in a second 'RIFF' chunk.

In another embodiment, the processor includes the first and second encoded menus in a single 'RIFF' chunk.

In a further embodiment again, the processor is configured to insert in to the multimedia file a reference to an encoded menu in a second file.

A system for decoding multimedia files in accordance with the present invention includes a processor configured to extract information from the multimedia file. The processor is configured to inspect the multimedia file to determine if it contains encoded menu information. In addition, the processor can be configured to extract menu information from a 'menu' chunk within a 'RIFF' chunk and the processor can be configured to construct menu displays using video information stored in the 'menu' chunk.

In a further embodiment, the processor is configured to generate background audio accompanying a menu display using audio information stored in the 'menu' chunk.

In another embodiment, the processor is configured to generate a menu display by overlaying an overlay from the 'menu' chunk over video information from the 'menu' chunk.

A system for communicating multimedia information in accordance with the present invention includes a network, a storage device containing a multimedia file and connected to the network via a server and a client connected to the network. The client can request the transfer of the multimedia file from the server and the multimedia file includes encoded menu information.

A multimedia file including a series of encoded video frames and encoded meta data about the multimedia file. The encoded meta data includes at least one statement comprising a subject, a predicate, an object and an authority. In addition, the subject can contain information identifying a file, item, person or organization that is described by the meta data, the predicate can contain information indicative of a characteristic of the subject, the object can contain information descriptive of the characteristic of the subject identified by the predicate and the authority can contain information concerning the source of the statement.

In a further embodiment, the subject is a chunk that includes a type and a value, where the value contains information and the type indicates whether the chunk is a resource or an anonymous node.

In another embodiment, the predicate is a chunk that includes a type and a value, where the value contains information and the type indicates whether the value information is the a predicated URI or an ordinal list entry.

In a further embodiment again, the object is a chunk that includes a type, a language, a data type and a value, where the value contains information, the type indicates whether the value information is a UTF-8 literal, a literal integer or literal XML data, the data type indicates the type of the value information and the language contains information identifying a specific language.

In another embodiment again, the authority is a chunk that includes a type and a value, where the value contains information and the type indicates that the value information is the authority of the statement.

In a yet further embodiment, at least a portion of the encoded data is represented as binary data.

In yet another embodiment, at least a portion of the encoded data is represented as 64-bit ASCII data.

In a still further embodiment, at least a first portion of the encoded data is represented as binary data and at least a second portion of the encoded data is represented as additional chunks that contain data represented in a second format. In addition, the additional chunks can each contain a single piece of metadata.

A system for encoding multimedia files in accordance with an embodiment of the present invention includes a processor configured to encode a video track. The processor is also configured to encode meta data concerning the multimedia file and the encoded meta data includes at least one statement comprising a subject, a predicate, an object and an authority. In addition, the subject can contain information identifying a file, item, person or organization that is described by the meta data, the predicate can contain information indicative of a characteristic of the subject, the object can contain information descriptive of the characteristic of the subject identified by the predicate and the authority can contain information concerning the source of the statement.

In a further embodiment, the processor is configured to encode the subject as a chunk that includes a type and a value, where the value contains information and the type indicates whether the chunk is a resource or an anonymous node.

In another embodiment, the processor is configured to encode the predicate as a chunk that includes a type and a value, where the value contains information and the type indicates whether the value information is a predicate URI or an ordinary list entry.

In a further embodiment again, the processor is configured to encode the object as a chunk that includes a type, a language, a data type and a value, where the value contains information, the type indicates whether the value information is a UTF-8 literal, a literal integer or literal XML data, the data type indicates the type of the value information and the language contains information identifying a specific language.

In a another embodiment again, the processor is configured to encode the authority as a chunk that includes a type and a value, where the value contains information and the type indicates the value information is the authority of the statement.

In a still further embodiment, the processor is further configured to encode at least a portion of the meta data concerning the multimedia file as binary data.

In still another embodiment, the processor is further configured to encode at least a portion of the meta data concerning the multimedia file as 64-bit ASCII data.

In an additional embodiment, the processor is further configured to encode at least a first portion of the meta data concerning the multimedia file as binary data and to encode at least a second portion of the meta data concerning the multimedia file as additional chunks that contain data represented in a second format. In addition, the processor can be further configured to encode the additional chunks with a single piece of metadata.

A system for decoding multimedia files in accordance with the invention includes a processor configured to extract information from the multimedia file. The processor is configured to extract meta data information concerning the multimedia file and the meta data information includes at least one statement comprising a subject, a predicate, an object and an authority. In addition, the processor can be configured to extract, from the subject, information identifying a file, item, person or organization that is described by the meta data. Furthermore, the processor can be configured to extract information indicative of a characteristic of the subject from the predicate, the processor can be configured to extract information descriptive of the characteristic of the subject identified by the predicate from the object and the processor can be configured to extract information concerning the source of the statement from the authority.

In a further embodiment, the subject is a chunk that includes a type and a value and the processor is configured to identify that the chunk contains subject information by inspecting the type and the processor is configured to extract information from the value.

In another embodiment, the predicate is a chunk that includes a type and a value and the processor is configured to identify that the chunk contains predicate information by inspecting the type and the processor is configured to extract information from the value.

In a further embodiment again, the object is a chunk that includes a type, a language, a data type and a value, the processor is configured to identify that the chunk contains object information by inspecting the type, the processor is configured to inspect the data type to determine the data type of information contained in the value, the processor is configured to extract information of a type indicated by the data type from the value and the processor is configured to extract information identifying a specific language from the language.

In another embodiment again, the authority is a chunk that includes a type and a value and the processor is configured to identify that the chunk contains authority information by inspecting the type and the processor is configured to extract information from the value.

In a still further embodiment, the processor is configured to extract information from the meta data statement and display at least a portion of the information.

In still another embodiment, the processor is configured to construct data structures indicative of a directed-labeled graph in memory using the meta data.

In a yet further embodiment, the processor is configured to search through the meta data for information by inspecting at least one of the subject, predicate, object and authority for a plurality of statements.

In yet another embodiment, the processor is configured to display the results of the search as part of a graphical user interface. In addition, the processor can be configured to perform a search in response to a request from an external device.

In an additional further embodiment, at least a portion of the meta data information concerning the multimedia file is represented as binary data.

In another additional embodiment, at least a portion of the meta data information concerning the multimedia file is represented as 64-bit ASCII data.

In another further embodiment, at least a first portion of the meta data information concerning the multimedia file is represented as binary data and at least a second portion of the meta data information concerning the multimedia file is represented as additional chunks that contain data represented in a second format. In addition, the additional chunks can contain a single piece of metadata.

A system for communicating multimedia information in accordance with the present invention including a network, a storage device containing a multimedia file and that is connected to the network via a server and a client connected to the network. The client can request the transfer of the multimedia file from the server and the multimedia file includes meta data concerning the multimedia file and the meta data includes at least one statement comprising a subject, a predicate, an object and an authority.

A multimedia file in accordance with the present invention including at least one encoded video track, at least one encoded audio track and a plurality of encoded text strings. The encoded text strings describe characteristics of the at least one video track and at least one audio track.

In a further embodiment, a plurality of the text strings describe the same characteristic of a video track or audio track using different languages.

Another embodiment also includes at least one encoded subtitle track. The plurality of encoded text strings include strings describing characteristics of the subtitle track.

A system for creating a multimedia file in accordance with the present invention including a processor configured to encode at least one video track, encode at least one audio track, interleave at least one of the encoded audio tracks with a video track and insert text strings describing each of a number of characteristics of the at least one video track and the at least one audio track in a plurality of languages.

A system for displaying a multimedia file including encoded audio, video and text strings in accordance with the present invention including a processor configured to extract the encoded text strings from the file and generate a pull down menu display using the text strings.

BRIEF DESCRIPTION OF THE DRAWINGS

FIG. 2.0. is a diagram of the structure of a multimedia file in accordance with an embodiment of the present invention.

FIG. 2.0.1. is a diagram of the structure of a multimedia file in accordance with another embodiment of the present invention.

FIG. 2.1. is a conceptual diagram of a 'hdrl' list chunk in accordance with one embodiment of the invention.

FIG. 2.2. is a conceptual diagram of a 'strl' chunk in accordance with an embodiment of the invention.

FIG. 2.3. is a conceptual diagram of the memory allocated to store a 'DXDT' chunk of a multimedia file in accordance with an embodiment of the invention.

FIGS. 2.3.1, 2.3.1.A, and 2.3.1.6 are conceptual diagrams of 'meta data' chunks that can be included in a 'DXDT' chunk of a multimedia file in accordance with an embodiment of the invention.

FIG. 2.4. is a conceptual diagram of the 'DMNU' chunk in accordance with an embodiment of the invention.

FIG. 2.5. is a conceptual diagram of menu chunks contained in a WowMenuManager chunk in accordance with an embodiment of the invention.

FIG. 2.6. is a conceptual diagram of menu chunks contained within a WowMenuManager chunk in accordance with another embodiment of the invention.

FIG. 2.6.1. is a conceptual diagram illustrating the relationships between the various chunks contained within a 'DMNU' chunk.

FIG. 2.7. is a conceptual diagram of the 'movi' list chunk of a multimedia file in accordance with an embodiment of the invention.

FIG. 2.8. is a conceptual diagram of the 'movi' list chunk of a multimedia file in accordance with an embodiment of the invention that includes DRM.

FIG. 2.9. is a conceptual diagram of the 'DRM' chunk in accordance with an embodiment of the invention.

FIG. 3.0. is a block diagram of a system for generating a multimedia file in accordance with an embodiment of the invention.

FIG. 3.1. is a block diagram of a system to generate a 'DXDT' chunk in accordance with an embodiment of the invention.

FIG. 3.2. is a block diagram of a system to generate a 'DMNU' chunk in accordance with an embodiment of the invention.

FIG. 3.3. is a conceptual diagram of a media model in accordance with an embodiment of the invention.

FIG. 3.3.1. is a conceptual diagram of objects from a media model that can be used to automatically generate a small menu in accordance with an embodiment of the invention.

FIG. 3.4. is a flowchart of a process that can be used to re-chunk audio in accordance with an embodiment of the invention.

FIG. 3.5. is a block diagram of a video encoder in accordance with an embodiment of the present.

FIG. 3.6. is a flowchart of a method of performing smoothness psychovisual enhancement on an I frame in accordance with embodiments of the invention.

FIG. 3.7. is a flowchart of a process for performing a macroblock SAD psychovisual enhancement in accordance with an embodiment of the invention.

FIG. 3.8. is a flowchart of a process for one pass rate control in accordance with an embodiment of the invention.

FIG. 3.9. is a flowchart of a process for performing Nth pass VBV rate control in accordance with an embodiment of the invention.

FIG. 4.0. is a flowchart for a process for locating the required multimedia information from a multimedia file and displaying the multimedia information in accordance with an embodiment of the invention.

FIG. 4.1. is a block diagram of a decoder in accordance with an embodiment of the invention.

FIG. 4.2. is an example of a menu displayed in accordance with an embodiment of the invention.

FIG. 4.3. is a conceptual diagram showing the sources of information used to generate the display shown in FIG. 4.2 in accordance with an embodiment of the invention.

DETAILED DESCRIPTION OF THE INVENTION

Figure 1:
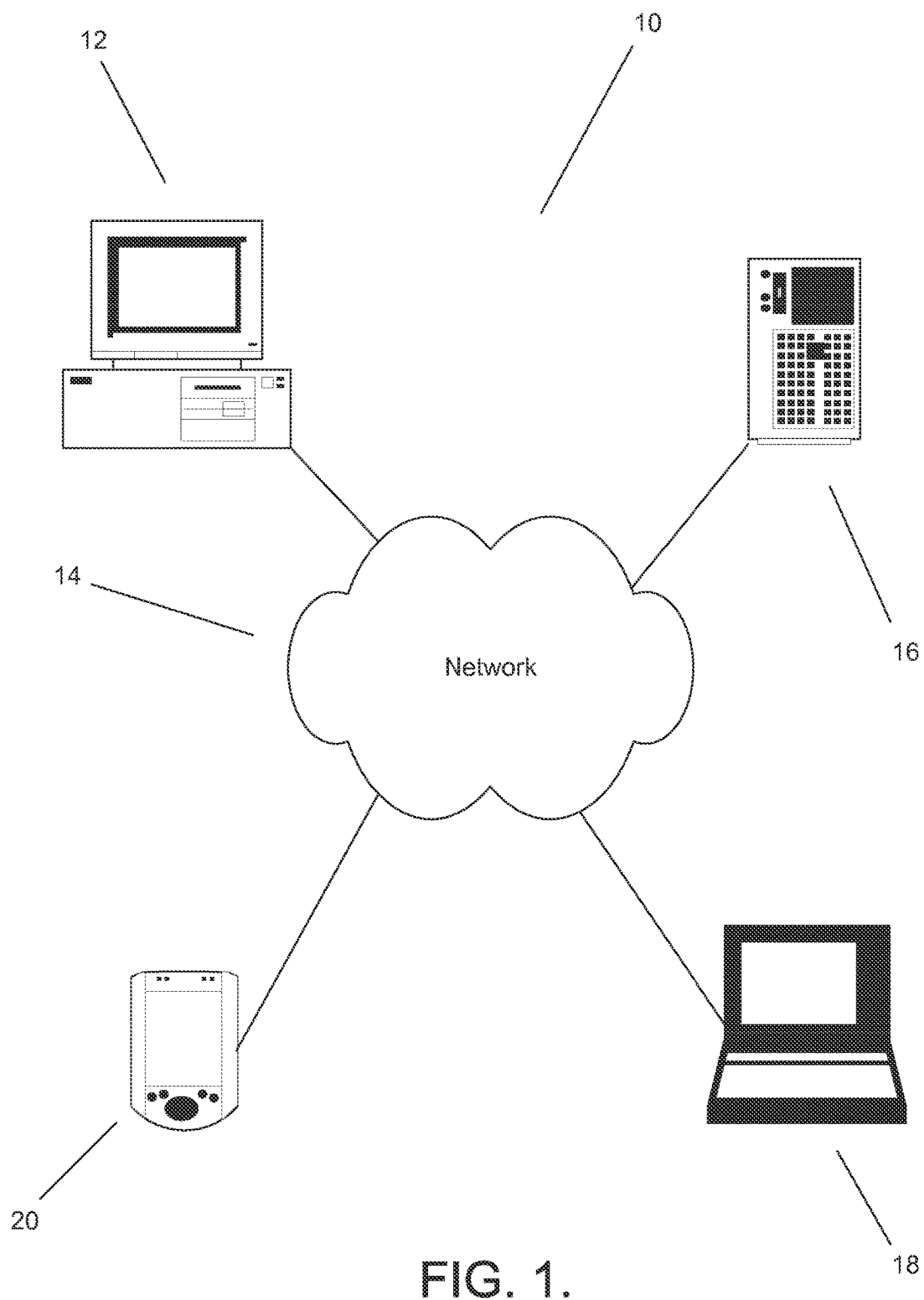
FIG. 1. is a diagram of a system in accordance with an embodiment of the present invention for encoding, distributing and decoding files.

Referring to the drawings, embodiments of the present invention are capable of encoding, transmitting and decoding multimedia files. Multimedia files in accordance with embodiments of the present invention can contain multiple video tracks, multiple audio tracks, multiple subtitle tracks, data that can be used to generate a menu interface to access the contents of the file and 'meta data' concerning the contents of the file. Multimedia files in accordance with several embodiments of the present invention also include references to video tracks, audio tracks, subtitle tracks and 'meta data' external to the file.

1. Description of System

Turning now to FIG. 1, a system in accordance with an embodiment of the present invention for encoding, distributing and decoding files is shown. The system 10 includes a computer 12, which is connected to a variety of other computing devices via a network 14. Devices that can be connected to the network include a server 16, a lap-top computer 18 and a personal digital assistant (PDA) 20. In various embodiments, the connections between the devices and the network can be either wired or wireless and implemented using any of a variety of networking protocols.

In operation, the computer 12 can be used to encode multimedia files in accordance with an embodiment of the present invention. The computer 12 can also be used to decode multimedia files in accordance with embodiments of the present invention and distribute multimedia files in accordance with embodiments of the present invention. The computer can distribute files using any of a variety of file transfer protocols including via a peer-to-peer network. In addition, the computer 12 can transfer multimedia files in accordance with embodiments of the present invention to a server 18, where the files can be accessed by other devices. The other devices can include any variety of computing device or even a dedicated decoder device. In the illustrated embodiment, a lap-top computer and a PDA are shown. In other embodiments, digital set-top boxes, desk-top computers, game machines, consumer electronics devices and other devices can be connected to the network, download the multimedia files and decode them.

In one embodiment, the devices access the multimedia files from the server via the network. In other embodiments, the devices access the multimedia files from a number of computers via a peer-to-peer network. In several embodiments, multimedia files can be written to a portable storage device such as a disk drive, CD-ROM or DVD. In many embodiments, electronic devices can access multimedia files written to portable storage devices.

2. Description of File Structure

Multimedia files in accordance with embodiments of the present invention can be structured to be compliant with the Resource Interchange File Format ('RIFF file format'), defined by Microsoft Corporation of Redmond, Wash. and International Business Machines Corporation of Armonk, N.Y. RIFF is a file format for storing multimedia data and associated information. A RIFF file typically has an 8-byte RIFF header, which identifies the file and provides the residual length of the file after the header (i.e. file_length-8). The entire remainder of the RIFF file comprises "chunks" and "lists." Each chunk has an 8-byte chunk header identifying the type of chunk, and giving the length in bytes of the data following the chunk header. Each list has an 8-byte list header identifying the type of list and giving the length in bytes of the data following the list header. The data in a list comprises chunks and/or other lists (which in turn may comprise chunks and/or other lists). RIFF lists are also sometimes referred to as "list chunks."

An AVI file is a special form of RIFF file that follow the format of a RIFF file, but include various chunks and lists with defined identifiers that contain multimedia data in particular formats. The AVI format was developed and defined by Microsoft Corporation. AVI files are typically created using a encoder that can output multimedia data in the AVI format. AVI files are typically decoded by any of a group of software collectively known as AVI decoders.

The RIFF and AVI formats are flexible in that they only define chunks and lists that are part of the defined file format, but allow files to also include lists and/or chunks that are outside the RIFF and/or AVI file format definitions without rendering the file unreadable by a RIFF and/or AVI decoder. In practice, AVI (and similarly RIFF) decoders are implemented so that they simply ignore lists and chunks that contain header information not found in the AVI file format definition. The AVI decoder must still read through these non-AVI chunks and lists and so the operation of the AVI decoder may be slowed, but otherwise, they generally have no effect on and are ignored by an AVI decoder.

A multimedia file in accordance with an embodiment of the present invention is illustrated in FIG. 2.0. The illustrated multimedia file 30 includes a character set chunk ('CSET' chunk) 32, an information list chunk ('INFO' list chunk) 34, a file header chunk ('hdrl' list chunk) 36, a meta data chunk ('DXDT' chunk) 38, a menu chunk ('DMNU' chunk) 40, a junk chunk ('junk' chunk) 41, the movie list chunk ('movi' list chunk) 42, an optional index chunk ('idx1' chunk) 44 and a second menu chunk ('DMNU' chunk) 46. Some of these chunks and portions of others are defined in the AVI file format while others are not contained in the AVI file format. In many, but not all, cases, the discussion below identifies chunks or portions of chunks that are defined as part of the AVI file format.

Another multimedia file in accordance with an embodiment of the present invention is shown in FIG. 2.0.1. The multimedia file 30' is similar to that shown in FIG. 2.0. except that the file includes multiple concatenated 'RIFF' chunks. The 'RIFF' chunks can contain a 'RIFF' chunk similar to that shown in FIG. 2.0. that can exclude the second 'DMNU' chunk 46 or can contain menu information in the form of a 'DMNU' chunk 46'.

In the illustrated embodiment, the multimedia includes multiple concatenated 'RIFF' chunks, where the first 'RIFF' chunk 50 includes a character set chunk ('CSET' chunk) 32', an information list chunk ('INFO' list chunk) 34', a file header chunk ('hdrl' list chunk) 36', a meta data chunk ('DXDT' chunk) 38', a menu chunk ('DMNU' chunk) 40', a junk chunk ('junk' chunk) 41', the movie list chunk ('movi' list chunk) 42' and an optional index chunk ('idx1' chunk) 44'. The second 'RIFF' chunk 52 contains a second menu chunk ('DMNU' chunk) 46'. Additional 'RIFF' chunks 54 containing additional titles can be included after the 'RIFF' menu chunk 52. The additional 'RIFF' chunks can contain independent media in compliant AVI file format. In one embodiment, the second menu chunk 46' and the additional 'RIFF' chunks have specialized 4 character codes (defined in the AVI format and discussed below) such that the first two characters of the 4 character codes appear as the second two characters and the second two characters of the 4 character codes appear as the first two characters.

2.1. The 'CSET' Chunk

The 'CSET' chunk 32 is a chunk defined in the Audio Video Interleave file format (AVI file format), created by Microsoft Corporation. The 'CSET' chunk defines the character set and language information of the multimedia file. Inclusion of a 'CSET' chunk in accordance with embodiments of the present invention is optional.

A multimedia file in accordance with one embodiment of the present invention does not use the 'CSET' chunk and uses UTF-8, which is defined by the Unicode Consortium, for the character set by default combined with RFC 3066 Language Specification, which is defined by Internet Engineering Task Force for the language information.

2.2. The 'INFO' List Chunk

The 'INFO' list chunk 34 can store information that helps identify the contents of the multimedia file. The 'INFO' list is defined in the AVI file format and its inclusion in a multimedia file in accordance with embodiments of the present invention is optional. Many embodiments that include a 'DXDT' chunk do not include an 'INFO' list chunk.

2.3. The 'Hdrl' List Chunk

The 'hdrl' list chunk 38 is defined in the AVI file format and provides information concerning the format of the data in the multimedia file. Inclusion of a 'hdrl' list chunk or a chunk containing similar description information is generally required. The 'hdrl' list chunk includes a chunk for each video track, each audio track and each subtitle track.

A conceptual diagram of a 'hdrl' list chunk 38 in accordance with one embodiment of the invention that includes a single video track 62, two audio tracks 64, an external audio track 66, two subtitle tracks 68 and an external subtitle track 70 is illustrated in FIG. 2.1. The 'hdrl' list 60 includes an 'avih' chunk. The 'avih' chunk 60 contains global information for the entire file, such as the number of streams within the file and the width and height of the video contained in the multimedia file. The 'avih' chunk can be implemented in accordance with the AVI file format.

In addition to the 'avih' chunk, the 'hdrl' list includes a stream descriptor list for each audio, video and subtitle track. In one embodiment, the stream descriptor list is implemented using 'strl' chunks. A 'strl' chunk in accordance with an embodiment of the present invention is illustrated in FIG. 2.2. Each 'strl' chunk serves to describe each track in the multimedia file. The 'strl' chunks for the audio, video and subtitle tracks within the multimedia file include a 'strl' chunk that references a 'strh' chunk 92, a 'strf' chunk 94, a 'strd' chunk 96 and a 'strn' chunk 98. All of these chunks can be implemented in accordance with the AVI file format. Of particular interest is the 'strh' chunk 92, which specifies the type of media track, and the 'strd' chunk 96, which can be modified to indicate whether the video is protected by digital rights management. A discussion of various implementations of digital rights management in accordance with embodiments of the present invention is provided below.

Multimedia files in accordance with embodiments of the present invention can contain references to external files holding multimedia information such as an additional audio track or an additional subtitle track. The references to these tracks can either be contained in the 'hdrl' chunk or in the 'junk' chunk 41. In either case, the reference can be contained in the 'strh' chunk 92 of a 'strl' chunk 90, which references either a local file or a file stored remotely. The referenced file can be a standard AVI file or a multimedia file in accordance with an embodiment of the present invention containing the additional track.

In additional embodiments, the referenced file can contain any of the chunks that can be present in the referencing file including 'DMNU' chunks, 'DXDT' chunks and chunks associated with audio, video and/or subtitle tracks for a multimedia presentation. For example, a first multimedia file could include a 'DMNU' chunk (discussed in more detail below) that references a first multimedia presentation located within the 'movi' list chunk of the first multimedia file and a second multimedia presentation within the 'movi' list chunk of a second multimedia file. Alternatively, both 'movi' list chunks can be included in the same multimedia file, which need not be the same file as the file in which the 'DMNU' chunk is located.

2.4. The 'DXDT' chunk

The 'DXDT' chunk 38 contains so called 'meta data'. 'Meta data' is a term used to describe data that provides information about the contents of a file, document or broadcast. The 'meta data' stored within the 'DXDT' chunk of multimedia files in accordance with embodiments of the present invention can be used to store such content specific information as title, author, copyright holder and cast. In addition, technical details about the codec used to encode the multimedia file can be provided such as the CLI options used and the quantizer distribution after each pass.

In one embodiment, the meta data is represented within the 'DXDT' chunk as a series of statements, where each statement includes a subject, a predicate, an object and an authority. The subject is a reference to what is being described. The subject can reference a file, item, person or organization. The subject can reference anything having characteristics capable of description. The predicate identifies a characteristic of the subject that is being described. The object is a description of the identified characteristic of the subject and the authority identifies the source of the information.

The following is a table showing an example of how various pieces of 'meta data', can be represented as an object, a predicate, a subject and an authority:

In one embodiment, the expression of the subject, predicate, object and authority is implemented using binary representations of the data, which can be considered to form Directed-Labeled Graphs (DLGs). A DLG consists of nodes that are either resources or literals. Resources are identifiers, which can either be conformant to a naming convention such as a Universal Resource Identifier ("URI") as defined in RFC 2396 by the Internet Engineering Taskforce (http://www.ietf.org/rfc/rfc2396.txt) or refer to data specific to the system itself. Literals are representations of an actual value, rather than a reference.

An advantage of DLGs is that they allow the inclusion of a flexible number of items of data that are of the same type, such as cast members of a movie. In the example shown in Table 1, three cast members are included. However, any number of cast members can be included. DLGs also allow relational connections to other data types. In Table 1, there is a 'meta data' item that has a subject "_:file281," a predicate "Series," and an object "_:file321." The subject "_:file281" indicates that the 'meta data' refers to the content of the file referenced as "_:file321" (in this case, a movie—"Movie Title 1"). The predicate is "Series," indicating that the object will have information about another movie in the series to which the first movie belongs. However, "_:file321" is not the title or any other specific information about the series, but rather a reference to another entry that provides more information about "_:file321". The next 'meta data' entry, with the subject "_:file321", however, includes data about "_:file321," namely that the Title as specified by the Dublin Core Vocabulary as indicated by "http://purl.org/dc/elements/1.1/title" of this sequel is "Movie Title 2."

Additional 'meta data' statements in Table 1 specify that "Actor 1" was a member of the cast playing the role of "Character Name 1" and that there are two directors. Technical information is also expressed in the 'meta data.' The

TABLE 1

Conceptual representation of 'meta data'

| Subject | Predicate | Object | Authority |
| --- | --- | --- | --- |
| _:file281 | http://purl.org/dc/elements/1.1/title | 'Movie Title' | _:auth42 |
| _:file281 | http://xmlns.divxnetworks.com/2004/11/cast#Person | _:cast871 | _:auth42 |
| _:file281 | http://xmlns.divxnetworks.com/2004/11/cast#Person | _:cast872 | _:auth42 |
| _:file281 | http://xmlns.divxnetworks.com/2004/11/cast#Person | _:cast873 | _:auth42 |
| _:cast871 | http://xmlns.divxnetworks.com/2004/11/cast#name | 'Actor 1' | _:auth42 |
| _:cast871 | http://xmlns.divxnetworks.com/2004/11/cast#role | Actor | _:auth42 |
| _:cast871 | http://xmlns.divxnetworks.com/2004/11/cast#character | 'Character Name 1' | _:auth42 |
| _:cast282 | http://xmlns.divxnetworks.com/2004/11/cast#name | 'Director 1' | _:auth42 |
| _:cast282 | http://xmlns.divxnetworks.com/2004/11/cast#role | Director | _:auth42 |
| _:cast283 | http://xmlns.divxnetworks.com/2004/11/cast#name | 'Director 2' | _:auth42 |
| _:cast283 | http://xmlns.divxnetworks.com/2004/11/cast#role | Director | _:auth42 |
| _:file281 | http://purl.org/dc/elements/1.1/rights | Copyright 1998 'Studio Name'. All Rights Reserved. | _:auth42 |
| _:file281 | Series | _:file321 | _:auth42 |
| _:file321 | Episode | 2 | _:auth42 |
| _:file321 | http://purl.org/dc/elements/1.1/title | 'Movie Title 2' | _:auth42 |
| _:file321 | Series | _:file122 | _:auth42 |
| _:file122 | Episode | 3 | _:auth42 |
| _:file122 | http://purl.org/dc/elements/1.1/title | 'Movie Title 3' | _:auth42 |
| _:auth42 | http://xmlns.com/foaf/0.1/Organization | _:foaf92 | _:auth42 |
| _:foaf92 | http://xmlns.com/foaf/0.1/name | 'Studio Name' | _:auth42 |
| _:file281 | http://xmlns.divxnetworks.com/2004/11/track#track | _:track#dc00 | _:auth42 |
| _:track#dc00 | http://xmlns.divxnetworks.com/2004/11/track#resolution | 1024 × 768 | _:auth42 |
| _:file281 | http://xmlns.divxnetworks.com/2004/11/content#certificationLevel | HT | _:auth42 |
| _:track#dc00 | http://xmlns.divxnetworks.com/2004/11/track#frameTypeDist | 32,1,3,5 | _:auth42 |
| _:track#dc00 | http://xmlns.divxnetworks.com/2004/11/track#codecSettings | bv1 276 -psy 0 -key 300 -b 1- sc 50 -pq 5 -vbv 6951200,3145728,2359296- profile 3 -nf | _:auth42 |

'meta data' statements identify that "_:file281" includes track "_:track#dc00." The 'meta data' provides information including the resolution of the video track, the certification level of the video track and the codec settings. Although not shown in Table 1, the 'meta data' can also include a unique identifier assigned to a track at the time of encoding. When unique identifiers are used, encoding the same content multiple times will result in a different identifier for each encoded version of the content. However, a copy of the encoded video track would retain the identifier of the track from which it was copied.

The entries shown in Table 1 can be substituted with other vocabularies such as the UPnP vocabulary, which is defined by the UPnP forum (see http://www.upnpforum.org). Another alternative would be the Digital Item Declaration Language (DIDL) or DIDL-Lite vocabularies developed by the International Standards Organization as part of work towards the MPEG-21 standard. The following are examples of predicates within the UPnP vocabulary:

urn:schemas-upnp-org:metadata-1-0/upnp/artist
urn:schemas-upnp-org:metadata-1-0/upnp/actor
urn:schemas-upnp-org:metadata-1-0/upnp/author
urn:schemas-upnp-org:metadata-1-0/upnp/producer
urn:schemas-upnp-org:metadata-1-0/upnp/director
urn:schemas-upnp-org:metadata-1-0/upnp/genre
urn:schemas-upnp-org:metadata-1-0/upnp/album
urn:schemas-upnp-org:metadata-1-0/upnp/playlist
urn:schemas-upnp-org:metadata-1-0/upnp/originalTrackNumber
urn:schemas-upnp-org:metadata-1-0/upnp/userAnnotation The authority for all of the 'meta data' is '_:auth42.' 'Meta data' statements show that '_:auth42' is 'Studio Name.' The authority enables the evaluation of both the quality of the file and the 'meta data' statements associated with the file.

Nodes into a graph are connected via named resource nodes. A statement of 'meta data' consist of a subject node, a predicate node and an object node. Optionally, an authority node can be connected to the DLG as part of the 'meta data' statement.

For each node, there are certain characteristics that help further explain the functionality of the node. The possible types can be represented as follows using the ANSI C programming language:

```
/** Invalid Type */
#define RDF_IDENTIFIER_TYPE_UNKNOWN        0x00
/** Resource URI rdf:about */
#define RDF_IDENTIFIER_TYPE_RESOURCE       0x01
/** rdf:NodeId, _:file or generated N-Triples */
#define RDF_IDENTIFIER_TYPE_ANONYMOUS      0x02
/** Predicate URI */
#define RDF_IDENTIFIER_TYPE_PREDICATE      0x03
/** rdf:li, rdf:_<n> */
#define RDF_IDENTIFIER_TYPE_ORDINAL        0x04
/** Authority URI */
#define RDF_IDENTIFIER_TYPE_AUTHORITY      0x05
/** UTF-8 formatted literal */
#define RDF_IDENTIFIER_TYPE_LITERAL        0x06
/** Literal Integer */
#define RDF_IDENTIFIER_TYPE_INT            0x07
/** Literal XML data */
#define RDF_IDENTIFIER_TYPE_XML_LITERAL    0x08
```

An example of a data structure (represented in the ANSI C programming language) that represents the 'meta data' chunks contained within the 'DXDT' chunk is as follows:

```
typedef struct RDFDataStruct
{
    RDFHeader      Header;
    uint32_t       numOfStatements;
    RDFStatement   statements[RDF_MAX_STATEMENTS];
} RDFData;
```

The 'RDFData' chunk includes a chunk referred to as an 'RDFHeader' chunk, a value 'numOfStatements' and a list of 'RDFStatement' chunks.

The 'RDFHeader' chunk contains information about the manner in which the 'meta data' is formatted in the chunk. In one embodiment, the data in the 'RDFHeader' chunk can be represented as follows (represented in ANSI C):

```
typedef struct RDFHeaderStruct
{
    uint16_t     versionMajor;
    uint16_t     versionMinor;
    uint16_t     versionFix;
    uint16_t     numOfSchemas;
    RDFSchema    schemas[RDF_MAX_SCHEMAS];
} RDFHeader;
```

The 'RDFHeader' chunk includes a number 'version' that indicates the version of the resource description format to enable forward compatibility. The header includes a second number 'numOfSchemas' that represents the number of 'RDFSchema' chunks in the list 'schemas', which also forms part of the 'RDFHeader' chunk. In several embodiments, the 'RDFSchema' chunks are used to enable complex resources to be represented more efficiently. In one embodiment, the data contained in a 'RDFSchema' chunk can be represented as follows (represented in ANSI C):

```
typedef struct RDFSchemaStruct
{
    wchar_t*    prefix;
    wchar_t*    uri;
} RDFSchema;
```

The 'RDFSchema' chunk includes a first string of text such as 'dc' identified as 'prefix' and a second string of text such as 'http://purl.org/dc/elements/1.1/' identified as 'uri'. The 'prefix' defines a term that can be used in the 'meta data' in place of the 'uri'. The 'uri' is a Universal Resource Identifier, which can conform to a specified standardized vocabulary or be a specific vocabulary to a particular system.

Returning to the discussion of the 'RDFData' chunk. In addition to a 'RDFHeader' chunk, the 'RDFData' chunk also includes a value 'numOfStatements' and a list 'statement' of 'RDFStatement' chunks. The value 'numOfStatements' indicates the actual number of 'RDFStatement' chunks in the list 'statements' that contain information. In one embodiment, the data contained in the 'RDFStatement' chunk can be represented as follows (represented in ANSI C):

```
typedef struct RDFStatementStruct
{
    RDFSubject     subject;
    RDFPredicate                  predicate;
    RDFObject      object;
    RDFAuthority                  authority;
} RDFStatement;
```

Each 'RDFStatement' chunk contains a piece of 'meta data' concerning the multimedia file. The chunks 'subject', 'predicate', 'object' and 'authority' are used to contain the various components of the 'meta data' described above.

The 'subject' is a 'RDFSubject' chunk, which represents the subject portion of the 'meta data' described above. In one embodiment the data contained within the 'RDFSubject' chunk can be represented as follows (represented in ANSI C):

```
typedef struct RDFSubjectStruct
{
    uint16_t        type;
    wchar_t*        value;
} RDFSubject;
```

The 'RDFSubject' chunk shown above includes a value 'type' that indicates that the data is either a Resource or an anonymous node of a piece of 'meta data' and a unicode text string 'value', which contains data representing the subject of the piece of 'meta data'. In embodiments where an 'RDFSchema' chunk has been defined the value can be a defined term instead of a direct reference to a resource.

The 'predicate' in a 'RDFStatement' chunk is a 'RDFPredicate' chunk, which represents the predicate portion of a piece of 'meta data'. In one embodiment the data contained within a 'RDFPredicate' chunk can be represented as follows (represented in ANSI C):

```
typedef struct RDFPredicateStruct
{
    uint16_t        type;
    wchar_t*        value;
} RDFPredicate;
```

The 'RDFPredicate' chunk shown above includes a value 'type' that indicates that the data is the predicate URI or an ordinal list entry of a piece of 'meta data' and a text string 'value,' which contains data representing the predicate of a piece of 'meta data.' In embodiments where an 'RDFSchema' chunk has been defined the value can be a defined term instead of a direct reference to a resource.

The 'object' in a 'RDFStatement' chunk is a 'RDFObject' chunk, which represents the object portion of a piece of 'meta data.' In one embodiment, the data contained in the 'RDFObject' chunk can be represented as follows (represented in ANSI C):

```
typedef struct RDFObjectStruct
{
    uint16_t        type;
    wchar_t*        language;
    wchar_t*        dataTypeURI;
    wchar_t*        value;
} RDFObject;
```

The 'RDFObject' chunk shown above includes a value 'type' that indicates that the piece of data is a UTF-8 literal string, a literal integer or literal XML data of a piece of 'meta data.' The chunk also includes three values. The first value 'language' is used to represent the language in which the piece of 'meta data' is expressed (e.g. a film's title may vary in different languages). In several embodiments, a standard representation can be used to identify the language (such as RFC 3066—Tags for the Identification of Languages specified by the Internet Engineering Task Force, see http://www.ietf.org/rfc/rfc3066.txt). The second value 'dataTypeURI' is used to indicate the type of data that is contained within the 'value' field if it can not be explicitly indicated by the 'type' field. The URI specified by the dataTypeURI points to general RDF URI Vocabulary used to describe the particular type of the Data is used. Different formats in which the URI can be expressed are described at http://www.w3.org/TR/rdf-concepts/#section-Datatypes. In one embodiment, the 'value' is a 'wide character.' In other embodiments, the 'value' can be any of a variety of types of data from a single bit, to an image or a video sequence. The 'value' contains the object piece of the 'meta data.'

The 'authority' in a 'RDFStatement' chunk is a 'RDFAuthority' chunk, which represents the authority portion of a piece of 'meta data.' In one embodiment the data contained within the 'RDFAuthority' chunk can be represented as follows (represented in ANSI C):

```
typedef struct RDFAuthorityStruct
{
    uint16_t        type;
    wchar_t*        value;
} RDFAuthority;
```

The 'RDFAuthority' data structure shown above includes a value 'type' that indicates the data is a Resource or an anonymous node of a piece of 'meta data.' The 'value' contains the data representing the authority for the 'meta data.' In embodiments where an 'RDFSchema' chunk has been defined the value can be a defined term instead of a direct reference to a resource.

A conceptual representation of the storage of a 'DXDT' chunk of a multimedia file in accordance with an embodiment of the present invention is shown in FIG. 2.3. The 'DXDT' chunk 38 includes an 'RDFHeader' chunk 110, a 'numOfStatements' value 112 and a list of RDFStatement chunks 114. The RDFHeader chunk 110 includes a 'version' value 116, a 'numOfSchemas' value 118 and a list of 'Schema' chunks 120. Each 'RDFStatement' chunk 114 includes a 'RDFSubject' chunk 122, a 'RDFPredicate' chunk 124, a 'RDFObject' chunk 126 and a 'RDFAuthority' chunk 128. The 'RDFSubject' chunk includes a 'type' value 130 and a 'value' value 132. The 'RDFPredicate' chunk 124 also includes a 'type' value 134 and a 'value' value 136. The 'RDFObject' chunk 126 includes a 'type' value 138, a 'language' value 140 (shown in the figure as 'lang'), a 'dataTypeURI' value 142 (shown in the figure as 'dataT') and a 'value' value 144. The 'RDFAuthority' chunk 128 includes a 'type' value 146 and a 'value' value 148. Although the illustrated 'DXDT' chunk is shown as including a single 'Schema' chunk and a single 'RDFStatement' chunk, one of ordinary skill in the art will readily appreciate that different numbers of 'Schema' chunks and 'RDFStatement' chunks can be used in a chunk that describes 'meta data.'

As is discussed below, multimedia files in accordance with embodiments of the present invention can be continuously modified and updated. Determining in advance the 'meta data' to associate with the file itself and the 'meta data' to access remotely (e.g. via the internet) can be difficult. Typically, sufficient 'meta data' is contained within a multimedia file in accordance with an embodiment of the present invention in order to describe the contents of the file. Additional information can be obtained if the device reviewing the file is capable of accessing via a network other devices containing 'meta data' referenced from within the file.

The methods of representing 'meta data' described above can be extendable and can provide the ability to add and remove different 'meta data' fields stored within the file as the need for it changes over time. In addition, the representation of 'meta data' can be forward compatible between revisions.

The structured manner in which 'meta data' is represented in accordance with embodiments of the present invention enables devices to query the multimedia file to better determine its contents. The query could then be used to update the contents of the multimedia file, to obtain additional 'meta data' concerning the multimedia file, generate a menu relating to the contents of the file or perform any other function involving the automatic processing of data represented in a standard format. In addition, defining the length of each parseable element of the 'meta data' can increase the ease with which devices with limited amounts of memory, such as consumer electronics devices, can access the 'meta data'.

In other embodiments, the 'meta data' is represented using individual chunks for each piece of 'meta data.' Several 'DXDT' chunks in accordance with the present invention include a binary chunk containing 'meta data' encoded as described above and additional chunks containing individual pieces of 'meta data' formatted either as described above or in another format. In embodiments where binary 'meta data' is included in the 'DXDT' chunk, the binary 'meta data' can be represented using 64-bit encoded ASCII. In other embodiments, other binary representations can be used.

Examples of individual chunks that can be included in the 'DXDT' chunk in accordance with the present invention are illustrated in FIGS. 2.3.1, 2.3.1.A, and 2.3.1.B. The 'meta data' includes a 'MetaData' chunk 150 that can contain a 'PixelAspectRatioMetaData' chunk 152a, an 'EncoderURIMetaData' chunk 152b, a 'CodecSettingsMetaData' chunk 152c, a 'FrameTypeMetaData' chunk 152d, a 'VideoResolutionMetaData' chunk 152e, a 'PublisherMetaData' chunk 152f, a 'CreatorMetaData' chunk 152g, a 'GenreMetaData' chunk 152h, a 'CreatorToolMetaData' chunk 152i, a 'RightsMetaData' chunk 152j, a 'RunTimeMetaData' chunk 152k, a 'QuantizerMetaData' chunk 152l, a 'CodecInfoMetaData' chunk 152m, a 'EncoderNameMetaData' chunk 152n, a 'FrameRateMetaData' chunk 152o, a 'InputSourceMetaData' chunk 152p, a 'FileIDMetaData' chunk 152q, a 'TypeMetaData' chunk 152r, a 'TitleMetaData' chunk 152s and/or a 'CertLevelMetaData' chunk 152t.

The 'PixelAspectRatioMetaData' chunk 152a includes information concerning the pixel aspect ratio of the encoded video. The 'EncoderURIMetaData' chunk 152b includes information concerning the encoder. The 'CodecSettingsMetaData' chunk 152c includes information concerning the settings of the codec used to encode the video. The 'FrameTypeMetaData' chunk 152d includes information concerning the video frames. The 'VideoResolutionMetaData' chunk 152e includes information concerning the video resolution of the encoded video. The 'PublisherMetaData' chunk 152f includes information concerning the person or organization that published the media. The 'CreatorMetaData' chunk 152g includes information concerning the creator of the content. The 'GenreMetaData' chunk 152h includes information concerning the genre of the media. The 'CreatorToolMetaData' chunk 152i includes information concerning the tool used to create the file. The 'RightsMetaData' chunk 152j includes information concerning DRM. The 'RunTimeMetaData' chunk 152k includes information concerning the run time of the media. The 'QuantizerMetaData' chunk 152l includes information concerning the quantizer used to encode the video. The 'CodecInfoMetaData' chunk 152m includes information concerning the codec. The 'EncoderNameMetaData' chunk 152n includes information concerning the name of the encoder. The FrameRateMetaData' chunk 152o includes information concerning the frame rate of the media. The 'InputSourceMetaData' chunk 152p includes information concerning the input source. The 'FileIDMetaData' chunk 152q includes a unique identifier for the file. The 'TypeMetaData' chunk 152r includes information concerning the type of the multimedia file. The 'TitleMetaData' chunk 152s includes the title of the media and the 'CertLevelMetaData' chunk 152t includes information concerning the certification level of the media. In other embodiments, additional chunks can be included that contain additional 'meta data.' In several embodiments, a chunk containing 'meta data' in a binary format as described above can be included within the 'MetaData' chunk. In one embodiment, the chunk of binary 'meta data' is encoded as 64-bit ASCII.

2.5. The 'DMNU' Chunks

Referring to FIGS. 2.0. and 2.0.1., a first 'DMNU' chunk 40 (40') and a second 'DMNU' chunk 46 (46') are shown. In FIG. 2.0. the second 'DMNU' chunk 46 forms part of the multimedia file 30. In the embodiment illustrated in FIG. 2.0.1., the 'DMNU' chunk 46' is contained within a separate RIFF chunk. In both instances, the first and second 'DMNU' chunks contain data that can be used to display navigable menus. In one embodiment, the first 'DMNU' chunk 40 (40') contains data that can be used to create a simple menu that does not include advanced features such as extended background animations. In addition, the second 'DMNU' chunk 46 (46') includes data that can be used to create a more complex menu including such advanced features as an extended animated background.

The ability to provide a so-called 'lite' menu can be useful for consumer electronics devices that cannot process the amounts of data required for more sophisticated menu systems. Providing a menu (whether 'lite' or otherwise) prior to the 'movi' list chunk 42 can reduce delays when playing embodiments of multimedia files in accordance with the present invention in streaming or progressive download applications. In several embodiments, providing a simple and a complex menu can enable a device to choose the menu that it wishes to display. Placing the smaller of the two menus before the 'movi' list chunk 42 enables devices in accordance with embodiments of the present invention that cannot display menus to rapidly skip over information that cannot be displayed.

In other embodiments, the data required to create a single menu is split between the first and second 'DMNU' chunks. Alternatively, the 'DMNU' chunk can be a single chunk before the 'movi' chunk containing data for a single set of menus or multiple sets of menus. In other embodiments, the 'DMNU' chunk can be a single or multiple chunks located in other locations throughout the multimedia file.

In several multimedia files in accordance with the present invention, the first 'DMNU' chunk 40 (40') can be automatically generated based on a 'richer' menu in the second 'DMNU' chunk 46 (46'). The automatic generation of menus is discussed in greater detail below.

The structure of a 'DMNU' chunk in accordance with an embodiment of the present invention is shown in FIG. 2.4. The 'DMNU' chunk 158 is a list chunk that contains a menu chunk 160 and an 'MRIF' chunk 162. The menu chunk contains the information necessary to construct and navigate through the menus. The 'MRIF' chunk contains media information that can be used to provide subtitles, background video and background audio to the menus. In several embodiments, the 'DMNU' chunk contains menu information enabling the display of menus in several different languages.

In one embodiment, the 'WowMenu' chunk 160 contains the hierarchy of menu chunk objects that are conceptually illustrated in FIG. 2.5. At the top of the hierarchy is the WowMenuManager chunk 170. The WowMenuManager chunk can contain one or more 'LanguageMenus' chunks 172 and one 'Media' chunk 174.

Use of 'LanguageMenus' chunks 172 enables the 'DMNU' chunk 158 to contain menu information in different languages. Each 'LanguageMenus' chunk 172 contains the information used to generate a complete set of menus in a specified language. Therefore, the 'LanguageMenus' chunk includes an identifier that identifies the language of the information associated with the 'LanguageMenus' chunk. The 'LanguageMenus' chunk also includes a list of 'WowMenu' chunks 175.

Each 'WowMenu' chunk 175 contains all of the information to be displayed on the screen for a particular menu. This information can include background video and audio. The information can also include data concerning button actions that can be used to access other menus or to exit the menu and commence displaying a portion of the multimedia file. In one embodiment, the 'WowMenu' chunk 175 includes a list of references to media. These references refer to information contained in the 'Media' chunk 174, which will be discussed further below. The references to media can define the background video and background audio for a menu. The 'WowMenu' chunk 175 also defines an overlay that can be used to highlight a specific button, when a menu is first accessed.

In addition, each 'WowMenu' chunk 175 includes a number of 'ButtonMenu' chunks 176. Each 'ButtonMenu' chunk defines the properties of an onscreen button. The 'ButtonMenu' chunk can describe such things as the overlay to use when the button is highlighted by the user, the name of the button and what to do in response to various actions performed by a user navigating through the menu. The responses to actions are defined by referencing an 'Action' chunk 178. A single action, e.g. selecting a button, can result in several 'Action' chunks being accessed. In embodiments where the user is capable of interacting with the menu using a device such as a mouse that enables an on-screen pointer to move around the display in an unconstrained manner, the on-screen location of the buttons can be defined using a 'MenuRectangle' chunk 180. Knowledge of the on-screen location of the button enables a system to determine whether a user is selecting a button, when using a free ranging input device.

Each 'Action' chunk identifies one or more of a number of different varieties of action related chunks, which can include a 'PlayAction' chunk 182, a 'MenuTransitionAction' chunk 184, a 'ReturnToPlayAction' chunk 186, an 'AudioSelectAction' chunk 188, a 'SubtitleSelectAction' chunk 190 and a 'ButtonTransitionAction' chunk 191. A 'PlayAction' chunk 182 identifies a portion of each of the video, audio and subtitle tracks within a multimedia file. The 'PlayAction' chunk references a portion of the video track using a reference to a 'MediaTrack' chunk (see discussion below). The 'PlayAction' chunk identifies audio and subtitle tracks using 'SubtitleTrack' 192 and 'AudioTrack' 194 chunks. The 'SubtitleTrack' and 'AudioTrack' chunks both contain references to a 'MediaTrack' chunk 198. When a 'PlayAction' chunk forms the basis of an action in accordance with embodiments of the present invention, the audio and subtitle tracks that are selected are determined by the values of variables set initially as defaults and then potentially modified by a user's interactions with the menu.

Each 'MenuTransitionAction' chunk 184 contains a reference to a 'WowMenu' chunk 175. This reference can be used to obtain information to transition to and display another menu.

Each 'ReturnToPlayAction' chunk 186 contains information enabling a player to return to a portion of the multimedia file that was being accessed prior to the user bringing up a menu.

Each 'AudioSelectAction' chunk 188 contains information that can be used to select a particular audio track. In one embodiment, the audio track is selected from audio tracks contained within a multimedia file in accordance with an embodiment of the present invention. In other embodiments, the audio track can be located in an externally referenced file.

Each 'SubtitleSelectAction' chunk 190 contains information that can be used to select a particular subtitle track. In one embodiment, the subtitle track is selected from a subtitle contained within a multimedia file in accordance with an embodiment of the present invention. In other embodiments, the subtitle track can be located in an externally referenced file.

Each 'ButtonTransitionAction' chunk 191 contains information that can be used to transition to another button in the same menu. This is performed after other actions associated with a button have been performed.

The 'Media' chunk 174 includes a number of 'MediaSource' chunks 166 and 'MediaTrack' chunks 198. The 'Media' chunk defines all of the multimedia tracks (e.g., audio, video, subtitle) used by the feature and the menu system. Each 'MediaSource' chunk 196 identifies a RIFF chunk within the multimedia file in accordance with an embodiment of the present invention, which, in turn, can include multiple RIFF chunks. Each 'MediaTrack' chunk 198 identifies a portion of a multimedia track within a RIFF chunk specified by a 'MediaSource' chunk.

The 'MRIF' chunk 162 is, essentially, its own small multimedia file that complies with the RIFF format. The 'MRIF' chunk contains audio, video and subtitle tracks that can be used to provide background audio and video and overlays for menus. The 'MRIF' chunk can also contain video to be used as overlays to indicate highlighted menu buttons. In embodiments where less menu data is required, the background video can be a still frame (a variation of the AVI format) or a small sequence of identical frames. In other embodiments, more elaborate sequences of video can be used to provide the background video.

As discussed above, the various chunks that form part of a 'WowMenu' chunk 175 and the 'WowMenu' chunk itself contain references to actual media tracks. Each of these references is typically to a media track defined in the 'hdrl' LIST chunk of a RIFF chunk.

Other chunks that can be used to create a 'DMNU' chunk in accordance with the present invention are shown in FIG. 2.6. The 'DMNU' chunk includes a WowMenuManager chunk 170'. The 'WowMenuManager chunk 170' can contain at least one 'LanguageMenus' chunk 172', at least one 'Media' chunk 174' and at least one 'TranslationTable' chunk 200.

The contents of the 'LanguageMenus' chunk 172' is largely similar to that of the 'LanguageMenus' chunk 172 illustrated in FIG. 2.5. The main difference is that the 'PlayAction' chunk 182' does not contain 'SubtitleTrack' chunks 192 and 'AudioTrack' chunks 194.

The 'Media' chunk 174' is significantly different from the 'Media' chunk 174 shown in FIG. 2.5. The 'Media' chunk 174' contains at least one 'Title' chunk 202 and at least one 'MenuTracks' chunk 204. The 'Title' chunk refers to a title within the multimedia file. As discussed above, multimedia files in accordance with embodiments of the present invention can include more than one title (e.g. multiple episodes in a television series, an related series of full length features or simply a selection of different features). The 'MenuTracks' chunk 204 contains information concerning media information that is used to create a menu display and the audio soundtrack and subtitles accompanying the display.

The 'Title' chunk can contain at least one 'Chapter' chunk 206. The 'Chapter' chunk 206 references a scene within a particular title. The 'Chapter' chunk 206 contains references to the portions of the video track, each audio track and each subtitle track that correspond to the scene indicated by the 'Chapter' chunk. In one embodiment, the references are implemented using 'MediaSource' chunks 196' and 'MediaTrack' chunks 198' similar to those described above in relation to FIG. 2.5. In several embodiments, a 'MediaTrack' chunk references the appropriate portion of the video track and a number of additional 'MediaTrack' chunks each reference one of the audio tracks or subtitle tracks. In one embodiment, all of the audio tracks and subtitle tracks corresponding to a particular video track are referenced using separate 'MediaTrack' chunks.

As described above, the 'MenuTracks' chunks 204 contain references to the media that are used to generate the audio, video and overlay media of the menus. In one embodiment, the references to the media information are made using 'MediaSource' chunks 196' and 'MediaTrack' chunks 198' contained within the 'MenuTracks' chunk. In one embodiment, the 'MediaSource' chunks 196' and 'MediaTrack' chunks 198' are implemented in the manner described above in relation to FIG. 2.5.

The 'TranslationTable' chunk 200 can be used to contain text strings describing each title and chapter in a variety of languages. In one embodiment, the 'TranslationTable' chunk 200 includes at least one 'TranslationLookup' chunk 208. Each 'TranslationLookup' chunk 208 is associated with a 'Title' chunk 202, a 'Chapter' chunk 206 or a 'MediaTrack' chunk 196' and contains a number of 'Translation' chunks 210. Each of the 'Translation' chunks in a 'TranslationLookup' chunk contains a text string that describes the chunk associated with the 'TranslationLookup' chunk in a language indicated by the 'Translation' chunk.

A diagram conceptually illustrating the relationships between the various chunks contained within a 'DMNU' chunk is illustrated in FIG. 2.6.1. The figure shows the containment of one chunk by another chunk using a solid arrow. The direction in which the arrow points indicates the chunk contained by the chunk from which the arrow originates. References by one chunk to another chunk are indicated by a dashed line, where the referenced chunk is indicated by the dashed arrow.

2.6. The 'Junk' Chunk

The 'junk' chunk 41 is an optional chunk that can be included in multimedia files in accordance with embodiments of the present invention. The nature of the 'junk' chunk is specified in the AVI file format.

2.7. The 'Movi' List Chunk

The 'movi' list chunk 42 contains a number of 'data' chunks. Examples of information that 'data' chunks can contain are audio, video or subtitle data. In one embodiment, the 'movi' list chunk includes data for at least one video track, multiple audio tracks and multiple subtitle tracks.

The interleaving of 'data' chunks in the 'movi' list chunk 42 of a multimedia file containing a video track, three audio tracks and three subtitle tracks is illustrated in FIG. 2.7. For convenience sake, a 'data' chunk containing video will be described as a 'video' chunk, a 'data' chunk containing audio will be referred to as an 'audio' chunk and a 'data' chunk containing subtitles will be referenced as a 'subtitle' chunk. In the illustrated 'movi' list chunk 42, each 'video' chunk 262 is separated from the next 'video' chunk by 'audio' chunks 264 from each of the audio tracks. In several embodiments, the 'audio' chunks contain the portion of the audio track corresponding to the portion of video contained in the 'video' chunk following the 'audio' chunk.

Adjacent 'video' chunks may also be separated by one or more 'subtitle' chunks 266 from one of the subtitle tracks. In one embodiment, the 'subtitle' chunk 266 includes a subtitle and a start time and a stop time. In several embodiments, the 'subtitle' chunk is interleaved in the 'movi' list chunk such that the 'video' chunk following the 'subtitle' chunk includes the portion of video that occurs at the start time of the subtitle. In other embodiments, the start time of all 'subtitle' and 'audio' chunks is ahead of the equivalent start time of the video. In one embodiment, the 'audio' and 'subtitle' chunks can be placed within 5 seconds of the corresponding 'video' chunk and in other embodiments the 'audio' and 'subtitle' chunks can be placed within a time related to the amount of video capable of being buffered by a device capable of displaying the audio and video within the file.

In one embodiment, the 'data' chunks include a 'FOURCC' code to identify the stream to which the 'data' chunk belongs. The 'FOURCC' code consists of a two-digit stream number followed by a two-character code that defines the type of information in the chunk. An alternate 'FOURCC' code consists of a two-character code that defines the type of information in the chunk followed by the two-digit stream number. Examples of the two-character code are shown in the following table:

TABLE 2

Selected two-character codes used in FOURCC codes

| Two-character code | Description |
| --- | --- |
| db | Uncompressed video frame |
| dc | Compressed video frame |
| dd | DRM key info for the video frame |
| pc | Palette change |
| wb | Audio data |
| st | Subtitle (text mode) |
| sb | Subtitle (bitmap mode) |
| ch | Chapter |

In one embodiment, the structure of the 'video' chunks 262 and 'audio' chunks 264 complies with the AVI file format. In other embodiments, other formats for the chunks can be used that specify the nature of the media and contain the encoded media.

In several embodiments, the data contained within a 'subtitle' chunk 266 can be represented as follows:

```
typedef struct _subtitlechunk {
    FOURCC fcc;
    DWORD cb;
    STR duration;
    STR subtitle;
} SUBTITLECHUNK;
```

The value 'fcc' is the FOURCC code that indicates the subtitle track and nature of the subtitle track (text or bitmap mode). The value 'cb' specifies the size of the structure. The value 'duration' specifies the time at the starting and ending point of the subtitle. In one embodiment, it can be in the form hh:mm:ss.xxx-hh:mm:ss.xxx. The hh represent the hours, mm the minutes, ss the seconds and xxx the milliseconds. The value 'subtitle' contains either the Unicode text of the subtitle in text mode or a bitmap image of the subtitle in the bitmap mode. Several embodiments of the present invention use compressed bitmap images to represent the subtitle information. In one embodiment, the 'subtitle' field contains information concerning the width, height and onscreen position of the subtitle. In addition, the 'subtitle' field can also contain color information and the actual pixels of the bit map. In several embodiments, run length coding is used to reduce the amount of pixel information required to represent the bitmap.

Multimedia files in accordance with embodiments of the present invention can include digital rights management. This information can be used in video on demand applications. Multimedia files that are protected by digital rights management can only be played back correctly on a player that has been granted the specific right of playback. In one embodiment, the fact that a track is protected by digital rights management can be indicated in the information about the track in the 'hdrl' list chunk (see description above). A multimedia file in accordance with an embodiment of the present invention that includes a track protected by digital rights management can also contain information about the digital rights management in the 'movi' list chunk.

A 'movi' list chunk of a multimedia file in accordance with an embodiment of the present invention that includes a video track, multiple audio tracks, at least one subtitle track and information enabling digital rights management is illustrated in FIG. 2.8. The 'movi' list chunk 42' is similar to the 'movi' list chunk shown in FIG. 2.7. with the addition of a 'DRM' chunk 270 prior to each video chunk 262'. The 'DRM' chunks 270 are 'data' chunks that contain digital rights management information, which can be identified by a FOURCC code 'nndd'. The first two characters 'nn' refer to the track number and the second two characters are 'dd' to signify that the chunk contains digital rights management information. In one embodiment, the 'DRM' chunk 270 provides the digital rights management information for the 'video' chunk 262' following the 'DRM' chunk. A device attempting to play the digital rights management protected video track uses the information in the 'DRM' chunk to decode the video information in the 'video' chunk. Typically, the absence of a 'DRM' chunk before a 'video' chunk is interpreted as meaning that the 'video' chunk is unprotected.

In an encryption system in accordance with an embodiment of the present invention, the video chunks are only partially encrypted. Where partial encryption is used, the 'DRM' chunks contain a reference to the portion of a 'video' chunk that is encrypted and a reference to the key that can be used to decrypt the encrypted portion. The decryption keys can be located in a 'DRM' header, which is part of the 'strd' chunk (see description above). The decryption keys are scrambled and encrypted with a master key. The 'DRM' header also contains information identifying the master key.

A conceptual representation of the information in a 'DRM' chunk is shown in FIG. 2.9. The 'DRM' chunk 270 can include a 'frame' value 280, a 'status' value 282, an 'offset' value 284, a 'number' value 286 and a 'key' value 288. The 'frame' value can be used to reference the encrypted frame of video. The 'status' value can be used to indicate whether the frame is encrypted, the 'offset' value 284 points to the start of the encrypted block within the frame and the 'number' value 286 indicates the number of encrypted bytes in the block. The 'key' value 288 references the decryption key that can be used to decrypt the block.

2.8. The 'idx1' Chunk

The 'idx1' chunk 44 is an optional chunk that can be used to index the 'data' chunks in the 'movi' list chunk 42. In one embodiment, the 'idx1' chunk can be implemented as specified in the AVI format. In other embodiments, the 'idx1' chunk can be implemented using data structures that reference the location within the file of each of the 'data' chunks in the 'movi' list chunk. In several embodiments, the 'idx1' chunk identifies each 'data' chunk by the track number of the data and the type of the data. The FOURCC codes referred to above can be used for this purpose.

3. Encoding a Multimedia File

Embodiments of the present invention can be used to generate multimedia files in a number of ways. In one instance, systems in accordance with embodiments of the present invention can generate multimedia files from files containing separate video tracks, audio tracks and subtitle tracks. In such instances, other information such as menu information and 'meta data' can be authored and inserted into the file.

Other systems in accordance with embodiments of the present invention can be used to extract information from a number of files and author a single multimedia file in accordance with an embodiment of the present invention. Where a CD-R is the initial source of the information, systems in accordance with embodiments of the present invention can use a codec to obtain greater compression and can re-chunk the audio so that the audio chunks correspond to the video chunks in the newly created multimedia file. In addition, any menu information in the CD-R can be parsed and used to generate menu information included in the multimedia file.

Other embodiments can generate a new multimedia file by adding additional content to an existing multimedia file in accordance with an embodiment of the present invention. An example of adding additional content would be to add an additional audio track to the file such as an audio track containing commentary (e.g. director's comments, after-created narrative of a vacation video). The additional audio track information interleaved into the multimedia file could also be accompanied by a modification of the menu information in the multimedia file to enable the playing of the new audio track.

3.1. Generation Using Stored Data Tracks

A system in accordance with an embodiment of the present invention for generating a multimedia file is illustrated in FIG. 3.0. The main component of the system 350 is the interleaver 352. The interleaver receives chunks of information and interleaves them to create a multimedia file in accordance with an embodiment of the present invention in the format described above. The interleaver also receives information concerning 'meta data' from a meta data manager 354. The interleaver outputs a multimedia file in accordance with embodiments of the present invention to a storage device 356.

Typically the chunks provided to the interleaver are stored on a storage device. In several embodiments, all of the chunks are stored on the same storage device. In other embodiments, the chunks may be provided to the interleaver from a variety of storage devices or generated and provided to the interleaver in real time.

In the embodiment illustrated in FIG. 3.0., the 'DMNU' chunk 358 and the 'DXDT' chunk 360 have already been generated and are stored on storage devices. The video source 362 is stored on a storage device and is decoded using a video decoder 364 and then encoded using a video encoder 366 to generate a 'video' chunk. The audio sources 368 are also stored on storage devices. Audio chunks are generated by decoding the audio source using an audio decoder 370 and then encoding the decoded audio using an audio encoder 372. 'Subtitle' chunks are generated from text subtitles 374 stored on a storage device. The subtitles are provided to a first transcoder 376, which converts any of a number of subtitle formats into a raw bitmap format. In one embodiment, the stored subtitle format can be a format such as SRT, SUB or SSA. In addition, the bitmap format can be that of a four bit bitmap including a color palette look-up table. The color palette look-up table includes a 24 bit color depth identification for each of the sixteen possible four bit color codes. A single multimedia file can include more than one color palette look-up table (see "pc" palette FOURCC code in Table 2 above). The four bit bitmap thus allows each menu to have 16 different simultaneous colors taken from a palette of 16 million colors. In alternative embodiments different numbers of bit per pixel and different color depths are used. The output of the first transcoder 376 is provided to a second transcoder 378, which compresses the bitmap. In one embodiment run length coding is used to compress the bitmap. In other embodiments, other suitable compression formats are used.

In one embodiment, the interfaces between the various encoders, decoder and transcoders conform with Direct Show standards specified by Microsoft Corporation. In other embodiments, the software used to perform the encoding, decoding and transcoding need not comply with such standards.

In the illustrated embodiment, separate processing components are shown for each media source. In other embodiments resources can be shared. For example, a single audio decoder and audio encoder could be used to generate audio chunks from all of the sources. Typically, the entire system can be implemented on a computer using software and connected to a storage device such as a hard disk drive.

In order to utilize the interleaver in the manner described above, the 'DMNU' chunk, the 'DXDT' chunk, the 'video' chunks, the 'audio' chunks and the 'subtitle' chunks in accordance with embodiments of the present invention must be generated and provided to the interleaver. The process of generating each of the various chunks in a multimedia file in accordance with an embodiment of the present invention is discussed in greater detail below.

3.2. Generating a 'DXDT' Chunk

The 'DXDT' chunk can be generated in any of a number of ways. In one embodiment, 'meta data' is entered into data structures via a graphical user interface and then parsed into a 'DXDT' chunk. In one embodiment, the 'meta data' is expressed as series of subject, predicate, object and authority statements. In another embodiment, the 'meta data' statements are expressed in any of a variety of formats. In several embodiments, each 'meta data' statement is parsed into a separate chunk. In other embodiments, several 'meta data' statements in a first format (such as subject, predicate, object, authority expressions) are parsed into a first chunk and other 'meta data' statements in other formats are parsed into separate chunks. In one embodiment, the 'meta data' statements are written into an XML configuration file and the XML configuration file is parsed to create the chunks within a 'DXDT' chunk.

An embodiment of a system for generating a 'DXDT' chunk from a series of 'meta data' statements contained within an XML configuration file is shown in FIG. 3.1. The system 380 includes an XML configuration file 382, which can be provided to a parser 384. The XML configuration file includes the 'meta data' encoded as XML. The parser parses the XML and generates a 'DXDT' chunk 386 by converting the 'meta data' statement into chunks that are written to the 'DXDT' chunk in accordance with any of the 'meta data' chunk formats described above.

3.3. Generating a 'DMNU' Chunk

A system that can be used to generate a 'DMNU' chunk in accordance with an embodiment of the present invention is illustrated in FIG. 3.2. The menu chunk generating system 420 requires as input a media model 422 and media information. The media information can take the form of a video source 424, an audio source 426 and an overlay source 428.

The generation of a 'DMNU' chunk using the inputs to the menu chunk generating system involves the creation of a number of intermediate files. The media model 422 is used to create an XML configuration file 430 and the media information is used to create a number of AVI files 432. The XML configuration file is created by a model transcoder 434. The AVI files 432 are created by interleaving the video, audio and overlay information using an interleaver 436. The video information is obtained by using a video decoder 438 and a video encoder 440 to decode the video source 424 and recode it in the manner discussed below. The audio information is obtained by using an audio decoder 442 and an audio encoder 444 to decode the audio and encode it in the manner described below. The overlay information is generated using a first transcoder 446 and a second transcoder 448. The first transcoder 446 converts the overlay into a graphical representation such as a standard bitmap and the second transcoder takes the graphical information and formats it as is required for inclusion in the multimedia file. Once the XML file and the AVI files containing the information required to build the menus have been generated, the menu generator 450 can use the information to generate a 'DMNU' chunk 358'.

3.3.1. The Menu Model

In one embodiment, the media model is an object-oriented model representing all of the menus and their subcomponents. The media model organizes the menus into a hierarchical structure, which allows the menus to be organized by language selection. A media model in accordance with an embodiment of the present invention is illustrated in FIG. 3.3. The media model 460 includes a top-level 'MediaManager' object 462, which is associated with a number of 'LanguageMenus' objects 463, a 'Media' object 464 and a 'TranslationTable' object 465. The 'Menu Manager' also contains the default menu language. In one embodiment, the default language can be indicated by ISO 639 two-letter language code.

The 'LanguageMenus' objects organize information for various menus by language selection. All of the 'Menu' objects 466 for a given language are associated with the 'LanguageMenus' object 463 for that language. Each 'Menu' object is associated with a number of 'Button' objects 468 and references a number of 'MediaTrack' objects 488. The referenced 'MediaTrack' objects 488 indicated the background video and background audio for the 'Menu' object 466.

Each 'Button' object 468 is associated with an 'Action' object 470 and a 'Rectangle' object 484. The 'Button' object 468 also contains a reference to a 'MediaTrack' object 488 that indicates the overlay to be used when the button is highlighted on a display. Each 'Action' object 470 is associated with a number of objects that can include a 'MenuTransition' object 472, a 'ButtonTransition' object 474, a 'ReturnToPlay' object 476, a 'Subtitle Selection' object 478, an 'AudioSelection' object 480 and a 'PlayAction' object 482. Each of these objects define the response of the menu system to various inputs from a user. The 'MenuTransition' object contains a reference to a 'Menu' object that indicates a menu that should be transitioned to in response to an action. The 'ButtonTransition' object indicates a button that should be highlighted in response to an action. The 'ReturnToPlay' object can cause a player to resume playing a feature. The 'SubtitleSelection' and 'AudioSelection' objects contain references to 'Title' objects 487 (discussed below). The 'PlayAction' object contains a reference to a 'Chapter' object 492 (discussed below). The 'Rectangle' object 484 indicates the portion of the screen occupied by the button.

The 'Media' object 464 indicates the media information referenced in the menu system. The 'Media' object has a 'MenuTracks' object 486 and a number of 'Title' objects 487 associated with it. The 'MenuTracks' object 486 references 'MediaTrack' objects 488 that are indicative of the media used to construct the menus (i.e. background audio, background video and overlays).

The 'Title' objects 487 are indicative of a multimedia presentation and have a number of 'Chapter' objects 492 and 'MediaSource' objects 490 associated with them. The 'Title' objects also contain a reference to a 'TranslationLookup' object 494. The 'Chapter' objects are indicative of a certain point in a multimedia presentation and have a number of 'MediaTrack' objects 488 associated with them. The 'Chapter' objects also contain a reference a 'TranslationLookup' object 494. Each 'MediaTrack' object associated with a 'Chapter' object is indicative of a point in either an audio, video or subtitle track of the multimedia presentation and references a 'MediaSource' object 490 and a 'TransalationLookup' object 494 (discussed below).

The 'TranslationTable' object 465 groups a number of text strings that describe the various parts of multimedia presentations indicated by the 'Title' objects, the 'Chapter' objects and the 'MediaTrack' objects. The 'TranslationTable' object 465 has a number of 'TranslationLookup' objects 494 associated with it. Each 'TranslationLookup' object is indicative of a particular object and has a number of 'Translation' objects 496 associated with it. The 'Translation' objects are each indicative of a text string that describes the object indicated by the 'TranslationLookup' object in a particular language.

A media object model can be constructed using software configured to generate the various objects described above and to establish the required associations and references between the objects.

3.3.2. Generating an XML File

An XML configuration file is generated from the menu model, which represents all of the menus and their subcomponents. The XML configuration file also identifies all the media files used by the menus. The XML can be generated by implementing an appropriate parser application that parses the object model into XML code.

In other embodiments, a video editing application can provide a user with a user interface enabling the direct generation of an XML configuration file without creating a menu model.

In embodiments where another menu system is the basis of the menu model, such as a DVD menu, the menus can be pruned by the user to eliminate menu options relating to content not included in the multimedia file generated in accordance with the practice of the present invention. In one embodiment, this can be done by providing a graphical user interface enabling the elimination of objects from the menu model. In another embodiment, the pruning of menus can be achieved by providing a graphical user interface or a text interface that can edit the XML configuration file.

3.3.3. The Media Information

When the 'DMNU' chunk is generated, the media information provided to the menu generator 450 includes the data required to provide the background video, background audio and foreground overlays for the buttons specified in the menu model (see description above). In one embodiment, a video editing application such as VideoWave distributed by Roxio, Inc. of Santa Clara, Calif. is used to provide the source media tracks that represent the video, audio and button selection overlays for each individual menu.

3.3.4. Generating Intermediate AVI Files

As discussed above, the media tracks that are used as the background video, background audio and foreground button overlays are stored in a single AVI file for one or more menus. The chunks that contain the media tracks in a menu AVI file can be created by using software designed to interleave video, audio and button overlay tracks. The 'audio', 'video' and 'overlay' chunks (i.e. 'subtitle' chunks containing overlay information) are interleaved into an AVI format compliant file using an interleaver.

As mentioned above, a separate AVI file can be created for each menu. In other embodiments, other file formats or a single file could be used to contain the media information used to provide the background audio, background video and foreground overlay information.

3.3.5. Combining the XML Configuration File and the AVI Files

In one embodiment, a computer is configured to parse information from the XML configuration file to create a 'WowMenu' chunk (described above). In addition, the computer can create the 'MRIF' chunk (described above) using the AVI files that contain the media for each menu. The computer can then complete the generation of the 'DMNU' chunk by creating the necessary references between the 'WowMenu' chunk and the media chunks in the 'MRIF' chunk. In several embodiments, the menu information can be encrypted. Encryption can be achieved by encrypting the media information contained in the 'MRIF' chunk in a similar manner to that described below in relation to 'video' chunks. In other embodiments, various alternative encryption techniques are used.

3.3.6. Automatic Generation of Menus from the Object Model

Referring back to FIG. 3.3., a menu that contains less content than the full menu can be automatically generated from the menu model by simply examining the 'Title' objects 487 associated with the 'Media object 464. The objects used to automatically generate a menu in accordance with an embodiment of the invention are shown in FIG. 3.3.1. Software can generate an XML configuration file for a simple menu that enables selection of a particular section of a multimedia presentation and selection of the audio and subtitle tracks to use. Such a menu can be used as a first so-called 'lite' menu in several embodiments of multimedia files in accordance with the present invention.

3.3.7. Generating 'DXDT' and 'DMNU' Chunks Using a Single Configuration File

Systems in accordance with several embodiments of the present invention are capable of generating a single XML configuration file containing both 'meta data' and menu information and using the XML file to generate the 'DXDT' and 'DMNU' chunks. These systems derive the XML configuration file using the 'meta data' information and the menu object model. In other embodiments, the configuration file need not be in XML.

3.4. Generating 'Audio' Chunks

The 'audio' chunks in the 'movi' list chunk of multimedia files in accordance with embodiments of the present invention can be generated by decoding an audio source and then encoding the source into 'audio' chunks in accordance with the practice of the present invention. In one embodiment, the 'audio' chunks can be encoded using an mp3 codec.

3.4.1. Re-Chunking Audio

Where the audio source is provided in chunks that don't contain audio information corresponding to the contents of a corresponding 'video' chunk, then embodiments of the present invention can re-chunk the audio. A process that can be used to re-chunk audio is illustrated in FIG. 3.4. The process 480 involves identifying (482) a 'video' chunk, identifying (484) the audio information that accompanies the 'video' chunk and extracting (486) the audio information from the existing audio chunks to create (488) a new 'audio' chunk. The process is repeated until the decision (490) is made that the entire audio source has been re-chunked. At which point, the rechunking of the audio is complete (492).

3.5. Generating 'Video' Chunks

As described above the process of creating video chunks can involve decoding the video source and encoding the decoded video into 'video' chunks. In one embodiment, each 'video' chunk contains information for a single frame of video. The decoding process simply involves taking video in a particular format and decoding the video from that format into a standard video format, which may be uncompressed. The encoding process involves taking the standard video, encoding the video and generating 'video' chunks using the encoded video.

A video encoder in accordance with an embodiment of the present invention is conceptually illustrated in FIG. 3.5. The video encoder 500 preprocesses 502 the standard video information 504. Motion estimation 506 is then performed on the preprocessed video to provide motion compensation 508 to the preprocessed video. A discrete cosine transform (DCT transformation) 510 is performed on the motion compensated video. Following the DCT transformation, the video is quantized 512 and prediction 514 is performed. A compressed bitstream 516 is then generated by combining a texture coded 518 version of the video with motion coding 520 generated using the results of the motion estimation. The compressed bitstream is then used to generate the 'video' chunks.

In order to perform motion estimation 506, the system must have knowledge of how the previously processed frame of video will be decoded by a decoding device (e.g. when the compressed video is uncompressed for viewing by a player). This information can be obtained by inverse quantizing 522 the output of the quantizer 512. An inverse DCT 524 can then be performed on the output of the inverse quantizer and the result placed in a frame store 526 for access during the motion estimation process.

Multimedia files in accordance with embodiments of the present invention can also include a number of psychovisual enhancements 528. The psychovisual enhancements can be methods of compressing video based upon human perceptions of vision. These techniques are discussed further below and generally involve modifying the number of bits used by the quantizer to represent various aspects of video. Other aspects of the encoding process can also include psychovisual enhancements.

In one embodiment, the entire encoding system 500 can be implemented using a computer configured to perform the various functions described above. Examples of detailed implementations of these functions are provided below.

3.5.1. Preprocessing

The preprocessing operations 502 that are optionally performed by an encoder 500 in accordance with an embodiment of the present invention can use a number of signal processing techniques to improve the quality of the encoded video. In one embodiment, the preprocessing 502 can involve one or all of deinterlacing, temporal/spatial noise reduction and resizing. In embodiments where all three of these preprocessing techniques are used, the deinterlacing is typically performed first followed by the temporal/spatial noise reduction and the resizing.

3.5.2. Motion Estimation and Compensation

A video encoder in accordance with an embodiment of the present invention can reduce the number of pixels required to represent a video track by searching for pixels that are repeated in multiple frames. Essentially, each frame in a video typically contains many of the same pixels as the one before it. The encoder can conduct several types of searches for matches in pixels between each frame (as macroblocks, pixels, half-pixels and quarter-pixels) and eliminates these redundancies whenever possible without reducing image quality. Using motion estimation, the encoder can represent most of the picture simply by recording the changes that have occurred since the last frame instead of storing the entire picture for every frame. During motion estimation, the encoder divides the frame it is analyzing into an even grid of blocks, often referred to as 'macroblocks'. For each 'macroblock' in the frame, the encoder can try to find a matching block in the previous frame. The process of trying to find matching blocks is called a 'motion search'. The motion of the 'macroblock' can be represented as a two dimensional vector, i.e. an (x,y) representation. The motion search algorithm can be performed with various degrees of accuracy. A whole-pel search is one where the encoder will try to locate matching blocks by stepping through the reference frame in either dimension one pixel at a time. In a half-pixel search, the encoder searches for a matching block by stepping through the reference frame in either dimension by half of a pixel at a time. The encoder can use quarter-pixels, other pixel fractions or searches involving a granularity of greater than a pixel.

The encoder embodiment illustrated in FIG. 3.5. performs motion estimation in accordance with an embodiment of the present invention. During motion estimation the encoder has access to the preprocessed video 502 and the previous frame, which is stored in a frame store 526. The previous frame is generated by taking the output of the quantizer, performing an inverse quantization 522 and an inverse DCT transformation 524. The reason for performing the inverse functions is so that the frame in the frame store is as it will appear when decoded by a player in accordance with an embodiment of the present invention.

Motion compensation is performed by taking the blocks and vectors generated as a result of motion estimation. The result is an approximation of the encoded image that can be matched to the actual image by providing additional texture information.

3.5.3. Discrete Cosine Transform

The DCT and inverse DCT performed by the encoder illustrated in FIG. 3.5. are in accordance with the standard specified in ISO/IEC 14496-2:2001(E), Annex A.1 (coding transforms).

3.5.3.1. Description of Transform

The DCT is a method of transforming a set of spatial-domain data points to a frequency domain representation. In the case of video compression, a 2-dimensional DCT converts image blocks into a form where redundancies are more readily exploitable. A frequency domain block can be a sparse matrix that is easily compressed by entropy coding.

3.5.3.2. Psychovisual Enhancements to Transform

The DCT coefficients can be modified to improve the quality of the quantized image by reducing quantization noise in areas where it is readily apparent to a human viewer. In addition, file size can be reduced by increasing quantization noise in portions of the image where it is not readily discernable by a human viewer.

Encoders in accordance with an embodiment of the present invention can perform what is referred to as a 'slow' psychovisual enhancement. The 'slow' psychovisual enhancement analyzes blocks of the video image and decides whether allowing some noise there can save some bits without degrading the video's appearance. The process uses one metric per block. The process is referred to as a 'slow' process, because it performs a considerable amount of computation to avoid blocking or ringing artifacts.

Other embodiments of encoders in accordance with embodiments of the present invention implement a 'fast' psychovisual enhancement. The 'fast' psychovisual enhancement is capable of controlling where noise appears within a block and can shape quantization noise.

Both the 'slow' and 'fast' psychovisual enhancements are discussed in greater detail below. Other psychovisual enhancements can be performed in accordance with embodiments of the present invention including enhancements that control noise at image edges and that seek to concentrate higher levels of quantization noise in areas of the image where it is not readily apparent to human vision.

3.5.3.3. 'Slow' Psychovisual Enhancement

The 'slow' psychovisual enhancement analyzes blocks of the video image and determines whether allowing some noise can save bits without degrading the video's appearance. In one embodiment, the algorithm includes two stages. The first involves generation of a differentiated image for the input luminance pixels. The differentiated image is generated in the manner described below. The second stage involves modifying the DCT coefficients prior to quantization.

3.5.3.3.1. Generation of Differentiated Image

Each pixel $p'_{xy}$ of the differentiated image is computed from the uncompressed source pixels, $p_{xy}$, according to the following:

$$p'_{xy} = \max(|p_{x+1,y} - p_{xy}|, |p_{x-1,y} - p_{xy}|, |p_{x,y+1} - p_{xy}|, |p_{x,y-1} - p_{xy}|)$$

where
$p'_{xy}$ will be in the range 0 to 255 (assuming 8 bit video).

3.5.3.3.2. Modification of DCT Coefficients

The modification of the DCT coefficients can involve computation of a block ringing factor, computation of block energy and the actual modification of the coefficient values.

3.5.3.3.3. Computation of Block Ringing Factor

For each block of the image, a "ringing factor" is calculated based on the local region of the differentiated image. In embodiments where the block is defined as an 8×8 block, the ringing factor can be determined using the following method.

Initially, a threshold is determined based on the maximum and minimum luminance pixels values within the 8×8 block:

$$\text{threshold}_{block} = \text{floor}((\max_{block} - \min_{block})/8) + 2$$

The differentiated image and the threshold are used to generate a map of the "flat" pixels in the block's neighborhood. The potential for each block to have a different threshold prevents the creation of a map of flat pixels for the entire frame. The map is generated as follows:

$\text{flat}_{xy} = 1$ when $p'_{xy} < \text{threshold}_{block}$
$\text{flat}_{xy} = 0$ otherwise The map of flat pixels is filtered according to a simple logical operation:

$\text{flat}'_{xy} = 1$ when $\text{flat}_{xy} = 1$ and $\text{flat}_{x-1,y} = 1$ and $\text{flat}_{x,y-1} = 1$ and $\text{flat}_{x-1,y-1} = 1$ $\text{flat}'_{xy}$ otherwise The flat pixels in the filtered map are then counted over the 9×9 region that covers the 8×8 block.

$$\text{flatcount}_{block} = \Sigma \text{flat}'_{xy} \text{ for } 0=x=8 \text{ and } 0=y=8$$

The risk of visible ringing artifacts can be evaluated using the following expression:

$$\text{ringingbrisk}_{block} = ((\text{flatcount}_{block} - 10) \times 256 + 20)/40$$

The 8×8 block's ringing factor can then be derived using the following expression:

$$\begin{aligned}
Ringingfactor &= 0 \text{ when } ringingrisk > 255 \\
&= 255 \text{ when } ringingrisk < 0 \\
&= 255 - ringingrisk \text{ otherwise}
\end{aligned}$$

3.5.3.3.4. Computation of Block Energy

The energy for blocks of the image can be calculated using the following procedure. In several embodiments, 8×8 blocks of the image are used.

A forward DCT is performed on the source image:

$$T = f\text{DCT}(S)$$

where S is the 64 source-image luminance values of the 8×8 block in question and T is the transformed version of the same portion of the source image.

The energy at a particular coefficient position is defined as the square of that coefficient's value:

$$e_k = t_k^2 \text{ for } 0=k=63$$

where $t_k$ is the kth coefficient of transformed block T.

3.5.3.3.5. Coefficient Modification

The modification of the DCT coefficients can be performed in accordance with the following process. In several embodiments, the process is performed for every non-zero AC DCT coefficient before quantization. The magnitude of each coefficient is changed by a small delta, the value of the delta being determined according to psychovisual techniques.

The DCT coefficient modification of each non-zero AC coefficient $c_k$ is performed by calculating an energy based on local and block energies using the following formula:

$$\text{energy}_k = \max(a_k \times e_k, 0.12 \times \text{totalenergy})$$

where $a_k$ is a constant whose value depends on the coefficient position as described in the following table:

TABLE 3

| Coefficient table | | | | | | | |
|---|---|---|---|---|---|---|---|
| 0.0 | 1.0 | 1.5 | 2.0 | 2.0 | 2.0 | 2.0 | 2.0 |
| 1.0 | 1.5 | 2.0 | 2.0 | 2.0 | 2.0 | 2.0 | 2.0 |
| 1.5 | 2.0 | 2.0 | 2.0 | 2.0 | 2.0 | 2.0 | 2.0 |
| 2.0 | 2.0 | 2.0 | 2.0 | 2.0 | 2.0 | 2.0 | 2.0 |
| 2.0 | 2.0 | 2.0 | 2.0 | 2.0 | 2.0 | 2.0 | 2.0 |
| 2.0 | 2.0 | 2.0 | 2.0 | 2.0 | 2.0 | 2.0 | 2.0 |
| 2.0 | 2.0 | 2.0 | 2.0 | 2.0 | 2.0 | 2.0 | 2.0 |
| 2.0 | 2.0 | 2.0 | 2.0 | 2.0 | 2.0 | 2.0 | 2.0 |

The energy can be modified according to the block's ringing factor using the following relationship:

$$energy'_k = ringingfactor \times energy_k$$

The resulting value is shifted and clipped before being used as an input to a look-up table (LUT).

$$e_k = \min(1023, 4 \times energy'_k)$$

$$d_k = LUT_i \text{ where } i = e_k$$

The look-up table is computed as follows:

$$LUT_i = \min(\text{floor}(k_{texture} \times ((i+0.5)/4)^{1/2} + k_{flat} \times \text{offset}), 2 \times Q_p)$$

The value 'offset' depends on quantizer, $Q_p$, as described in the following table:

TABLE 4

| $Q_p$ | offset |
|---|---|
| 1 | −0.5 |
| 2 | 1.5 |
| 3 | 1.0 |
| 4 | 2.5 |
| 5 | 1.5 |
| 6 | 3.5 |
| 7 | 2.5 |
| 8 | 4.5 |
| 9 | 3.5 |
| 10 | 5.5 |
| 11 | 4.5 |
| 12 | 6.5 |
| 13 | 5.5 |
| 14 | 7.5 |
| 15 | 6.5 |
| 16 | 8.5 |
| 17 | 7.5 |
| 18 | 9.5 |
| 19 | 8.5 |
| 20 | 10.5 |
| 21 | 9.5 |
| 22 | 11.5 |
| 23 | 10.5 |
| 24 | 12.5 |
| 25 | 11.5 |
| 26 | 13.5 |
| 27 | 12.5 |
| 28 | 14.5 |
| 29 | 13.5 |
| 30 | 15.5 |
| 31 | 14.5 |

The variable $k_{texture}$ and $k_{flat}$ control the strength of the of the psychovisual effect in flat and textured regions respectively. In one embodiment, they take values in the range 0 to 1, with 0 signifying no effect and 1 meaning full effect. In one embodiment, the values for $k_{texture}$ and $k_{flat}$ are established as follows:

Luminance:
$k_{texture} = 1.0$
$k_{flat} = 1.0$
Chrominance:
$k_{texture} = 1.0$
$k_{flat} = 0.0$ The output from the look-up table ($d_k$) is used to modify the magnitude of the DCT coefficient by an additive process:

$$c'_k = c_k - \min(d_k, |c_k|) \times \text{sgn}(c_k)$$

Finally, the DCT coefficient $c_k$ is substituted by the modified coefficient $c'_k$ and passed onwards for quantization.

3.5.3.4. 'Fast' Psychovisual Enhancement

A 'fast' psychovisual enhancement can be performed on the DCT coefficients by computing an 'importance' map for the input luminance pixels and then modifying the DCT coefficients.

3.5.3.4.1. Computing an 'Importance' Map

An 'importance' map can be generated by calculating an 'importance' value for each pixel in the luminance place of the input video frame. In several embodiments, the 'importance' value approximates the sensitivity of the human eye to any distortion located at that particular pixel. The 'importance' map is an array of pixel 'importance' values.

The 'importance' of a pixel can be determined by first calculating the dynamic range of a block of pixels surrounding the pixel ($d_{xy}$). In several embodiments the dynamic range of a 3×3 block of pixels centered on the pixel location (x, y) is computed by subtracting the value of the darkest pixel in the area from the value of the lightest pixel in the area.

The 'importance' of a pixel ($m_{xy}$) can be derived from the pixel's dynamic range as follows:

$$m_{xy} = 0.08/\max(d_{xy}, 3) + 0.001$$

3.5.3.4.2. Modifying DCT Coefficients

In one embodiment, the modification of the DCT coefficients involves the generation of basis-function energy matrices and delta look up tables.

3.5.3.4.3. Generation of Basis-Function Energy Matrices

A set of basis-function energy matrices can be used in modifying the DCT coefficients. These matrices contain constant values that may be computed prior to encoding. An 8×8 matrix is used for each of the 64 DCT basis functions. Each matrix describes how every pixel in an 8×8 block will be impacted by modification of its corresponding coefficient. The kth basis-function energy matrix is derived by taking an 8×8 matrix $A_k$ with the corresponding coefficient set to 100 and the other coefficients set to 0.

$$a_{kn} = 100 \quad \text{if } n = k$$
$$= 0 \quad \text{otherwise}$$

where n represents the coefficient position within the 8×8 matrix; $0 = n = 63$

An inverse DCT is performed on the matrix to yield a further 8×8 matrix $A'_k$. The elements of the matrix ($a'_{kn}$) represent the kth DCT basis function.

$$A'_k = iDCT(A_k)$$

Each value in the transformed matrix is then squared:

$$b_{kn} a'_{kn}{}^2 \text{ for } 0 = n = 63$$

The process is carried out 64 times to produce the basis function energy matrices $B_k$, $0 = k = 63$, each comprising 64 natural values. Each matrix value is a measure of how much a pixel at the nth position in the 8×8 block will be impacted by any error or modification of the coefficient k.

3.5.3.4.4. Generation of Delta Look-Up Table

A look-up table (LUT) can be used to expedite the computation of the coefficient modification delta. The contents of the table can be generated in a manner that is dependent upon the desired strength of the 'fast' psychovisual enhancement and the quantizer parameter ($Q_p$).

The values of the look-up table can be generated according to the following relationship:

$$LUT_i = \min(\text{floor}(128 \times k_{texture} \times \text{strength}/(i+0.5) + k_{flat} \times \text{offset} + 0.5), 2 \times Q_p)$$

where i is the position within the table, $0 \leq i \leq 1023$.

strength and offset depend on the quantizer, $Q_p$, as described in the following table:

TABLE 5

Relationship between values of strength and offset and the value of $Q_p$

| $Q_p$ | strength | offset |
|---|---|---|
| 1 | 0.2 | −0.5 |
| 2 | 0.6 | 1.5 |
| 3 | 1.0 | 1.0 |
| 4 | 1.2 | 2.5 |
| 5 | 1.3 | 1.5 |
| 6 | 1.4 | 3.5 |
| 7 | 1.6 | 2.5 |
| 8 | 1.8 | 4.5 |
| 9 | 2.0 | 3.5 |
| 10 | 2.0 | 5.5 |
| 11 | 2.0 | 4.5 |
| 12 | 2.0 | 6.5 |
| 13 | 2.0 | 5.5 |
| 14 | 2.0 | 7.5 |
| 15 | 2.0 | 6.5 |
| 16 | 2.0 | 8.5 |
| 17 | 2.0 | 7.5 |
| 18 | 2.0 | 9.5 |
| 19 | 2.0 | 8.5 |
| 20 | 2.0 | 10.5 |
| 21 | 2.0 | 9.5 |
| 22 | 2.0 | 11.5 |
| 23 | 2.0 | 10.5 |
| 24 | 2.0 | 12.5 |
| 25 | 2.0 | 11.5 |
| 26 | 2.0 | 13.5 |
| 27 | 2.0 | 12.5 |
| 28 | 2.0 | 14.5 |
| 29 | 2.0 | 13.5 |
| 30 | 2.0 | 15.5 |
| 31 | 2.0 | 14.5 |

The variable $k_{texture}$ and $k_{flat}$ control the strength of the of the psychovisual effect in flat and textured regions respectively. In one embodiment, they take values in the range 0 to 1, with 0 signifying no effect and 1 meaning full effect. In one embodiment, the values for $k_{texture}$ and $k_{flat}$ are established as follows:

Luminance:
$k_{texture} = 1.0$
$k_{flat} = 1.0$
Chrominance:
$k_{texture} = 1.0$
$k_{flat} = 0.0$

3.5.3.4.5. Modification of DCT Coefficients

The DCT coefficients can be modified using the values calculated above. In one embodiment, each non-zero AC DCT coefficient is modified in accordance with the following procedure prior to quantization.

Initially, an 'energy' value ($e_k$) is computed by taking the dot product of the corresponding basis function energy matrix and the appropriate 8×8 block from the importance map. This 'energy' is a measure of how quantization errors at the particular coefficient would be perceived by a human viewer. It is the sum of the product of pixel importance and pixel basis-function energy:

$$e_k = M \cdot B_k$$

where

M contains the 8×8 block's importance map values; and
$B_k$ is the kth basis function energy matrix.

The resulting 'energy' value is shifted and clipped before being used as an index ($d_k$) into the delta look-up table.

$$e'_k = \min[1023, \text{floor}(e_k / 32768)]$$

$$d_k = LUT_i$$

where $i = e'_k$

The output of the delta look-up table is used to modify the magnitude of the DCT coefficient by an additive process:

$$c'_k = c_k - \min(d_k, |c_k|) \times \text{sign}(c_k)$$

The DCT coefficient $c_k$ is substituted with the modified $c'_k$ and passed onwards for quantization.

3.5.4. Quantization

Encoders in accordance with embodiments of the present invention can use a standard quantizer such as a the quantizer defined by the International Telecommunication Union as Video Coding for Low Bitrate Communication, ITU-T Recommendation H.263, 1996.

3.5.4.1. Psychovisual Enhancements to Quantization

Some encoders in accordance with embodiments of the present invention, use a psychovisual enhancement that exploits the psychological effects of human vision to achieve more efficient compression. The psychovisual effect can be applied at a frame level and a macroblock level.

3.5.4.2. Frame Level Psychovisual Enhancements

When applied at a frame level, the enhancement is part of the rate control algorithm and its goal is to adjust the encoding so that a given amount of bit rate is best used to ensure the maximum visual quality as perceived by human eyes. The frame rate psychovisual enhancement is motivated by the theory that human vision tends to ignore the details when the action is high and that human vision tends to notice detail when an image is static. In one embodiment, the amount of motion is determined by looking at the sum of absolute difference (SAD) for a frame. In one embodiment, the SAD value is determined by summing the absolute differences of collocated luminance pixels of two blocks. In several embodiments, the absolute differences of 16×16 pixel blocks is used. In embodiments that deal with fractional pixel offsets, interpolation is performed as specified in the MPEG-4 standard (an ISO/IEC standard developed by the Moving Picture Experts Group of the ISO/IEC), before the sum of absolute differences is calculated.

The frame-level psychovisual enhancement applies only to the P frames of the video track and is based on SAD value of the frame. During the encoding, the psychovisual module keeps a record of the average SAD (i.e. $\overline{SAD}$) of all of the P frames of the video track and the average distance of the SAD of each frame from its overall SAD (i.e. $\overline{DSAD}$). The averaging can be done using an exponential moving average algorithm. In one embodiment, the one-pass rate control algorithm described above can be used as the averaging period here (see description above).

For each P frame of the video track encoded, the frame quantizer Q (obtained from the rate control module) will have a psychovisual correction applied to it. In one embodiment, the process involves calculating a ratio R using the following formula:

$$R = \frac{SAD - \overline{SAD}}{\overline{DSAD}} - I$$

where

I is a constant and is currently set to 0.5. The R is clipped to within the bound of [−1, 1].

The quantizer is then adjusted according to the ration R, via the calculation shown below:

$$Q_{adj} = Q \lfloor Q \cdot (1 + R \cdot S_{frame}) \rfloor$$

where $S_{frame}$ is a strength constant for the frame level psychovisual enhancements.

The $S_{frame}$ constant determines how strong an adjustment can be for the frame level psychovisual. In one embodiment of the codec, the option of setting $S_{frame}$ to 0.2, 0.3 or 0.4 is available.

3.5.4.3. Macroblock Level Psychovisual Enhancements

Encoders in accordance with embodiments of the present invention that utilize a psychovisual enhancement at the macroblock level attempt to identify the macroblocks that are prominent to the visual quality of the video for a human viewer and attempt to code those macroblocks with higher quality. The effect of the macroblock level psychovisual enhancements it to take bits away from the less important parts of a frame and apply them to more important parts of the frame. In several embodiments, enhancements are achieved using three technologies, which are based on smoothness, brightness and the macroblock SAD. In other embodiments any of the techniques alone or in combination with another of the techniques or another technique entirely can be used.

In one embodiment, all three of the macroblock level psychovisual enhancements described above share a common parameter, $S_{MB}$, which controls the strength of the macroblock level psychovisual enhancement. The maximum and minimum quantizer for the macroblocks are then derived from the strength parameter and the frame quantizer $Q_{frame}$ via the calculations shown below:

$$Q_{MBMax} = \frac{Q_{frame}}{(1 - S_{MB})}, \text{ and } Q_{MBMin} = Q_{frame} \cdot (1 - S_{MB})$$

where $Q_{MBMax}$ is the maximum quantizer $Q_{MBMax}$ is the minimum quantizer

The values $Q_{MBMax}$ and $Q_{MBMax}$ define the upper and lower bounds to the macroblock quantizers for the entire frame. In one embodiment, the option of setting the value $S_{MB}$ to any of the values 0.2, 0.3 and 0.4 is provided. In other embodiments, other values for $S_{MB}$ can be utilized.

3.5.4.3.1. Brightness Enhancement

In embodiments where psychovisual enhancement is performed based on the brightness of the macroblocks, the encoder attempts to encode brighter macroblocks with greater quality. The theoretical basis of this enhancement is that relatively dark parts of the frame are more or less ignored by human viewers. This macroblock psychovisual enhancement is applied to I frames and P frames of the video track. For each frame, the encoder looks through the whole frame first. The average brightness ($\overline{BR}$) is calculated and the average difference of brightness from the average ($\overline{DBR}$) is also calculated. These values are then used to develop two thresholds ($T_{BRLower}$, $T_{BRUpper}$), which can be used as indicators for whether the psychovisual enhancement should be applied:

$$T_{BRLower} = \overline{BR} - \overline{DBR}$$

$$T_{BRUpper} = \overline{BR} + (\overline{BR} - T_{BRLower})$$

The brightness enhancement is then applied based on the two thresholds using the conditions stated below to generate an intended quantizer ($Q_{MB}$) for the macroblock:

$$Q_{MB} = Q_{MBMin} \text{ when } BR > T_{BRUpper}$$

$$Q_{MB} = Q_{frame} \text{ when } T_{BRLower} \leq BR \leq T_{BRUpper}, \text{ and}$$

$$Q_{MB} = Q_{MBMax} \text{ when } BR < T_{BRLower}$$

where

BR is the brightness value for that particular macroblock

In embodiments where the encoder is compliant with the MPEG-4 standard, the macroblock level psychovisual brightness enhancement technique cannot change the quantizer by more than ±2 from one macroblock to the next one. Therefore, the calculated $Q_{MB}$ may require modification based upon the quantizer used in the previous macroblock.

3.5.4.3.2. Smoothness Enhancement

Encoders in accordance with embodiments of the present invention that include a smoothness psychovisual enhancement, modify the quantizer based on the spatial variation of the image being encoded. Use of a smoothness psychovisual enhancement can be motivated by the theory that human vision has an increased sensitivity to quantization artifacts in smooth parts of an image. Smoothness psychovisual enhancement can, therefore, involve increasing the number of bits to represent smoother portions of the image and decreasing the number of bits where there is a high degree of spatial variation in the image.

In one embodiment, the smoothness of a portion of an image is measured as the average difference in the luminance of pixels in a macroblock to the brightness of the macroblock ($\overline{DR}$). A method of performing smoothness psychovisual enhancement on an I frame in accordance with embodiments of the present invention is shown in FIG. 3.6. The process 540, involves examining the entire frame to calculate (542) $\overline{DR}$. The threshold for applying the smoothness enhancement, $T_{DR}$, can then be derived (544) using the following calculation:

$$T_{DR} = \frac{\overline{DR}}{2}$$

The following smoothness enhancement is performed (546) based on the threshold.

$$Q_{MB} = Q_{frame} \text{ when } DR \geq T_{DR}, \text{ and}$$

$$Q_{MB} = Q_{MBMin} \text{ when } DR < T_{DR}$$

where $Q_{MB}$ is the intended quantizer for the macroblock

DR is the deviation value for the macroblock (i.e. mean luminance−mean brightness)

Embodiments that encode files in accordance with the MPEG-4 standard are limited as described above in that the macroblock level quantizer change can be at most ±2 from one macroblock to the next.

3.5.4.3.3. Macroblock SAD Enhancement

Encoders in accordance with embodiments of the present invention can utilize a macroblock SAD psychovisual enhancement. A macroblock SAD psychovisual enhancement can be used to increase the detail for static macroblocks and allow decreased detail in portions of a frame that are used in a high action scene.

A process for performing a macroblock SAD psychovisual enhancement in accordance with an embodiment of the present invention is illustrated in FIG. 3.7. The process 570 includes inspecting (572) an entire I frame to determine the average SAD (i.e. $\overline{MBSAD}$) for all of the macroblocks in the entire frame and the average difference of a macroblock's SAD from the average (i.e. $\overline{DMBSAD}$) is also obtained. In one embodiment, both of these macroblocks are averaged over the inter-frame coded macroblocks (i.e. the macroblocks encoded using motion compensation or other dependencies on previous encoded video frames). Two thresholds for applying the macroblock SAD enhancement are then derived (574) from these averages using the following formulae:

$$T_{MBSADLower} = \overline{MBSAD} - \overline{DMBSAD}, \text{ and}$$

$$T_{MBSADUpper} = \overline{MBSAD} + \overline{DMBSAD}$$

where $T_{MBSADLower}$ is the lower threshold $T_{MBSADUpper}$ is the upper threshold, which may be bounded by 1024 if necessary The macroblock SAD enhancement is then applied (576) based on these two thresholds according to the following conditions:

$$Q_{MB} = Q_{MBMax} \text{ when } MBSAD > T_{MBSADUpper},$$

$$Q_{MB} = Q_{frame} \text{ when } T_{MADLower} \leq MBSAD \leq T'_{MBSADUpper}$$

$$Q_{MB} = Q_{MBMin} \text{ when } MBSAD < T_{MBSADLower}$$

where $Q_{MB}$ is the intended quantizer for the macroblock

MBSAD is the SAD value for that particular macroblock

Embodiments that encode files in accordance with the MPEG-4 specification are limited as described above in that the macroblock level quantizer change can be at most ±2 from one macroblock to the next.

3.5.5. Rate Control

The rate control technique used by an encoder in accordance with an embodiment of the present invention can determine how the encoder uses the allocated bit rate to encode a video sequence. An encoder will typically seek to encode to a predetermined bit rate and the rate control technique is responsible for matching the bit rate generated by the encoder as closely as possible to the predetermined bit rate. The rate control technique can also seek to allocate the bit rate in a manner that will ensure the highest visual quality of the video sequence when it is decoded. Much of rate control is performed by adjusting the quantizer. The quantizer determines how finely the encoder codes the video sequence. A smaller quantizer will result in higher quality and higher bit consumption. Therefore, the rate control algorithm seeks to modify the quantizer in a manner that balances the competing interests of video quality and bit consumption.

Encoders in accordance with embodiments of the present invention can utilize any of a variety of different rate control techniques. In one embodiment, a single pass rate control technique is used. In other embodiments a dual (or multiple) pass rate control technique is used. In addition, a 'video buffer verified' rate control can be performed as required. Specific examples of these techniques are discussed below. However, any rate control technique can be used in an encoder in accordance with the practice of the present inventions.

3.5.5.1. One Pass Rate Control

An embodiment of a one pass rate control technique in accordance with an embodiment of the present invention seeks to allow high bit rate peaks for high motion scenes. In several embodiments, the one pass rate control technique seeks to increase the bit rate slowly in response to an increase in the amount of motion in a scene and to rapidly decrease the bit rate in response to a reduction in the motion in a scene.

In one embodiment, the one pass rate control algorithm uses two averaging periods to track the bit rate. A long-term average to ensure overall bit rate convergence and a short-term average to enable response to variations in the amount of action in a scene.

A one pass rate control technique in accordance with an embodiment of the present invention is illustrated in FIG. 3.8. The one pass rate control technique 580 commences (582) by initializing (584) the encoder with a desired bit rate, the video frame rate and a variety of other parameters (discussed further below). A floating point variable is stored, which is indicative of the quantizer. If a frame requires quantization (586), then the floating point variable is retrieved (588) and the quantizer obtained by rounding the floating point variable to the nearest integer. The frame is then encoded (590). Observations are made during the encoding of the frame that enable the determination (592) of a new quantizer value. The process decides (594) to repeat unless there are no more frames. At which point, the encoding in complete (596).

As discussed above, the encoder is initialized (584) with a variety of parameters. These parameters are the 'bit rate', the 'frame rate', the 'Max Key Frame Interval', the 'Maximum Quantizer', the 'Minimum Quantizer', the 'averaging period', the 'reaction period' and the 'down/up ratio'. The following is a discussion of each of these parameters.

3.5.5.1.1. The 'Bit Rate'

The 'bit rate' parameter sets the target bit rate of the encoding.

3.5.5.1.2. The 'Frame Rate'

The 'frame rate' defines the period between frames of video.

3.5.5.1.3. The 'Max Key Frame Interval'

The 'Max Key Frame Interval' specifies the maximum interval between the key frames. The key frames are normally automatically inserted in the encoded video when the codec detects a scene change. In circumstances where a scene continues for a long interval without a single cut, key frames can be inserted in insure that the interval between key frames is always less or equal to the 'Max Key Frame Interval'. In one embodiment, the 'Max Key Frame Interval' parameter can be set to a value of 300 frames. In other embodiments, other values can be used.

3.5.5.1.4. The 'Maximum Quantizer' and the 'Minimum Quantizer'

The 'Maximum Quantizer' and the 'Minimum Quantizer' parameters set the upper and lower bound of the quantizer used in the encoding. In one embodiment, the quantizer bounds are set at values between 1 and 31.

3.5.5.1.5. The 'Averaging Period'

The 'averaging period' parameter controls the amount of video that is considered when modifying the quantizer. A longer averaging period will typically result in the encoded video having a more accurate overall rate. In one embodiment, an 'averaging period' of 2000 is used. Although in other embodiments other values can be used.

3.5.5.1.6. The 'Reaction Period'

The 'reaction period' parameter determines how fast the encoder adapts to changes in the motion in recent scenes. A longer 'reaction period' value can result in better quality high motion scenes and worse quality low motion scenes. In one embodiment, a 'reaction period' of 10 is used. Although in other embodiments other values can be used.

3.5.5.1.7. The 'Clown/Up Ratio'

The 'down/up ratio' parameter controls the relative sensitivity for the quantizer adjustment in reaction to the high or low motion scenes. A larger value typically results in higher quality high motion scenes and increased bit consumption. In one embodiment, a 'down/up ratio' of 20 is used. Although in other embodiments, other values can be used.

3.5.5.1.8. Calculating the Quantizer Value

As discussed above, the one pass rate control technique involves the calculation of a quantizer value after the encoding of each frame. The following is a description of a technique in accordance with an embodiment of the present invention that can be used to update the quantizer value.

The encoder maintains two exponential moving averages having periods equal to the 'averaging period' ($P_{average}$) and the 'reaction period' ($P_{reaction}$) a moving average of the bit rate. The two exponential moving averages can be calculated according to the relationship:

$$A_t = A_{t-1} \cdot \frac{P-T}{P} + B \cdot \frac{T}{P}$$

where $A_t$ is the average at instance t;

$A_{t-1}$ is the average at instance t−T (usually the average in the previous frame);

T represents the interval period (usually the frame time); and

P is the average period, which can be either $P_{average}$ and or $P_{reaction}$.

The above calculated moving average is then adjusted into bit rate by dividing by the time interval between the current instance and the last instance in the video, using the following calculation:

$$R_t = A_t \frac{1}{T}$$

where $R_t$ is the bitrate;

$A_t$ is either of the moving averages; and

T is the time interval between the current instance and last instance (it is usually the inverse of the frame rate).

The encoder can calculate the target bit rate ($R_{target}$) of the next frame as follows:

$$R_{target} = R_{overall} + (R_{overall} - R_{average})$$

where $R_{overall}$ is the overall bit rate set for the whole video; and $R_{average}$ is the average bit rate using the long averaging period.

In several embodiments, the target bit rate is lower bounded by 75% of the overall bit rate. If the target bit rate drops below that bound, then it will be forced up to the bound to ensure the quality of the video.

The encoder then updates the internal quantizer based on the difference between $R_{target}$ and $R_{reaction}$. If $R_{reaction}$ is less than $R_{target}$, then there is a likelihood that the previous frame was of relatively low complexity. Therefore, the quantizer can be decreased by performing the following calculation:

$$Q'_{internal} = Q_{internal} \cdot \left(1 - \frac{1}{P_{reaction}}\right)$$

When $R_{reaction}$ is greater than $R_{target}$, there is a significant likelihood that previous frame possessed a relatively high level of complexity. Therefore, the quantizer can be increased by performing the following calculation:

$$Q'_{internal} = Q_{internal} \cdot \left(1 + \frac{1}{SP_{reaction}}\right)$$

where

S is the 'up/down ratio'.

3.5.5.1.9. B-VOP Encoding

The algorithm described above can also be applied to B-VOP encoding. When B-VOP is enabled in the encoding, the quantizer for the B-VOP ($Q_B$) is chosen based on the quantizer of the P-VOP ($Q_P$) following the B-VOP. The value can be obtained in accordance with the following relationships:

$Q_B = 2 \cdot Q_P$ for $Q_P \leq 4$ $Q_B = 5 + \frac{3}{4} \cdot Q_P$ for $4 < Q_P \leq 20$ $Q_B = Q_P$ for $Q_P \geq 20$

3.5.5.2. Two Pass Rate Control

Encoders in accordance with an embodiment of the present invention that use a two (or multiple) pass rate control technique can determine the properties of a video sequence in a first pass and then encode the video sequence with knowledge of the properties of the entire sequence. Therefore, the encoder can adjust the quantization level for each frame based upon its relative complexity compared to other frames in the video sequence.

A two pass rate control technique in accordance with an embodiment of the present invention, the encoder performs a first pass in which the video is encoded in accordance with the one pass rate control technique described above and the complexity of each frame is recorded (any of a variety of different metrics for measuring complexity can be used). The average complexity and, therefore, the average quantizer ($Q_{ref}$) can be determined based on the first. In the second pass, the bit stream is encoded with quantizers determined based on the complexity values calculated during the first pass.

3.5.5.2.1. Quantizers for 1-VOPs

The quantizer Q for 1-VOPs is set to $0.75 \times Q_{ref}$, provided the next frame is not an I-VOP. If the next frame is also an I-VOP, the Q (for the current frame) is set to $1.25 \times Q_{ref}$.

3.5.5.2.2. Quantizers for P-VOPs

The quantizer for the P-VOPs can be determined using the following expression.

$$Q = F^{-1}\{F(Q_{ref}) \cdot (\overline{C_{complexity}}/C_{complexity})^k\}$$

where $C_{complexity}$ is the complexity of the frame;
$\overline{C_{complexity}}$ is the average complexity of the video sequence;
F(x) is a function that provides the number which the complexity of the frame must be multiplied to give the number of bits required to encode the frame using a quantizer with a quantization value x;
$F^{-1}(x)$ is the inverse function of F(x); and
k is the strength parameter.

The following table defines an embodiment of a function F(Q) that can be used to generator the factor that the complexity of a frame must be multiplied by in order to determine the number of bits required to encode the frame using an encoder with a quantizer Q.

TABLE 6

Values of F(Q) with respect to Q.

| Q | F(Q) |
|---|------|
| 1 | 1 |
| 2 | 0.4 |
| 3 | 0.15 |
| 4 | 0.08 |
| 5 | 0.05 |
| 6 | 0.032 |
| 7 | 0.022 |
| 8 | 0.017 |
| 9 | 0.013 |
| 10 | 0.01 |
| 11 | 0.008 |
| 12 | 0.0065 |
| 13 | 0.005 |
| 14 | 0.0038 |
| 15 | 0.0028 |
| 16 | 0.002 |

If the strength parameter k is chosen to be 0, then the result is a constant quantizer. When the strength parameter is chosen to be 1, the quantizer is proportional to $C_{complexity}$. Several encoders in accordance with embodiments of the present invention have a strength parameter k equal to 0.5.

3.5.5.2.3. Quantizers for B-VOPs

The quantizer Q for the B-VOPs can be chosen using the same technique for choosing the quantizer for B-VOPs in the one pass technique described above.

3.5.5.3. Video Buffer Verified Rate Control

The number of bits required to represent a frame can vary depending on the characteristics of the video sequence. Most communication systems operate at a constant bit rate. A problem that can be encountered with variable bit rate communications is allocating sufficient resources to handle peaks in resource usage. Several encoders in accordance with embodiments of the present invention encode video with a view to preventing overflow of a decoder video buffer, when the bit rate of the variable bit rate communication spikes.

The objectives of video buffer verifier (VBV) rate control can include generating video that will not exceed a decoder's buffer when transmitted. In addition, it can be desirable that the encoded video match a target bit rate and that the rate control produces high quality video.

Encoders in accordance with several embodiments of the present invention provide a choice of at least two VBV rate control techniques. One of the VBV rate control techniques is referred to as causal rate control and the other technique is referred to as Nth pass rate control.

3.5.5.3.1. Causal Rate Control

Causal VBV rate control can be used in conjunction with a one pass rate control technique and generates outputs simply based on the current and previous quantizer values.

An encoder in accordance with an embodiment of the present invention includes causal rate control involving setting the quantizer for frame n (i.e. $Q_n$) according to the following relationship.

$$\frac{1}{Q'_n} = \frac{1}{Q'_{n-1}} + X_{bitrate} + X_{velocity} + X_{size}$$

$$\frac{1}{Q_n} = \frac{1}{Q'_n} + X_{drift}$$

where $Q'_n$ is the quantizer estimated by the single pass rate control;
$X_{bitrate}$ is calculated by determining a target bit rate based on the drift from the desired bit rate;
$X_{velocity}$ is calculated based on the estimated time until the VBV buffer over- or under-flows;
$X_{size}$ is applied on the result of P-VOPs only and is calculated based on the rate at which the size of compressed P-VOPs is changing over time;
$X_{drift}$ is the drift from the desired bit rate.

In several embodiments, the causal VBV rate control may be forced to drop frames and insert stuffing to respect the VBV model. If a compressed frame unexpectedly contains too many or two few bits, then it can be dropped or stuffed.

3.5.5.3.2. Nth Pass VBV Rate Control

Nth pass VBV rate control can be used in conjunction with a multiple pass rate control technique and it uses information garnered during previous analysis of the video sequence. Encoders in accordance with several embodiments of the present invention perform Nth pass VBV rate control according to the process illustrated in FIG. 3.9. The process 600 commences with the first pass, during which analysis (602) is performed. Map generation is performed (604) and a strategy is generated (606). The nth pass Rate Control is then performed (608).

3.5.5.3.3. Analysis

In one embodiment, the first pass uses some form of causal rate control and data is recorded for each frame concerning such things as the duration of the frame, the coding type of the frame, the quantizer used, the motion bits produced and the texture bits produced. In addition, global information such as the timescale, resolution and codec settings can also be recorded.

3.5.5.3.4. Map Generation

Information from the analysis is used to generate a map of the video sequence. The map can specify the coding type used for each frame (I/B/P) and can include data for each frame concerning the duration of the frame, the motion complexity and the texture complexity. In other embodiments, the map may also contain information enabling better prediction of the influence of quantizer and other parameters on compressed frame size and perceptual distortion. In several embodiments, map generation is performed after the N−1th pass is completed.

3.5.5.3.5. Strategy Generation

The map can be used to plan a strategy as to how the Nth pass rate control will operate. The ideal level of the VBV buffer after every frame is encoded can be planned. In one embodiment, the strategy generation results in information for each frame including the desired compressed frame size, an estimated frame quantizer. In several embodiments, strategy generation is performed after map generation and prior to the Nth pass.

In one embodiment, the strategy generation process involves use of an iterative process to simulate the encoder and determine desired quantizer values for each frame by trying to keep the quantizer as close as possible to the median quantizer value. A binary search can be used to generate a base quantizer for the whole video sequence. The base quantizer is the constant value that causes the simulator to achieve the desired target bit rate. Once the base quantizer is found, the strategy generation process involves consideration of the VBV constrains. In one embodiment, a constant quantizer is used if this will not modify the VBV constrains. In other embodiments, the quantizer is modulated based on the complexity of motion in the video frames. This can be further extended to incorporate masking from scene changes and other temporal effects.

3.5.5.3.6. In-Loop Nth Pass Rate Control

In one embodiment, the in-loop Nth pass rate control uses the strategy and uses the map to make the best possible prediction of the influence of quantizer and other parameters on compressed frame size and perceptual distortion. There can be a limited discretion to deviate from the strategy to take short-term corrective strategy. Typically, following the strategy will prevent violation of the VBV model. In one embodiment, the in-loop Nth pass rate control uses a PID control loop. The feedback in the control loop is the accumulated drift from the ideal bitrate.

Although the strategy generation does not involve dropping frames, the in-loop Nth rate control may drop frames if the VBV buffer would otherwise underflow. Likewise, the in-loop Nth pass rate control can request video stuffing to be inserted to prevent VBV overflow.

3.5.6. Predictions

In one embodiment, AD/DC prediction is performed in a manner that is compliant with the standard referred to as ISO/IEC 14496-2:2001(E), section 7.4.3. (DC and AC prediction) and 7.7.1. (field DC and AC prediction).

3.5.7. Texture Coding

An encoder in accordance with an embodiment of the present invention can perform texture coding in a manner that is compliant with the standard referred to as ISO/IEC 14496-2:2001(E), annex B (variable length codes) and 7.4.1. (variable length decoding).

3.5.8. Motion Coding

An encoder in accordance with an embodiment of the present invention can perform motion coding in a manner that is compliant with the standard referred to as ISO/IEC 14496-2:2001(E), annex B (variable length codes) and 7.6.3. (motion vector decoding).

3.5.9. Generating 'Video' Chunks

The video track can be considered a sequence of frames 1 to N. Systems in accordance with embodiments of the present invention are capable of encoding the sequence to generate a compressed bitstream. The bitstream is formatted by segmenting it into chunks 1 to N. Each video frame n has a corresponding chunk n.

The chunks are generated by appending bits from the bitstream to chunk n until it, together with the chunks 1 through n−1 contain sufficient information for a decoder in accordance with an embodiment of the present invention to decode the video frame n. In instances where sufficient information is contained in chunks 1 through n−1 to generate video frame n, an encoder in accordance with embodiments of the present invention can include a marker chunk. In one embodiment, the marker chunk is a not-coded P-frame with identical timing information as the previous frame.

3.6. Generating 'Subtitle' Chunks

An encoder in accordance with an embodiment of the present invention can take subtitles in one of a series of standard formats and then converts the subtitles to bit maps. The information in the bit maps is then compressed using run length encoding. The run length encoded bit maps are the formatted into a chunk, which also includes information concerning the start time and the stop time for the particular subtitle contained within the chunk. In several embodiments, information concerning the color, size and position of the subtitle on the screen can also be included in the chunk. Chunks can be included into the subtitle track that set the palette for the subtitles and that indicate that the palette has changed. Any application capable of generating a subtitle in a standard subtitle format can be used to generate the text of the subtitles. Alternatively, software can be used to convert text entered by a user directly into subtitle information.

3.7. Interleaving

Once the interleaver has received all of the chunks described above, the interleaver builds a multimedia file. Building the multimedia file can involve creating a 'CSET' chunk, an 'INFO' list chunk, a 'hdrl' chunk, a 'movi' list chunk and an idx1 chunk. Methods in accordance with embodiments of the present invention for creating these chunks and for generating multimedia files are described below.

3.7.1. Generating a 'CSET' Chunk

As described above, the 'CSET' chunk is optional and can generated by the interleaver in accordance with the AVI Container Format Specification.

3.7.2. Generating a 'INFO' List Chunk

As described above, the 'INFO' list chunk is optional and can be generated by the interleaver in accordance with the AVI Container Format Specification.

3.7.3. Generating the 'hdrl' List Chunk

The 'hdrl' list chunk is generated by the interleaver based on the information in the various chunks provided to the interleaver. The 'hdrl' list chunk references the location within the file of the referenced chunks. In one embodiment, the 'hdrl' list chunk uses file offsets in order to establish references.

3.7.4. Generating the 'movi' List Chunk

As described above, 'movi' list chunk is created by encoding audio, video and subtitle tracks to create 'audio', 'video' and 'subtitle chunks and then interleaving these chunks. In several embodiments, the 'movi' list chunk can also include digital rights management information.

3.7.4.1. Interleaving the Video/Audio/Subtitles

A variety of rules can be used to interleave the audio, video and subtitle chunks. Typically, the interleaver establishes a number of queues for each of the video and audio tracks. The interleaver determines which queue should be written to the output file. The queue selection can be based on the interleave period by writing from the queue that has the lowest number of interleave periods written. The interleaver may have to wait for an entire interleave period to be present in the queue before the chunk can be written to the file.

In one embodiment, the generated 'audio,' 'video' and 'subtitle' chunks are interleaved so that the 'audio' and 'subtitle' chunks are located within the file prior to the 'video' chunks containing information concerning the video frames to which they correspond. In other embodiments, the 'audio' and 'subtitle' chunks can be located after the 'video' chunks to which they correspond. The time differences between the location of the 'audio,' 'video' and 'subtitle' chunks is largely dependent upon the buffering capabilities of players that are used to play the devices. In embodiments where buffering is limited or unknown, the interleaver interleaves the 'audio,' 'video' and 'subtitle' chunks such that the 'audio' and 'subtitle' chunks are located between 'video' chunks, where the 'video' chunk immediately following the 'audio' and 'subtitle' chunk contains the first video frame corresponding to the audio or subtitle.

3.7.4.2. Generating DRM Information

In embodiments where DRM is used to protect the video content of a multimedia file, the DRM information can be generated concurrently with the encoding of the video chunks. As each chunk is generated, the chunk can be encrypted and a DRM chunk generated containing information concerning the encryption of the video chunk.

3.7.4.3. Interleaving the DRM Information

An interleaver in accordance with an embodiment of the present invention interleaves a DRM chunk containing information concerning the encryption of a video chunk prior to the video chunk. In one embodiment, the DRM chunk for video chunk n is located between video chunk n−1 and video chunk n. In other embodiments, the spacing of the DRM before and after the video chunk n is dependent upon the amount of buffering provided within device decoding the multimedia file.

3.7.5. Generating the 'Idx1' Chunk

Once the 'movi' list chunk has been generated, the generation of the 'idx1' chunk is a simple process. The 'idx1' chunk is created by reading the location within the 'movi' list chunk of each 'data' chunk. This information is combined with information read from the 'data' chunk concerning the track to which the 'data' chunk belongs and the content of the 'data' chunk. All of this information is then inserted into the 'idx1' chunk in a manner appropriate to whichever of the formats described above is being used to represent the information.

4. Transmission and Distribution of Multimedia File

Once a multimedia file is generated, the file can be distributed over any of a variety of networks. The fact that in many embodiments the elements required to generate a multimedia presentation and menus, amongst other things, are contained within a single file simplifies transfer of the information. In several embodiments, the multimedia file can be distributed separately from the information required to decrypt the contents of the multimedia file.

In one embodiment, multimedia content is provided to a first server and encoded to create a multimedia file in accordance with the present invention. The multimedia file can then be located either at the first server or at a second server. In other embodiments, DRM information can be located at the first server, the second server or a third server. In one embodiment, the first server can be queried to ascertain the location of the encoded multimedia file and/or to ascertain the location of the DRM information.

5. Decoding Multimedia File

Information from a multimedia file in accordance with an embodiment of the present invention can be accessed by a computer configured using appropriate software, a dedicated player that is hardwired to access information from the multimedia file or any other device capable of parsing an AVI file. In several embodiments, devices can access all of the information in the multimedia file. In other embodiments, a device may be incapable of accessing all of the information in a multimedia file in accordance with an embodiment of the present invention. In a particular embodiment, a device is not capable of accessing any of the information described above that is stored in chunks that are not specified in the AVI file format. In embodiments where not all of the information can be accessed, the device will typically discard those chunks that are not recognized by the device.

Typically, a device that is capable of accessing the information contained in a multimedia file in accordance with an embodiment of the present invention is capable of performing a number of functions. The device can display a multimedia presentation involving display of video on a visual display, generate audio from one of potentially a number of audio tracks on an audio system and display subtitles from potentially one of a number of subtitle tracks. Several embodiments can also display menus on a visual display while playing accompanying audio and/or video. These display menus are interactive, with features such as selectable buttons, pull down menus and sub-menus. In some embodiments, menu items can point to audio/video content outside the multimedia file presently being accessed. The outside content may be either located local to the device accessing the multimedia file or it may be located remotely, such as over a local area, wide are or public network. Many embodiments can also search one or more multimedia files according to 'meta data' included within the multimedia file(s) or 'meta data' referenced by one or more of the multimedia files.

5.1. Display of Multimedia Presentation

Given the ability of multimedia files in accordance with embodiments of the present invention to support multiple audio tracks, multiple video tracks and multiple subtitle tracks, the display of a multimedia presentation using such a multimedia file that combines video, audio and/or subtitles can require selection of a particular audio track, video track and/or subtitle track either through a visual menu system or a pull down menu system (the operation of which are discussed below) or via the default settings of the device used to generate the multimedia presentation. Once an audio track, video track and potentially a subtitle track are selected, the display of the multimedia presentation can proceed.

A process for locating the required multimedia information from a multimedia file including DRM and displaying the multimedia information in accordance with an embodiment of the present invention is illustrated in FIG. 4.0. The process 620 includes obtaining the encryption key required to decrypt the DRM header (622). The encryption key is then used to decrypt (624) the DRM header and the first DRM chunk is located (626) within the 'movi' list chunk of the multimedia file. The encryption key required to decrypt the 'DRM' chunk is obtained (628) from the table in the 'DRM' header and the encryption key is used to decrypt an encrypted video chunk. The required audio chunk and any required subtitle chunk accompany the video chunk are then decoded (630) and the audio, video and any subtitle information are presented (632) via the display and the sound system.

In several embodiments the chosen audio track can include multiple channels to provide stereo or surround sound audio. When a subtitle track is chosen to be displayed, a determination can be made as to whether the previous video frame included a subtitle (this determination may be made in any of a variety of ways that achieves the outcome of identifying a previous 'subtitle' chunk that contained subtitle information that should be displayed over the currently decoded video frame). If the previous subtitle included a subtitle and the timing information for the subtitle indicates that the subtitle should be displayed with the current frame, then the subtitle is superimposed on the decoded video frame. If the previous frame did not include a subtitle or the timing information for the subtitle on the previous frame indicates that the subtitle should not be displayed in conjunction with the currently decoded frame, then a 'subtitle' chunk for the selected subtitle track is sought. If a 'subtitle' chunk is located, then the subtitle is superimposed on the decoded video. The video (including any superimposed subtitles) is then displayed with the accompanying audio.

Returning to the discussion of FIG. 4.0., the process determines (634) whether there are any additional DRM chunks. If there are, then the next DRM chunk is located (626) and the process continues until no additional DRM chunks remain. At which point, the presentation of the audio, video and/or subtitle tracks is complete (636).

In several embodiments, a device can seek to a particular portion of the multimedia information (e.g. a particular scene of a movie with a particular accompanying audio track and optionally a particular accompanying subtitle track) using information contained within the 'hdrl' chunk of a multimedia file in accordance with the present invention. In many embodiments, the decoding of the 'video' chunk, 'audio' chunk and/or 'subtitle' chunk can be performed in parallel with other tasks.

An example of a device capable of accessing information from the multimedia file and displaying video in conjunction with a particular audio track and/or a particular subtitle track is a computer configured in the manner described above using software. Another example is a DVD player equipped with a codec that includes these capabilities. In other embodiments, any device configured to locate or select (whether intentionally or arbitrarily) 'data' chunks corresponding to particular media tracks and decode those tracks for presentation is capable of generating a multimedia presentation using a multimedia file in accordance with the practice of the present invention.

In several embodiments, a device can play multimedia information from a multimedia file in combination with multimedia information from an external file. Typically, such a device would do so by sourcing an audio track or subtitle track from a local file referenced in a multimedia file of the type described above. If the referenced file is not stored locally and the device is networked to the location where the device is stored, then the device can obtain a local copy of the file. The device would then access both files, establishing a video, an audio and a subtitle (if required) pipeline into which the various tracks of multimedia are fed from the different file sources.

5.2. Generation of Menus

A decoder in accordance with an embodiment of the present invention is illustrated in FIG. 4.1. The decoder 650 processes a multimedia file 652 in accordance with an embodiment of the present invention by providing the file to a demultiplexer 654. The demultiplexer extracts the 'DMNU' chunk from the multimedia file and extracts all of the 'LanguageMenus' chunks from the 'DMNU' chunk and provides them to a menu parser 656. The demultiplexer also extracts all of the 'Media' chunks from the 'DMNU' chunk and provides them to a media renderer 658. The menu parser 656 parses information from the 'LanguageMenu' chunks to build a state machine representing the menu structure defined in the 'LanguageMenu' chunk. The state machine representing the menu structure can be used to provide displays to the user and to respond to user commands. The state machine is provided to a menu state controller 660. The menu state controller keeps track of the current state of the menu state machine and receives commands from the user. The commands from the user can cause a state transition. The initial display provided to a user and any updates to the display accompanying a menu state transition can be controlled using a menu player interface 662. The menu player interface 662 can be connected to the menu state controller and the media render. The menu player interface instructs the media renderer which media should be extracted from the media chunks and provided to the user via the player 664 connected to the media renderer. The user can provide the player with instructions using an input device such as a keyboard, mouse or remote control. Generally the multimedia file dictates the menu initially displayed to the user and the user's instructions dictate the audio and video displayed following the generation of the initial menu. The system illustrated in FIG. 4.1. can be implemented using a computer and software. In other embodiments, the system can be implemented using function specific integrated circuits or a combination of software and firmware.

An example of a menu in accordance with an embodiment of the present invention is illustrated in FIG. 4.2. The menu display 670 includes four button areas 672, background video 674, including a title 676, and a pointer 678. The menu also includes background audio (not shown). The visual effect created by the display can be deceptive. The visual appearance of the buttons is typically part of the background video and the buttons themselves are simply defined regions of the background video that have particular actions associated with them, when the region is activated by the pointer. The pointer is typically an overlay.

FIG. 4.3. conceptually illustrates the source of all of the information in the display shown in FIG. 4.2. The background video 674 can include a menu title, the visual appearance of the buttons and the background of the display. All of these elements and additional elements can appear static or animated. The background video is extracted by using information contained in a 'MediaTrack' chunk 700 that indicates the location of background video within a video track 702. The background audio 706 that can accompany the menu can be located using a 'MediaTrack' chunk 708 that indicates the location of the background audio within an audio track 710. As described above, the pointer 678 is part of an overlay 713. The overlay 713 can also include graphics that appear to highlight the portion of the background video that appears as a button. In one embodiment, the overlay 713 is obtained using a 'MediaTrack' chunk 712 that indicates the location of the overlay within a overlay track 714. The manner in which the menu interacts with a user is defined by the 'Action' chunks (not shown) associated with each of the buttons. In the illustrated embodiment, a 'PlayAction' chunk 716 is illustrated. The 'PlayAction' chunk indirectly references (the other chunks referenced by the 'PlayAction' chunk are not shown) a scene within a multimedia presentation contained within the multimedia file (i.e. an audio, video and possibly a subtitle track). The 'PlayAction' chunk 716 ultimately references the scene using a 'MediaTrack' chunk 718, which indicates the scene within the feature track. A point in a selected or default audio track and potentially a subtitle track are also referenced.

As the user enters commands using the input device, the display may be updated not only in response to the selection of button areas but also simply due to the pointer being located within a button area. As discussed above, typically all of the media information used to generate the menus is located within the multimedia file and more specifically within a 'DMNU' chunk. Although in other embodiments, the information can be located elsewhere within the file and/or in other files.

5.3. Access the Meta Data

'Meta data' is a standardized method of representing information. The standardized nature of 'Meta data' enables the data to be accessed and understood by automatic processes. In one embodiment, the 'meta data' is extracted and provided to a user for viewing. Several embodiments enable multimedia files on a server to be inspected to provide information concerning a users viewing habits and viewing preferences. Such information could be used by software applications to recommend other multimedia files that a user may enjoy viewing. In one embodiment, the recommendations can be based on the multimedia files contained on servers of other users. In other embodiments, a user can request a multimedia file and the file can be located by a search engine and/or intelligent agents that inspect the 'meta data' of multimedia files in a variety of locations. In addition, the user can chose between various multimedia files containing a particular multimedia presentation based on 'meta data' concerning the manner in which each of the different versions of the presentation were encoded.

In several embodiments, the 'meta data' of multimedia files in accordance with embodiments of the present invention can be accessed for purposes of cataloging or for creating a simple menu to access the content of the file.

While the above description contains many specific embodiments of the invention, these should not be construed as limitations on the scope of the invention, but rather as an example of one embodiment thereof. For example, a multimedia file in accordance with an embodiment of the present invention can include a single multimedia presentation or multiple multimedia presentations. In addition, such a file can include one or more menus and any variety of different types of 'meta data'. Accordingly, the scope of the invention should be determined not by the embodiments illustrated, but by the appended claims and their equivalents.

What is claimed is:

1. A system for decoding multimedia files comprising:
   at least one processor;
   a non-volatile storage containing a decoder application;
   wherein the decoder application causes the at least one processor to perform the steps of:
      receiving at least a portion of a multimedia file, wherein:
         the received at least a portion of the multimedia file comprises at least one video track encoded as a plurality of video chunks, a set of digital rights management (DRM) chunks, and an index chunk;
         at least one video chunk of the plurality of video chunks contains at least one partially encrypted frame of video so that only a portion of the encoded frame is encrypted;
         each DRM chunk of the set of DRM chunks comprises DRM information to decrypt at least one partially encrypted frame of video in at least one video chunk of the plurality of video chunks;
         the DRM information comprises an offset value that points to the start of an encrypted block within an encoded frame and a number value that indicates the number of encrypted bytes in the encrypted block;
         the index chunk includes information concerning the location of data chunks within the multimedia file including the locations of video chunks from the at least one video track; and
      for each chunk of the plurality of video chunks:
         determining whether the video chunk contains at least one partially encrypted frame of video;
         when a video chunk contains a partially encrypted frame of video, identifying a corresponding one of the set of DRM chunks that contains the DRM information for the partially encrypted frame of video, demultiplexing the partially encrypted frame from the video chunk, and decrypting the partially encrypted frame of video using the offset and number values from the DRM information for the partially encrypted frame of video; and
         decoding at least one encoded frame of video for display.

2. The system of claim 1, wherein each DRM chunk is identified by a FOURCC code.

3. The system of claim 2, wherein the FOURCC code identifies a track number associated with the DRM chunk.

4. The system of claim 1, wherein the DRM chunk further comprises a reference to a decryption key that can be used to decrypt an encrypted portion of a partially encrypted frame of video.

5. The system of claim 1, wherein at least one video chunk of the plurality of video chunks does not have a corresponding DRM chunk in the set of DRM chunks.

6. The system of claim 1, wherein the location of a particular DRM chunk corresponding to a particular video chunk is dependent upon an amount of buffering provided within the system.

7. A system for encoding multimedia files comprising:
   a network interface;
   at least one processing unit;
   a non-transitory memory storing an encoding application, wherein the encoding application causes the at least one processing unit to encode multimedia files by performing the steps of:
      obtaining source media using the network interface, wherein the source media comprises video;
      encoding at least one video track as a plurality of video chunks, the video chunks being portions of the at least one video track, the video track comprising a series of encoded video frames;
      partially encrypting at least some of the encoded frames of video so that only portions of the encoded frames of video are encrypted;
      encoding the DRM information as a set of DRM chunks, wherein:
         each DRM chunk of the set of DRM chunks comprises DRM information to decrypt at least one partially encrypted frame of video in at least one video chunk of the plurality of video chunks; and
         the DRM information comprises an offset value that points to the start of an encrypted block within an encoded frame and a number value that indicates the number of encrypted bytes in the encrypted block;

interleaving the video chunks and DRM chunks so that a DRM chunk for decrypting at least one partially encrypted frame within a particular video chunk is located before the particular video chunk; and encoding at least one index chunk that includes information concerning the locations of video chunks;

writing the interleaved chunks to at least one multimedia file; and transmitting at least a portion of the at least one multimedia file using the network interface.

8. The system of claim 7, wherein each DRM chunk is identified by a FOURCC code.

9. The system of claim 8, wherein the FOURCC code identifies a track number associated with the DRM chunk.

10. The system of claim 7, wherein the DRM chunk further comprises a reference to a decryption key that can be used to decrypt an encrypted portion of a partially encrypted frame of video.

11. The system of claim 7, wherein at least one video chunk of the plurality of video chunks does not have a corresponding DRM chunk in the set of DRM chunks.

12. The system of claim 7, wherein the location of the DRM chunk for decrypting a particular video chunk is dependent upon a predetermined amount of buffering.

13. The system of claim 7, wherein the at least one index chunk further comprises locations of DRM chunks within the multimedia file.

14. The system of claim 7, wherein writing the interleaved chunks to at least one multimedia file comprises writing the interleaved chunks to a single multimedia file.

15. The system of claim 1, wherein the at least one index chunk further comprises locations of DRM chunks within the multimedia file.

16. The system of claim 4, wherein the decoder application causes the at least one processor to perform the steps of:

requesting at least a portion of the multimedia file from a first server system; and requesting a decryption key referenced in a DRM chunk from the set of DRM chunks from a second server system.

* * * * *